US00RE47086E

(19) United States
(12) Reissued Patent
Taguchi et al.

(10) Patent Number: US RE47,086 E
(45) Date of Reissued Patent: Oct. 16, 2018

(54) TONER CONTAINER AND IMAGE FORMING APPARATUS

(71) Applicant: RICOH COMPANY, LTD., Tokyo (JP)

(72) Inventors: Nobuyuki Taguchi, Kanagawa (JP); Goro Katsuyama, Kanagawa (JP); Takeroh Kurenuma, Kanagawa (JP); Hideo Yoshizawa, Kanagawa (JP); Masayuki Yamane, Kanagawa (JP)

(73) Assignee: RICOH COMPANY, LTD., Tokyo (JP)

(21) Appl. No.: 14/255,629

(22) Filed: Apr. 17, 2014

Related U.S. Patent Documents

Reissue of:
(64) Patent No.: 8,160,461
Issued: Apr. 17, 2012
Appl. No.: 12/886,061
Filed: Sep. 20, 2010

U.S. Applications:
(60) Division of application No. 11/566,897, filed on Dec. 5, 2006, now Pat. No. 7,835,675, and a
(Continued)

(30) Foreign Application Priority Data

Jun. 7, 2005 (JP) ..... 2005-167298
Jul. 7, 2005 (JP) ..... 2005-198355
(Continued)

(51) Int. Cl.
*G03G 15/00* (2006.01)
*G03G 15/08* (2006.01)

(52) U.S. Cl.
CPC ..... *G03G 15/0855* (2013.01); *G03G 15/0865* (2013.01); *G03G 15/0872* (2013.01);
(Continued)

(58) Field of Classification Search
CPC ..... G03G 15/0855; G03G 15/0877; G03G 15/0886; G03G 15/0865; G03G 15/0872;
(Continued)

(56) References Cited

U.S. PATENT DOCUMENTS 4,611,899 A 9/1986 Kasamura et al.
46,118,899 9/1986 Kasamura et al.
(Continued)

FOREIGN PATENT DOCUMENTS

EP 0 616 268 9/1994
EP 0 856 780 A1 8/1998
(Continued)

OTHER PUBLICATIONS

Combined Office Action and Search Report dated Feb. 1, 2016 in Taiwanese Patent Application No. 103123785 with English translation of category of cited documents.
(Continued)

*Primary Examiner* — Robert M Fetsuga
(74) *Attorney, Agent, or Firm* — Oblon, McClelland, Maier & Neustadt, L.L.P.

(57) ABSTRACT

A toner container detachably attached to a toner-container holder of a main body of an image forming apparatus includes a container body that includes an opening, and discharges toner contained in the container body, from the opening; and a held portion that is held by the toner-container holder in a non-rotating manner. The held portion includes an open/close member for opening/closing the toner outlet in synchronization with an attachment/detachment operation of the held portion to/from the toner-container holder.

26 Claims, 76 Drawing Sheets

(AMENDED)

Related U.S. Application Data continuation-in-part of application No. PCT/JP2006/311391, filed on Jun. 7, 2006.

(60) Provisional application No. 60/850,675, filed on Oct. 11, 2006.

(30) Foreign Application Priority Data

| | | |
|---|---|---|
| Jul. 12, 2005 | (JP) | 2005-203370 |
| Aug. 1, 2005 | (JP) | 2005-223438 |
| Oct. 19, 2005 | (JP) | 2005-304216 |
| Oct. 28, 2005 | (JP) | 2005-313616 |
| Jan. 23, 2006 | (JP) | 2006-013293 |
| Feb. 7, 2006 | (JP) | 2006-029246 |

(52) U.S. Cl.
CPC ..... *G03G 15/0877* (2013.01); *G03G 15/0886* (2013.01); *G03G 2215/067* (2013.01); *G03G 2215/0668* (2013.01); *Y10S 222/01* (2013.01)

(58) Field of Classification Search
CPC ..... G03G 2215/0668; G03G 2215/067; Y10S 222/01
See application file for complete search history.

(56) References Cited

U.S. PATENT DOCUMENTS

| | | | | |
|---|---|---|---|---|
| 4,907,019 | A * | 3/1990 | Stephens | 347/86 |
| 5,381,217 | A | 1/1995 | Ishida | |
| 5,441,177 | A | 8/1995 | Yanagisawa | |
| 5,515,143 | A | 5/1996 | Shiotani | |
| 5,520,229 | A | 5/1996 | Yamada | |
| 5,530,531 | A * | 6/1996 | Girard | 399/120 |
| 5,722,014 | A | 2/1998 | Fike | |
| 5,765,079 | A | 6/1998 | Yoshiki et al. | |
| 5,794,108 | A | 8/1998 | Yoshizawa et al. | |
| 5,828,935 | A | 10/1998 | Tatsumi et al. | |
| 5,867,757 | A | 2/1999 | Okazaki et al. | |
| 5,890,040 | A | 3/1999 | Matsuoka et al. | |
| 5,903,806 | A | 5/1999 | Matsuoka et al. | |
| 5,970,290 | A | 10/1999 | Yoshiki et al. | |
| 5,991,584 | A | 11/1999 | Meyer et al. | |
| 6,104,902 | A | 8/2000 | Meyer et al. | |
| 6,169,864 | B1 | 1/2001 | Baxendell et al. | |
| 6,246,854 | B1 | 6/2001 | Kurosawa et al. | |
| 6,256,459 | B1 | 7/2001 | Hasegawa et al. | |
| 6,256,470 | B1 | 7/2001 | Taniyama et al. | |
| 6,292,644 | B1 | 9/2001 | Goto et al. | |
| 6,298,208 | B1 | 10/2001 | Kawamura et al. | |
| 6,526,243 | B2 | 2/2003 | Kim et al. | |
| 6,591,077 | B2 | 7/2003 | Yanagisawa et al. | |
| 6,628,915 | B2 | 9/2003 | Muramatsu et al. | |
| 6,665,508 | B2 | 12/2003 | Sudo et al. | |
| 6,678,492 | B1 | 1/2004 | Terazawa et al. | |
| 6,701,112 | B2 | 3/2004 | Kusano et al. | |
| 6,766,135 | B2 | 7/2004 | Wang et al. | |
| 6,785,497 | B1 | 8/2004 | Hasebe | |
| D500,076 | S | 12/2004 | Takuwa | |
| 6,859,634 | B2 | 2/2005 | Itoh et al. | |
| 6,882,817 | B2 | 4/2005 | Kita | |
| 6,895,191 | B2 | 5/2005 | Rommelmann et al. | |
| 6,917,779 | B2 | 7/2005 | Fujimori et al. | |
| 6,987,940 | B2 | 1/2006 | Tamura | |
| 7,076,192 | B2 | 7/2006 | Tsuda et al. | |
| 7,110,707 | B2 | 9/2006 | Nishitani | |
| 7,116,928 | B2 | 10/2006 | Muramatsu et al. | |
| D532,037 | S | 11/2006 | Tsuda et al. | |
| 7,133,629 | B2 | 11/2006 | Kita | |
| 7,162,189 | B2 | 1/2007 | Tsuda et al. | |
| 7,221,891 | B2 | 5/2007 | Matsumoto et al. | |
| 7,233,747 | B2 | 6/2007 | Tomitaka | |
| 7,248,824 | B2 | 7/2007 | Takami | |
| 7,277,664 | B2 | 10/2007 | Katsuyama et al. | |
| 7,313,349 | B2 | 12/2007 | Suzuki et al. | |
| 7,346,299 | B2 | 3/2008 | Muramatsu et al. | |
| 7,398,038 | B2 | 7/2008 | Tsuda et al. | |
| 7,450,891 | B2 | 11/2008 | Muramatsu et al. | |
| 7,480,476 | B2 | 1/2009 | Hosokawa et al. | |
| 7,515,855 | B2 | 4/2009 | Katsuyama et al. | |
| 7,536,139 | B2 | 5/2009 | Katsuyama et al. | |
| 7,577,379 | B2 | 8/2009 | Kita et al. | |
| D599,845 | S | 9/2009 | Kurenuma et al. | |
| 7,590,374 | B2 | 9/2009 | Takami | |
| 7,593,674 | B2 | 9/2009 | Matsumoto et al. | |
| D602,985 | S | 10/2009 | Yoshizawa | |
| 7,603,054 | B2 | 10/2009 | Katsuyama et al. | |
| 7,747,202 | B2 | 6/2010 | Taguchi et al. | |
| 7,840,167 | B2 | 11/2010 | Taguchi et al. | |
| 2002/0034398 | A1 | 3/2002 | Higeta et al. | |
| 2002/0114646 | A1 | 8/2002 | Sudo et al. | |
| 2003/0219263 | A1 | 11/2003 | Tsuzuki | |
| 2003/0235436 | A1 | 12/2003 | Kasahara et al. | |
| 2004/0071481 | A1 | 4/2004 | Katsuyama | |
| 2004/0131389 | A1 * | 7/2004 | Tazawa et al. | 399/258 |
| 2004/0131390 | A1 | 7/2004 | Kita | |
| 2004/0131392 | A1 | 7/2004 | Matsumoto et al. | |
| 2004/0223790 | A1 | 11/2004 | Hosokawa et al. | |
| 2004/0247344 | A1 | 12/2004 | Fujii et al. | |
| 2005/0041998 | A1 | 2/2005 | Fujii et al. | |
| 2005/0111858 | A1 | 5/2005 | Nakazato | |
| 2005/0196180 | A1 | 9/2005 | Harumoto | |
| 2005/0226655 | A1 | 10/2005 | Katsuyama et al. | |
| 2005/0226656 | A1 | 10/2005 | Tsuda et al. | |
| 2006/0034642 | A1 | 2/2006 | Taguchi et al. | |
| 2006/0099012 | A1 | 5/2006 | Kita et al. | |
| 2006/0120762 | A1 | 6/2006 | Katsuyama | |
| 2006/0210319 | A1 | 9/2006 | Katsuyama | |
| 2007/0154243 | A1 | 7/2007 | Taguchi et al. | |
| 2007/0253745 | A1 | 11/2007 | Maruyama | |
| 2010/0254732 | A1 | 10/2010 | Taguchi et al. | |

FOREIGN PATENT DOCUMENTS

| | | |
|---|---|---|
| EP | 1 542 088 | 6/2005 |
| JP | 6-149047 | 5/1994 |
| JP | 6-266227 | 9/1994 |
| JP | 7-2389 | 1/1995 |
| JP | 10-63078 | 3/1998 |
| JP | 10-063084 | * 3/1998 |
| JP | 2000-172060 | 6/2000 |
| JP | 2000-310901 | 11/2000 |
| JP | 2000-338758 | 12/2000 |
| JP | 2001-5286 | 1/2001 |
| JP | 2001-22230 | 1/2001 |
| JP | 2004-42626 | 2/2001 |
| JP | 3178749 | 4/2001 |
| JP | 2001-154473 | 6/2001 |
| JP | 2001-235932 | 8/2001 |
| JP | 2001-235937 | 8/2001 |
| JP | 2001-242692 | 9/2001 |
| JP | 2002-31943 | 1/2002 |
| JP | 2002-174947 | 6/2002 |
| JP | 2002-287497 | 10/2002 |
| JP | 2002-302169 | 10/2002 |
| JP | 2002-307737 | 10/2002 |
| JP | 2003-233248 | 8/2003 |
| JP | 2003-255686 | 9/2003 |
| JP | 2003-341759 | 12/2003 |
| JP | 2004-4559 | 1/2004 |
| JP | 2004-18138 | 1/2004 |
| JP | 2004-139031 | 5/2004 |
| JP | 2004-161371 | 6/2004 |
| JP | 2004-161373 | 6/2004 |
| JP | 2004-287404 | 10/2004 |
| JP | 3628539 | 12/2004 |
| JP | 2005-31109 | 2/2005 |
| JP | 2005-203370 | 7/2005 |
| JP | 2005-345773 | 12/2005 |

(56) References Cited

FOREIGN PATENT DOCUMENTS

| | | |
|---|---|---|
| TW | 1249088 B | 2/2006 |
| WO | WO 2004/027522 | 4/2004 |

OTHER PUBLICATIONS

U.S. Appl. No. 12/857,124, filed Aug. 16, 2010, Taguchi, et al.
"Background of Developing Toner Container for Ricoh ImagioMP series Multifunctional System", Ricoh Company, Ltd., 2 pages (with English translation).
Taiwan Office Action No. 09920273500 dated Apr. 26, 2010 with English translation.
Taiwan Office Action No. 09920343030 dated May 21, 2010 with English translation.
Extended European Search Report issued Aug. 31, 2011, in European Patent Application No. 06757098.6.

* cited by examiner

FIG.7 (AMENDED)
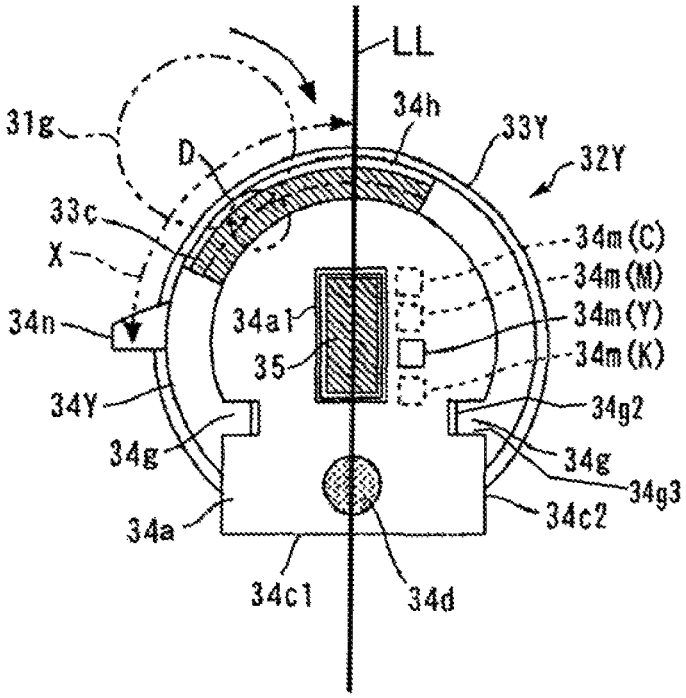

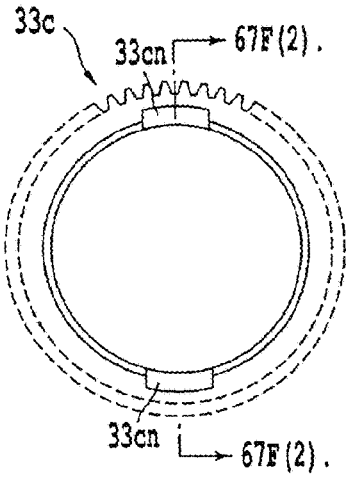
Fig. 67F(1)
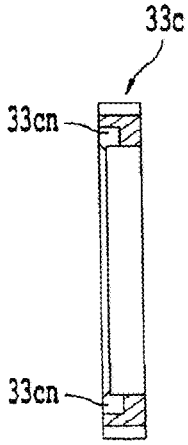
Fig. 67F(2)
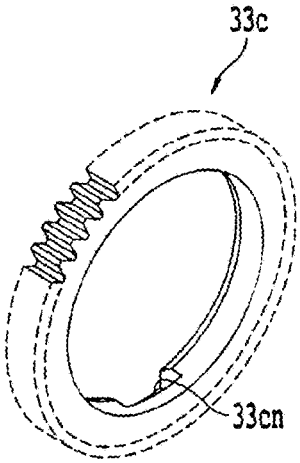
Fig. 67F(3)

TONER CONTAINER AND IMAGE FORMING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a division of U.S. application Ser. No. 11/566,897 filed Dec. 5, 2006, now U.S. Pat. No. 7,835,675 which claims the benefit of U.S. Provisional Application Ser. No. 60/850,675, filed Oct. 11, 2006 and entitled "Toner Container and Image Forming Device", each of which is incorporated herein by reference.

The inventions in this application are related to the inventions disclosed in the following Japanese patent applications: 2005-167298 filed Jun. 7, 2005, 2005-198355 filed Jul. 7, 2005, 2005-203370 filed Jul. 12, 2005, 2005-223438 filed Aug. 1, 2005, 2005-304216 filed Oct. 19, 2005, 2005-313616 filed Oct. 28, 2005, 2006-013293 filed Jan. 23, 2006, and 2006-029246 filed Feb. 7, 2006, and PCT patent application PCT/JP2006/311391 filed Jun. 7, 2006, each of which is incorporated herein by reference and may be utilized with any embodiment or feature disclosed herein.

BACKGROUND OF THE INVENTION

1. Field of the Invention

The present invention generally relates to a toner container detachably attached to the main body of an image forming apparatus to supply toner to be used in the image forming process, and the image forming apparatus including the same.

2. Description of the Related Art

In conventional image forming apparatuses using an electrophotographic system such as copying machines, printers, facsimiles, or multifunction products provided with these functions, a cylindrical toner container for supplying toner to a developing device is known (see, for example, Patent document 1, Patent document 2, and Patent document 3).

In Patent document 1 and the like, a toner container (toner bottle, agent storage container) replaceably installed in a toner-container holder (bottle holder, attachment portion) of the main body of the image forming apparatus mainly includes a container body and a to-be-held portion (hereinafter, "held portion") (cap portion, cap). A spiral-shaped projection is provided along the inner circumferential surface of the container body, and the toner contained in the container body is conveyed toward an opening through rotation of the container body. The held portion communicates with the opening of the container body, and it is non-rotatably held by the toner-container holder, i.e., it does not rotate with the container body. The toner output from the opening of the container body is discharged from a toner outlet provided in the held portion. Thereafter, the toner discharged from the toner outlet of the held portion is supplied to the developing device.

The toner container configured in the above manner can reduce toner stain upon replacement of the toner container as compared with toner containers (see, for example, Patent document 5 and Patent document 6) each of which has no held portion and directly supplies toner from the opening of the container body to the developing device. More specifically, because the toner outlet of the held portion is opened or closed in synchronization with part of attachment/detachment operation (rotating operation) of the toner container, such trouble that the user's hands become stained with toner by touching the toner outlet can be suppressed. Further, the toner outlet is formed downwardly in the lower part of the toner container in the vertical direction, and when the toner container is getting empty, the amount of toner near the toner outlet can be reduced due to the drop by its own weight. Therefore, the toner stain in the toner outlet upon replacement of the toner container is reduced.

More specifically, in Patent document 1 and the like, when the toner container is to be attached to the toner-container holder in the main body of the apparatus, at first, a main-body cover (stack portion) is opened upwardly and the toner-container holder is exposed. Then, the toner container is placed on the toner-container holder from the upper side thereof. Thereafter, a handle integrally provided to the held portion is held, so that the held portion is rotated (rotating operation). With this operation, the position of the toner container is finally fixed in the toner-container holder. Furthermore, the toner outlet provided in the held portion is moved to the lower part in response to the rotation of the held portion, and a shutter opens the toner outlet downwardly so as to resist the biasing force of a spring.

On the other hand, Patent document 4 or the like discloses a toner storage container having a bag container and a cap member. A toner outlet of the cap member is opened/closed in synchronization with a partial operation (rotating operation of an open/close folder) of the attachment/detachment operation of the toner storage container, for the purpose of reducing toner stain (toner scatter) occurring upon the attachment/detachment operation.

More specifically, when the toner storage container is attached to the apparatus body, at first, an open/close holder (open/close folder) is rotated around a hinge and the upper side of the open/close holder is exposed. Then, the toner storage container is set in the open/close holder. Thereafter, the open/close holder with the toner storage container set therein is rotated (rotating operation) around the hinge. With this operation, the position of the toner storage container is finally fixed in the apparatus body. Furthermore, a plug member (shutter member) is pushed by a nozzle (toner conveying pipe) in response to the rotation of the open/close holder so as to resist the biasing force of a spring, to open the toner outlet sealed by a packing (G seal).

Patent document 1: Japanese Patent Application Laid-Open No. 2004-287404

Patent document 2: Japanese Patent Application Laid-Open No. 2001-5286

Patent document 3: Japanese Patent Application Laid-Open No. 2000-310901

Patent document 4: Japanese Patent Application Laid-Open No. 2004-161371

Patent document 5: Japanese Patent Application Laid-Open No. 2000-338758

Patent document 6: Japanese Patent Application Laid-Open No. 2003-233248

Each of the toner containers disclosed in Patent documents 1 to 3 or so has less toner stain in the toner outlet as compared with that in Patent documents 5 and 6 or so, and therefore, it can be expected to obtain the effect of preventing such trouble that the user's hands become stained with toner by touching the toner outlet. However, the toner containers in Patent documents 1 to 3 or so are disadvantages in terms of operability/workability upon its attachment/detachment (replacement).

A first disadvantage is such that the attachment/detachment operation to/from the toner-container holder is implemented with a plurality of operations. More specifically, the attachment/detachment operation of the toner container includes the plurality of operations such as an operation of opening/closing the main-body cover, an operation of placing/removing the toner container on/from the toner-container holder, and an operation of rotating the held portion.

A second disadvantage is such that it is difficult for the user to check that the operation is performed properly nearly until the completion of the attachment operation. More specifically, the user cannot feel certain that the operation is correct at the point in time when the operation of opening the main-body cover and the operation of placing the toner container on the toner-container holder are complete. Thereafter, by rotating the held portion to fix the position of the held portion, the user gains a click feeling of the held portion, and feels certain that no erroneous operation is done.

A third disadvantage is such that the upper side of the toner-container holder is restricted in terms of layout. More specifically, to place the toner container on the toner-container holder from the upper side, the operation of opening/closing the main-body cover in the vertical direction is needed. Therefore, it is necessary to ensure space required for layout to open/close the main-body cover and place/remove the toner container. This causes reduction in operability/workability in attachment and detachment of the toner container when a scanner (document reader) or the like is provided above the toner-container holder.

On the other hand, in the toner storage container described in Patent document 4 or the like, the plug member is pushed by the nozzle in response to the opening operation of the open/close holder, to open the toner outlet sealed by the packing. Therefore, the effect of reducing occurrence of toner stain can be expected. However, the toner storage container according to Patent document 4 or the like also has some disadvantages in terms of operability/workability upon its attachment/detachment.

A first disadvantage is such that the toner amount of the toner storage container cannot be increased and the frequency of replacement of the toner storage container therefore increases. The toner storage container has a longitudinal bag container for containing toner. The bag container is arranged so that it stands vertically. Therefore, if the capacity of the bag container is to be increased, the height of the toner storage container needs to be increased. This increases the height of the open/close holder, thereby affecting the layout in the height of the whole image forming apparatus. Therefore, the toner amount of the toner storage container cannot be increased so much, and the replacement frequency increases thereby as compared with the toner containers (in which the horizontal direction is set as the longitudinal direction) according to Patent document 1 and the like.

A second disadvantage is such that it is difficult for the user to feel certain that no erroneous operation is done. More specifically, because the plug member opens/closes the toner outlet in synchronization with the open/close operation of the open/close holder, it is difficult for the user to feel if the toner outlet is actually opened or closed because the user does not touch the toner storage container during the operation.

The present invention has been achieved to solve at least the conventional problems, and it is an object of the present invention to provide a toner container with high operability/workability during its replacement and capable of reliably reducing occurrence of toner stain, and an image forming apparatus including the same.

SUMMARY OF THE INVENTION

It is an object of the present invention to at least partially solve the problems in the conventional technology.

According to an aspect of the present invention, a toner container detachably attached to a toner-container holder of a main body of an image forming apparatus includes a container body that contains toner and that includes an opening for discharging toner; and a held portion that includes a toner outlet for discharging the toner discharged from the opening, and that discharges the toner discharged from the opening, from the toner outlet, and is held by the toner-container holder in a non-rotating manner, wherein the held portion includes an open/close member for opening/closing the toner outlet in synchronization with an attachment/detachment operation of the held portion to/from the toner-container holder.

According to an aspect of the present invention, an image forming apparatus includes the above toner container.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic of the toner container when viewed from the M direction in FIG. 6;

FIGS. 67F(1)-67F(3) show a gear which is used with the toner bottle of FIGS. 67A-67E;

DETAILED DESCRIPTION OF THE PREFERRED EMBODIMENTS

Figure 1:
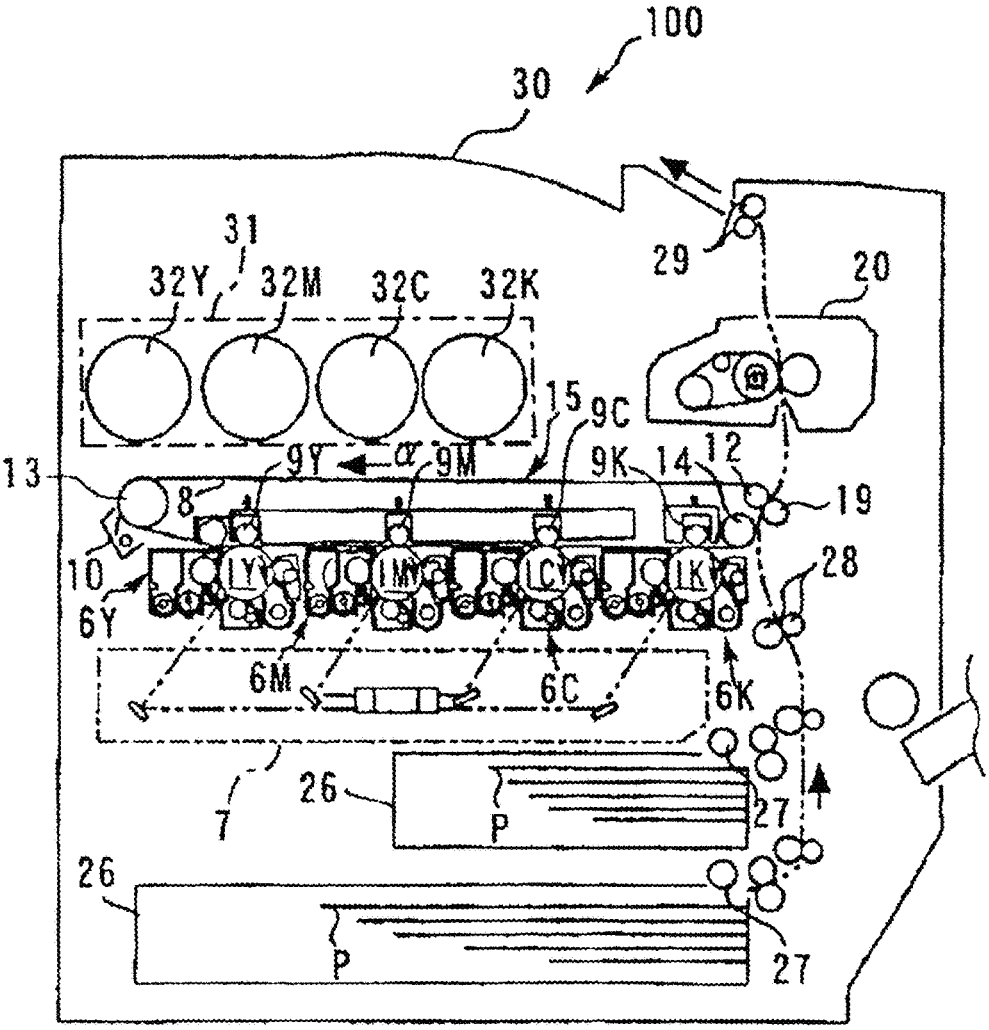
FIG. 1 is an overall schematic of a printer as an image forming apparatus.

Exemplary embodiments of the present invention are explained in detail below with reference to the attached drawings. In the drawings, the same or an equivalent portion is assigned with the same reference letter or numeral, and explanation of the overlapping portions are simplified or omitted if not necessary.

First Embodiment

A first embodiment of the present invention is explained in detail below with reference to FIG. 1 to FIG. 16.

The configuration and operation of the overall image forming apparatus are explained first with reference to FIG. 1 to FIG. 4.

Figure 2:
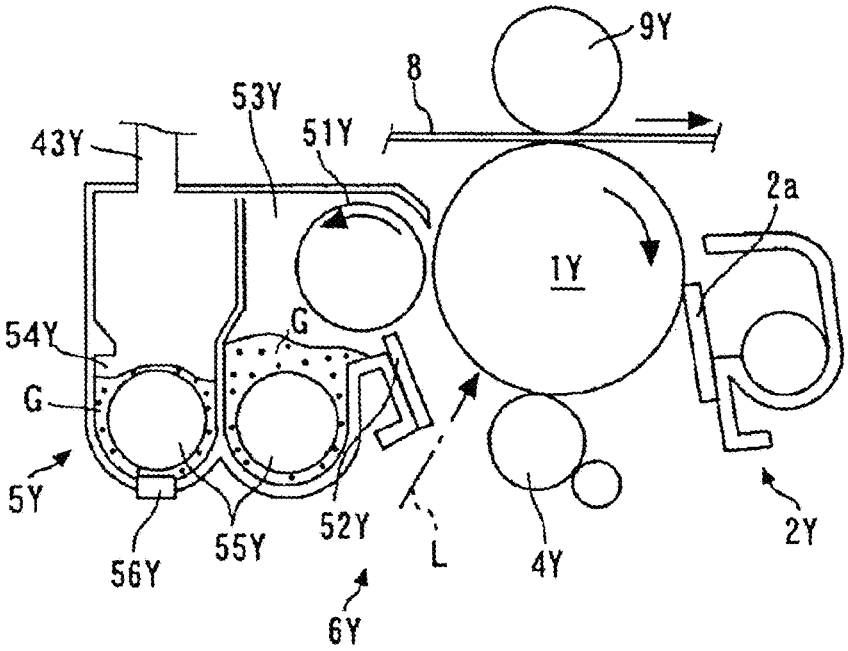
FIG. 2 is an enlarged view of an imaging unit of the image forming apparatus.
Figure 3:
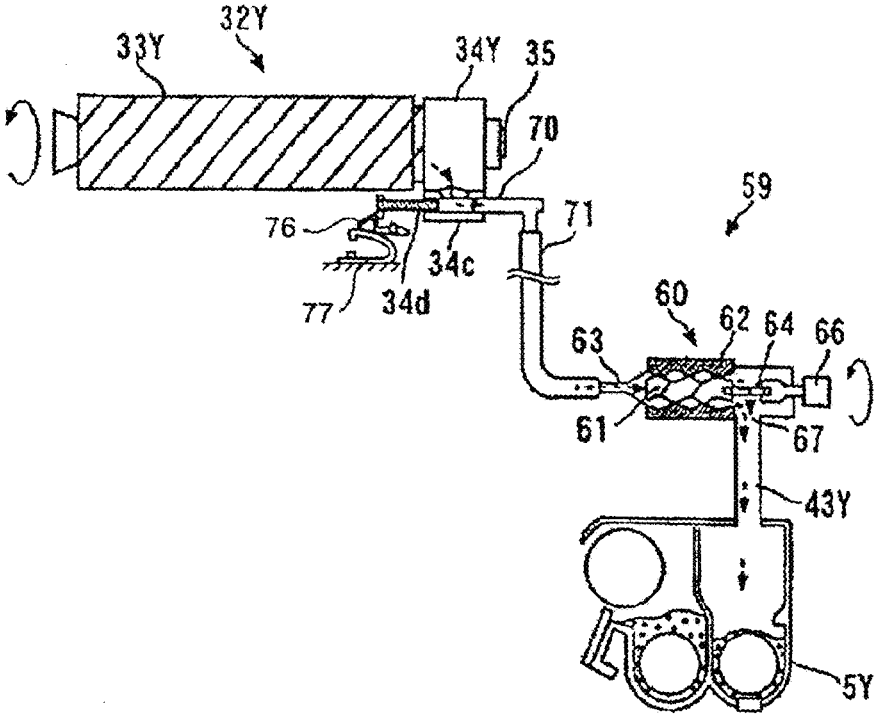
FIG. 3 is a schematic of a toner supply path of the image forming apparatus.
Figure 4:
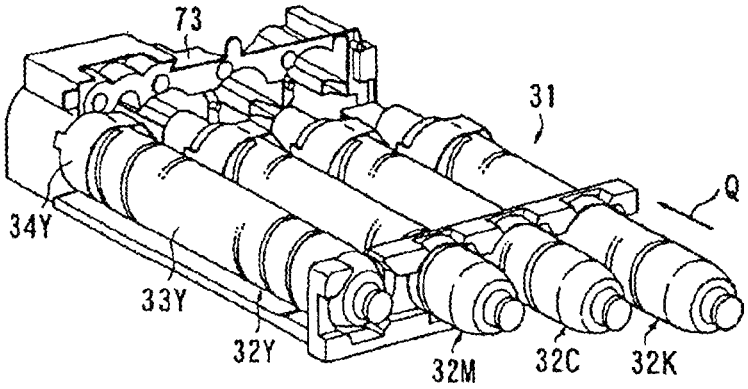
FIG. 4 is a perspective view of a part of a toner-container holder.

FIG. 1 is an overall schematic of a printer as the image forming apparatus, FIG. 2 is an enlarged view of an imaging unit of the image forming apparatus, FIG. 3 is a schematic of a toner supply path thereof, and FIG. 4 is a perspective view of a part of a toner-container holder.

As shown in FIG. 1, four toner containers 32Y, 32M, 32C, and 32K correspond to colors (yellow, magenta, cyan, and black) and are detachably (replaceably) arranged in a toner-container holder 31 which is provided in the upper side of the main body of the image forming apparatus 100.

Provided in the lower side of the toner-container holder 31 is an intermediate transfer unit 15. Imaging units 6Y, 6M, 6C, and 6K corresponding to the colors (yellow, magenta, cyan, and black) are arranged in a tandem manner so as to face an intermediate transfer belt 8 of the intermediate transfer unit 15.

Referring to FIG. 2, the imaging unit 6Y corresponding to yellow includes a photosensitive drum 1Y, and also includes a charger 4Y, a developing device 5Y (developing unit), a cleaning unit 2Y, and a decharger (not shown), which are arranged around the photosensitive drum 1Y. Imaging processes (charging process, exposing process, developing process, transfer process, and cleaning process) are preformed on the photosensitive drum 1Y, and a yellow image is formed on the photosensitive drum 1Y.

The other three imaging units 6M, 6C, and 6K have almost the same configuration as the imaging unit 6Y corresponding to yellow, except different toner colors to be used, and images corresponding to the respective toner colors are formed. Hereinafter, explanation of the other three imaging units 6M, 6C, and 6K is omitted, and only the imaging unit 6Y for yellow is explained below.

Referring to FIG. 2, the photosensitive drum 1Y is made to rotate in the clockwise in FIG. 2 by a drive motor (not shown). The surface of the photosensitive drum 1Y is uniformly charged at the position of the charger 4Y (charging process).

Thereafter, the surface of the photosensitive drum 1Y reaches a position of radiating a laser light L emitted from an exposing device 7 (see FIG. 1), where an exposing light is scanned to form an electrostatic latent image for yellow (exposing process).

Thereafter, the surface of the photosensitive drum 1Y reaches a position of facing the developing device 5Y, where the electrostatic latent image is developed and a yellow toner image is formed (developing process).

Then, the surface of the photosensitive drum 1Y reaches a position of facing the intermediate transfer belt 8 and a primary-transfer bias roller 9Y, where the toner image on the photosensitive drum 1Y is transferred to the intermediate transfer belt 8 (primary transfer process). At this time, a slight amount of non-transferred toner remains on the photosensitive drum 1Y.

Thereafter, the surface of the photosensitive drum 1Y reaches a position of facing the cleaning unit 2Y, where the non-transferred toner remaining on the photosensitive drum 1Y is mechanically collected by a cleaning blade 2a (cleaning process).

The surface of the photosensitive drum 1Y finally reaches a position of facing the decharger (not shown), where the residual potential on the photosensitive drum 1Y is removed.

The imaging processes are performed on the other imaging units 6M, 6C, and 6K in the same manner as those of the yellow imaging unit 6Y. In other words, the laser light L based on image information is radiated from the exposing device 7 provided in the lower side of the imaging unit toward each photosensitive drum of the imaging units 6M, 6C, and 6K. More specifically, the exposing device 7 emits the laser light L from its light source, and radiates the laser light L onto the photosensitive drum through a plurality of optical elements while scanning the laser light L by a polygon mirror which is rotated.

Then, respective color toner images formed on the photosensitive drums through the developing process are superposedly transferred on the intermediate transfer belt 8. In this manner, a color image is formed on the intermediate transfer belt 8.

Referring to FIG. 1, the intermediate transfer unit 15 includes the intermediate transfer belt 8, four primary-transfer bias rollers 9Y, 9M, 9C, and 9K, a secondary-transfer backup roller 12, a cleaning backup roller 13, a tension roller 14, and an intermediate-transfer cleaning unit 10. The intermediate transfer belt 8 is stretched and supported by three rollers 12 to 14, and is endlessly moved in the direction of an arrow (i.e., in the direction shown by the arrow a) in FIG. 1 by the rotation of the roller 12.

The four primary-transfer bias rollers 9Y, 9M, 9C, and 9K sandwich the intermediate transfer belt 8 with the photosensitive drum 1Y and photosensitive drums 1M, 1C, and 1K, to form each primary transfer nip. And the transfer bias inverse to the polarity of toner is applied to the primary-transfer bias rollers 9Y, 9M, 9C, and 9K.

Then, the intermediate transfer belt 8 moves along the arrow direction (a direction) and sequentially passes through the primary transfer nips of the primary-transfer bias rollers 9Y, 9M, 9C, and 9K. In this manner, the toner images for the colors on the photosensitive drums 1Y, 1M, 1C, and 1K are sequentially superposed on the intermediate transfer belt 8 to perform primary transfer.

Thereafter, the intermediate transfer belt 8 with the toner images for the colors superposedly transferred reaches the position of facing a secondary transfer roller 19. At this position, the secondary-transfer backup roller 12 sandwiches the intermediate transfer belt 8 with the secondary transfer roller 19 to form a secondary transfer nip. The four-color toner images formed on the intermediate transfer belt 8 are transferred to a transferred material P such as a transfer paper conveyed to the position of the secondary transfer nip. At this time, non-transferred toner which has not been transferred to the transferred material P remains on the intermediate transfer belt 8.

Thereafter, the intermediate transfer belt 8 reaches the position of the intermediate-transfer cleaning unit 10, where the non-transferred toner on the intermediate transfer belt 8 is collected.

In this manner, a series of the transfer process performed on the intermediate transfer belt 8 is completed.

The transferred material P conveyed to the position of the secondary transfer nip is conveyed thereto from a paper feed unit 26 provided in the lower side of the apparatus body 100 through a paper feed roller 27 and a registration roller pair 28.

More specifically, the transferred material P such as transfer paper is stored in plurality in the paper feed unit 26. When the paper feed roller 27 is made to rotate in the counterclockwise of FIG. 1, the uppermost transferred material P is fed to the rollers of the registration roller pair 28.

The transferred material P conveyed to the registration roller pair 28 once stops at the position of a roller nip between the registration roller pair 28 that stops its rotation. Then, the registration roller pair 28 is rotated in synchronization with the color images on the intermediate transfer belt 8, and the transferred material P is conveyed toward the secondary transfer nip. In this manner, a desired color image is transferred to the transferred material P.

The transferred material P with the color image transferred at the position of the secondary transfer nip is conveyed to the position of a fixing unit 20, where the color image transferred to the surface of the transferred material P is fixed on the transferred material P under heat and pressure by a fixing roller and a pushing roller.

Thereafter, the transferred material P is ejected to the outside the apparatus through rollers of a paper-discharge roller pair 29. The transferred material P ejected to the outside the apparatus by the paper-discharge roller pair 29 is sequentially stacked on the stack portion 30, as an output image.

In this manner, a series of the imaging forming processes in the image forming apparatus is completed.

The configuration and the operation of the developing device in the imaging unit are explained in further detail below with reference to FIG. 2.

The developing device 5Y includes a developing roller 51Y that faces the photosensitive drum 1Y, a doctor blade 52Y that faces the developing roller 51Y, two conveyor screws 55Y provided in developer storage units 53Y and 54Y, and the density detection sensor 56Y for detecting toner density in the developer. The developing roller 51Y includes a magnet fixed inside thereof and a sleeve rotating around the magnet. Two-component developer G containing carrier and toner is stored in the developer storage units 53Y and 54Y. The developer storage unit 54Y communicates with a toner conveying pipe 43Y through the opening formed in the upper side of the developer storage unit 54Y.

The developing device 5Y configured in the above manner operates as follows.

The sleeve of the developing roller 51Y rotates in the arrow direction (counterclockwise) of FIG. 2. The developer G carried on the developing roller 51Y by the magnetic field formed by the magnet moves along the developing roller 51Y associated with rotation of the sleeve.

The developer G in the developing device 5Y is controlled so that the proportion (toner density) of the toner in the developer is in a predetermined range. More specifically, the toner contained in the toner container 32Y is supplied to the developer storage unit 54Y through a toner supply device 59 (see FIG. 3) according to toner consumption in the developing device 5Y. It is noted that each configuration and operation of the toner supply device 59 and the toner container 32Y are explained in detail later.

Thereafter, the toner supplied to the developer storage unit 54Y circulates (movement in the vertical direction on the paper of FIG. 2) in the two developer storage units 53Y and 54Y while being mixed with the developer G and stirred. The toner in the developer G is attracted to the carrier by frictional charge with the carrier, and is carried on the developing roller 51Y together with the carrier by the magnetic force formed on the developing roller 51Y.

The developer G carried on the developing roller 51Y is conveyed in the arrow direction (counterclockwise) of FIG. 2 to reach the position of the doctor blade 52Y. At this position, the amount of developer is made appropriate, and then the developer G on the developing roller 51Y is conveyed to the position (developing region) of facing the photosensitive drum 1Y. The toner is attracted to the latent image formed on the photosensitive drum 1Y by the electric field formed in the developing region. Then, the developer G remaining on the developing roller 51Y reaches the upper side of the developer storage unit 53Y associated with the rotation of the sleeve, where the developer G is separated from the developing roller 51Y.

The toner supply device 59 that leads the toner contained in the toner container 32Y (agent storage container) to the developing device 5Y is explained in detail below with reference to FIG. 3.

For easy understanding, FIG. 3 depicts changed arrangement of the toner container 32Y, toner supply paths 43Y, 60, 70, and 71, and the developing device 5Y. Actually, in FIG. 3, the longitudinal direction of the toner container 32Y and part of the toner supply path is arranged in the vertical direction on the paper (see FIG. 1).

Referring to FIG. 4, the toner (powder agent) in the toner containers 32Y, 32M, 32C, and 32K arranged in the toner-container holder 31 of the apparatus body 100 is supplied to each of the developing devices if necessary through the toner supply paths provided for each toner color according to each toner consumption in the developing devices for the colors. The four toner supply paths have almost the same configuration as one other except different toner color used for each imaging process.

More specifically, the toner container 32Y is set in the toner-container holder 31 of the apparatus body 100, and a nozzle 70 (toner conveying pipe) of the toner-container holder 31 is connected to a held portion 34Y (cap) of the toner container 32Y. A plug member 34d (open/close member) of the toner container 32Y is sandwiched between the nozzle 70 and a claw member 76, and opens the toner outlet (supply port) of the held portion 34Y in this state. This allows the toner contained in a container body 33Y of the toner container 32Y to be conveyed into the nozzle 70 through the toner outlet.

On the other hand, the other end of the nozzle 70 is connected to one end of a tube 71 as a conveyor tube (71). The tube 71 is made of flexible material excellent in toner resistance, and the other end thereof is connected to a screw pump 60 (Mohno pump, powder pump) of the toner supply device 59.

The tube 71 being the conveyor tube (71) is formed so that its internal diameter is 4 to 10 mm. The material of the tube 71 is allowed to use a rubber material such as polyurethane, nitrile, EPDM, and silicone, and a resin material such as polyethylene, and nylon. Such a flexible tube 71 is used to enhance flexibility in layout of the toner supply path, thus downsizing of the image forming apparatus.

The screw pump 60 is a suction-type uniaxial eccentric screw pump, and includes a rotor 61, a stator 62, a suction port 63, a universal joint 64, and a motor 66. The rotor 61, the stator 62, and the universal joint 64 are accommodated in a casing (not shown). The stator 62 is a female screw member made of an elastic material such as rubber, and a spiral-shaped groove with double pitch is formed along the inside of the stator 62. The rotor 61 is a male screw member in which an axis made of a rigid material such as metal is spirally formed, and is rotatably inserted in the stator 62. One end of the rotor 61 is rotatably joined to the motor 66 through the universal joint 64.

In the first embodiment, the spiral direction (turning direction) and the rotational direction of the rotor 61 are set so as to match the spiral direction (turning direction) and the rotational direction of the projection 33b formed in the container body 33Y of the toner container 32Y.

The screw pump 60 configured in the above manner generates suction force at the suction port 63 (air in the tube 71 is sent out to generate a negative pressure in the tube 71) by rotating the rotor 61 of the stator 62 by the motor 66 in a predetermined direction (counterclockwise when viewed from the upstream side in the toner conveying direction). This allows the toner in the toner container 32Y with the air to be sucked to the suction port 63 through the tube 71. The toner sucked to the suction port 63 is sent into a gap between the stator 62 and the rotor 61 and is fed to the other end side along the rotation of the rotor 61. The toner fed is discharged from a feed port 67 of the screw pump 60, to be supplied to the developing device 5Y through the toner conveying pipe 43Y (movement in the arrow direction indicated by a dotted line in FIG. 3).

In the first embodiment, the rotor 61 of the screw pump 60 is made to rotate in the counterclockwise viewed from the upstream side in the toner conveying direction. The spiral direction (turning direction) of the rotor 61 is set to be a rightward direction. This setting and rotation of the rotor 61 cause a spiral air flow spiraling in clockwise to be created in the screw pump 60.

The toner container is explained below with reference to FIG. 5 to FIG. 9.

As explained with reference to FIG. 1 and FIG. 4, the four substantially cylindrical toner containers 32Y, 32M, 32C, and 32K (toner bottles) are detachably provided in the toner-container holder 31. The toner containers 32Y, 32M, 32C, and 32K are replaced with new ones when they come to the end of their lives (when almost all of toner contained is consumed and the container becomes empty). The toner of each color contained in the toner containers 32Y, 32M, 32C, and 32K is supplied as necessary to each developing device of the imaging units 6Y, 6M, 6C, and 6K through each toner supply path explained with reference to FIG. 3.

Figure 5:
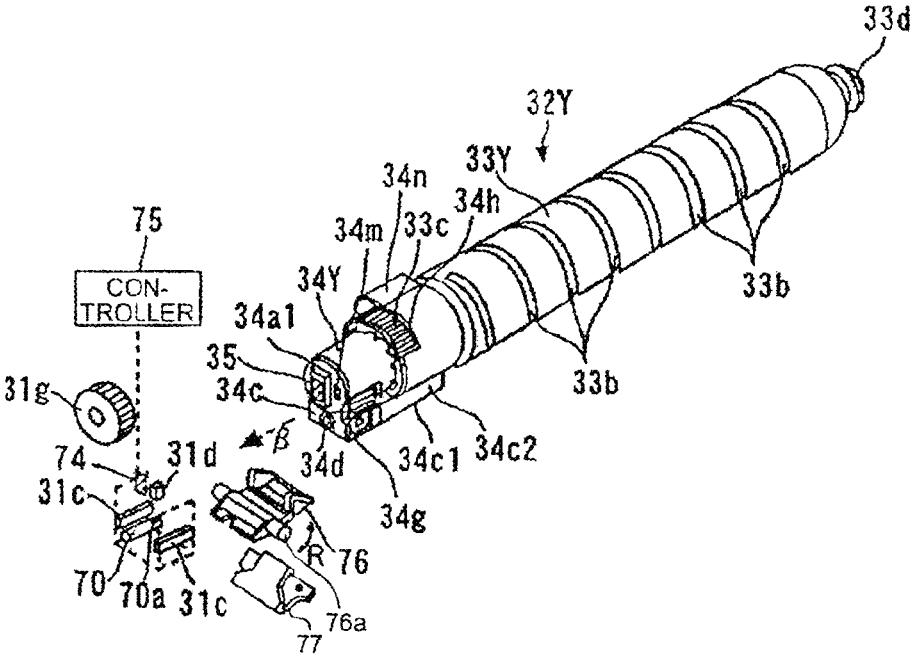
FIG. 5 is a perspective view of a toner container.
Figure 6:
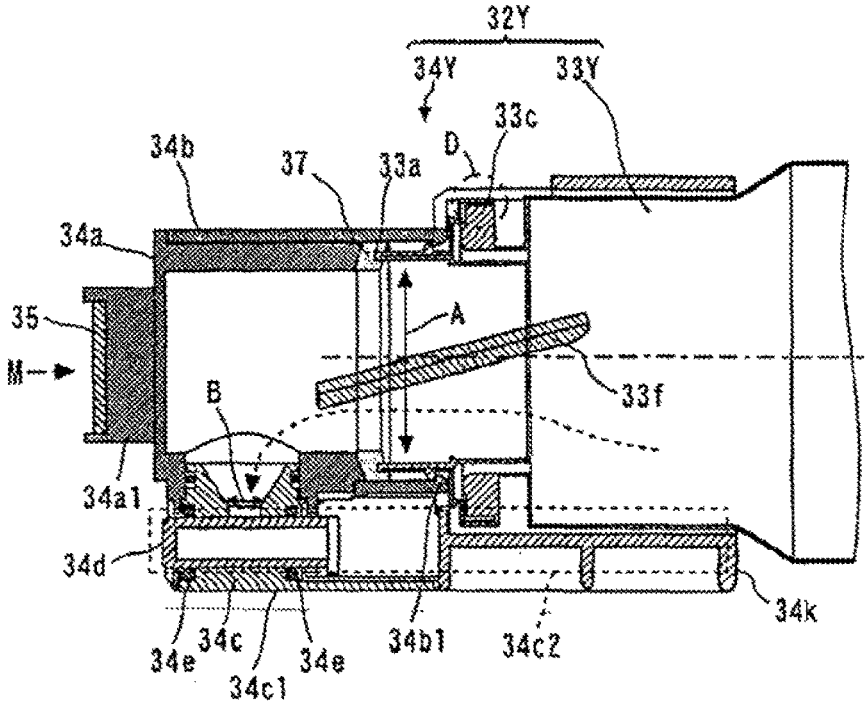
FIG. 6 is a cross-section of a head side of the toner container.
Figure 8A:
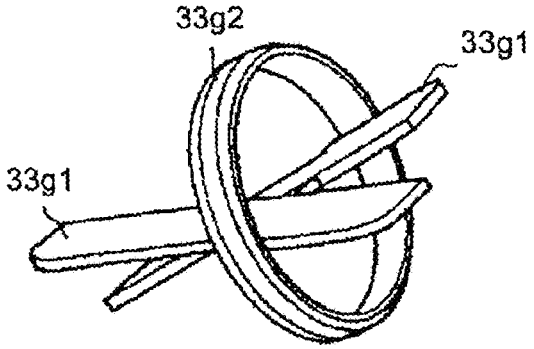
FIG. 8A is a perspective view of one example of a stirring member.
Figure 8B:
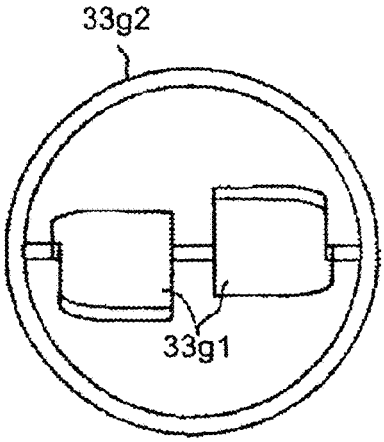
FIG. 8B is a schematic of the one example of the stirring member when viewed from the M direction in FIG. 6.
Figure 8C:
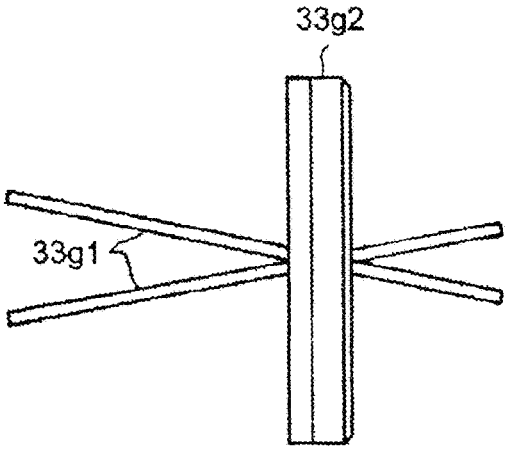
FIG. 8C is a side view of the one example of the stirring member.
Figure 9:
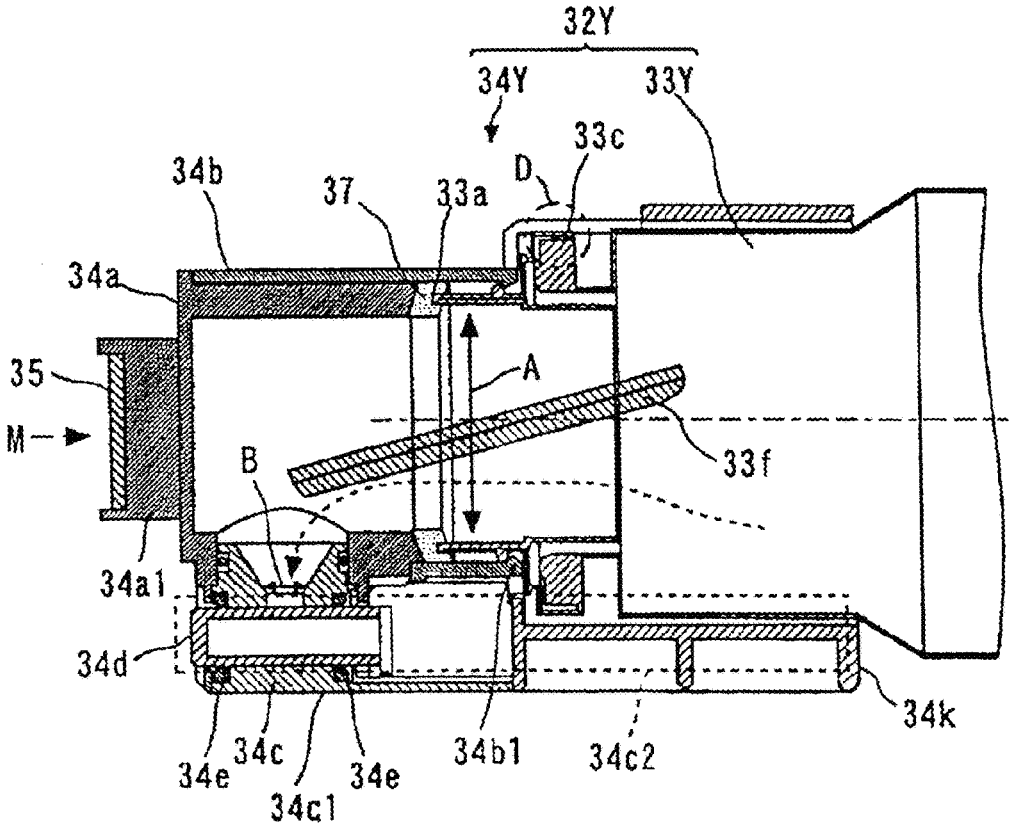
FIG. 9 is a cross-section of another example of the head side of the toner container.

FIG. 5 is a perspective view of the toner container 32Y. FIG. 6 is a cross-section of a head side (the side where the held portion 34Y is provided) of the toner container 32Y. FIG. 7 is a schematic of the toner container 32Y of FIG. 6 when viewed from the M direction in FIG. 6. FIG. 8A is a perspective view of one example of a stirring member, FIG. 8B is a schematic of the one example of the stirring member when viewed from the M direction in FIG. 6, and FIG. 8C is a side view of the one example of the stirring member. FIG. 9 is a cross-section of another example of the head side of the toner container 32Y.

The other three toner containers 32M, 32C, and 32K have almost the same configuration as the toner container 32Y containing yellow toner, except different toner colors contained and locations of a concave portion 34m and a convex portion 34n. Hereinafter, explanation of the other three toner containers 32M, 32C, and 32K is omitted, and only the toner container 32Y containing yellow toner is explained below.

As shown in FIG. 5, the toner container 32Y mainly includes the container body 33Y and the held portion 34Y (bottle cap *or end*) provided in the head thereof.

The head of the container body 33Y includes a gear 33c integrally rotating with the container body 33Y, and an opening A (see FIG. 6). The opening A is provided in the head of the container body 33Y (front end position when it is attached), and is used to discharge the toner contained in the container body 33Y into the space (cavity) of the held portion 34Y.

The gear 33c is engaged with a drive gear 31g of a drive unit provided in the toner-container holder 31 of the apparatus body 100, to rotate the container body 33Y around a rotating axis (indicated by a chain line of FIG. 6). More specifically, the gear 33c is exposed from a notched portion 34h formed in the held portion 34Y and engaged with the drive gear 31g of the apparatus body 100 in an engagement position D shown in FIG. 6 and FIG. 7. The driving force is transmitted from the drive gear 31g to the gear 33c, and the container body 33Y is made to rotate in the counterclockwise of FIG. 7. In the first embodiment, the drive gear 31g and the gear 33c are spur gears.

In the first embodiment, the toner container 32Y and the apparatus body 100 are configured so that the held portion 34Y (or the container body 33Y) is biased downwardly by the force applied from the drive gear 31g to the gear 33c when the drive gear 31g rotates in the arrow direction (clockwise) of FIG. 7 (mainly during toner supply).

More specifically, referring to FIG. 7, the engagement position D between the gear 33c and the drive gear 31g is provided in a range X from the uppermost portion of the gear 33c to the downstream side thereof turning ¼ rotation (which does not include the uppermost portion and the position of the gear 33c turning ¼ rotation).

Based on such a configuration as above, component force acting downward in the vertical direction is produced in force, by the drive gear 31g, which vertically acts on a gear surface of the gear 33c. Therefore, seal capability for the nozzle 70 communicating with a toner outlet B is maintained without large vertical fluctuation of the held portion 34Y, thus preventing toner scattering from near the toner outlet B.

*In FIG. 7, a vertical line LL is shown at the front of the toner container 32Y. The vertical line LL is centered at a front of the toner container 32Y and intersects the plug member 34d. The engaging portion 34g includes a flat vertical surface 34g2 and a lower flat horizontal surface 34g3 that faces upwardly. The flat horizontal surface 34g3 contacts the sliding portion 34c2 which is a flat vertical surface. The flat vertical surface 34g2 is lower than the sliding portion 34c2. The flat vertical surface 34g2 is closer to the vertical line LL than the sliding portion 34c2. On the opposite side of the vertical line LL are a flat vertical surface which corresponds to the flat vertical surface 34g2 and a flat vertical surface which corresponds to the sliding portion 34c2. The flat vertical surface 34g2 and corresponding portion on the opposite side of line LL are a first pair of vertical exterior surfaces. The flat vertical surface which corresponds to the sliding portion 34c2 and the corresponding flat vertical surface on the opposite side of the vertical line LL are a second pair of vertical exterior surfaces.*

Referring to FIG. 5, a gripper 33d is provided in a rear end portion (bottom) of the container body 33Y so that the user can grip it for attachment/detachment of the toner container 32Y.

A spiral-shaped projection 33b is provided along the inner circumferential surface of the container body 33Y (spiral-shaped groove when viewed from the outer peripheral side). The spiral-shaped projection 33b is used to discharge the toner from the opening A by rotating the container body 33Y in a predetermined direction. The container body 33Y configured in this manner and the gear 33c provided along its circumferential surface can be manufactured by blow molding.

The toner container 32Y according to the first embodiment has a stirring member 33f rotating together with the container body 33Y provided in the opening A (see FIG. 6). The stirring member 33f is a rod-shaped member or a plate member which is extended from the space in the held portion 34Y toward the container body 33Y and is provided at an angle to the rotating axis (indicated by the chain line in FIG. 6). Rotation of the stirring member 33f together with the container body 33Y allows improvement of toner discharging capability from the opening A. Particularly, as shown in FIG. 8A, FIG. 8B, and FIG. 8C, the ring member 33g2 with a pair of plate members 33g1, in which their respective slopes are opposite to each other, is provided at the position being a point symmetry with respect to the center of rotation. And when such a ring member 33g2 is fixed into the opening A to form the stirring member, the toner can continuously be scooped and discharged by its rotational action, and discharge capability is further improved. As shown in FIG. 9, if the stirring member is extended up to a vertical toner discharge path formed in a mortar shape (stirring member 33h), the toner discharge capability is assumed to be further improved.

In the first embodiment, the container body 33Y of the toner container 32Y is made to rotate in the counterclockwise viewed from the upstream side in the toner conveying direction. Moreover, the spiral direction (turning direction) of the projection 33b in the container body 33Y is set to a rightward direction.

Referring to FIG. 5 and FIG. 6, the held portion 34Y includes a cap main portion 34a, a cap cover 34b *also referred to as a front portion*, a holder 34c, the plug member 34d as the open/close member, a packing 34e, and an ID chip 35. Referring to FIG. 5 and FIG. 7, an engaging portion 34g (groove portion) with which a positioning member 31c of the toner-container holder 31 is engaged is provided on both sides of the held portion 34Y. The concave portion 34m into which a fitting member 31d of the toner-container holder 31 is fitted is provided on the end face of the held portion 34Y. The convex portion 34n fitting into another fitting member (not shown) of the toner-container holder 31 is provided on the circumferential surface of the held portion 34Y. Further, the notched portion 34h from which a part of the gear 33c is exposed is provided on the upper side of the held portion 34Y.

The held portion 34Y communicates with the container body 33Y through the opening A, and discharges the toner discharged from the opening A, from the toner outlet B (movement along the arrow direction indicated by the dotted line of FIG. 6).

In the first embodiment, the cavity (space) formed inside the held portion 34Y is almost cylindrically formed. The toner discharge path (vertical path) from the almost cylindrical cavity formed inside the held portion 34Y up to the toner outlet B is formed in a mortar shape. With this shape, the toner delivered through the rotation of the container body 33Y is temporarily stacked in the mortar, and the suction force of the screw pump 60 on the side of the apparatus body 100 is transmitted to the toner efficiently stacked. Therefore, toner conveyance capability of the toner which is discharged from the toner outlet B and moves along the inside of the tube 71 is improved.

The held portion 34Y does not follow the rotation of the container body 33Y, but is held in a non-rotating manner by a holding portion 73 (see FIG. 4 and FIG. 10) of the toner-container holder 31 while the engaging portion 34g is engaged with the positioning member 31c.

The cap cover 34b of the held portion 34Y is bonded to the circumferential surface of the cap main portion 34a. A claw 34b1 is provided at the front of the cap cover 34b. The claw 34b1 is engaged with an engaging member formed in the head of the container body 33Y, and the container body 33Y is thereby held relatively rotatably with respect to the held portion 34Y. To smoothly rotate the container body 33Y, the claw 34b1 of the held portion 34Y and the engaging member of the container body 33Y are engaged with each other by maintaining appropriate clearance therebetween.

A seal member 37 is adhered to the surface of the held portion 34Y that faces a front end 33a around the opening A of the container body 33Y. The seal member 37 is used for sealing the gap which is around the opening A and is between the surfaces of the container body 33Y and the held portion 34Y that mutually face each other, and is made of an elastic material such as polyurethane foam.

The holder 34c is provided in the lower side of the held portion 34Y. Provided in the holder 34c is the plug member 34d (shutter) as the open/close member for opening/closing the toner outlet B in synchronization with the attachment/detachment operation of the toner container 32Y. More specifically, the plug member 34d is movable in the holder 34c in the horizontal direction of FIG. 6 so as to be surrounded by sliding portions 34c1 and 34c2. A space (concave portion) is provided in the bottom face of the holder 34c so that the claw member 76 of the apparatus body 100 is engaged with the plug member 34d and the plug member 34d relatively moves in the space. The packing 34e such as G seal is provided on the both sides of the plug member 34d to prevent toner leakage from near the plug member 34d. Furthermore, packing such as an O-ring is provided in the engaging portion between the holder 34c and the cap main portion 34a, to prevent toner leakage from both of the gaps.

The toner container 32Y is set in the toner-container holder 31, and then the claw member 76 (see FIG. 5 and FIG. 14) is engaged with the right side of the plug member 34d, the claw member 76 being the bias member for biasing the plug member 34d in the direction in which the toner outlet B is closed. The claw member 76 is explained in detail later.

The ID chip 35 of the held portion 34Y is configured to face a communication circuit 74 (terminal) of the toner-container holder 31 with a predetermined distance therebetween, in synchronization with the attachment operation of the toner container 32Y to the toner-container holder 31. More specifically, the ID chip 35 is provided on a protrusion portion 34a1 of the held portion 34Y that protrudes in the direction (i.e., in the direction shown by the arrow b in FIG. 5) in which the held portion 34Y is attached to the toner-container holder 31, and which is provided on the plane orthogonal to the attachment direction. The ID chip 35 performs non-contact communication (radio communication) with the communication circuit 74 of the apparatus body while the held portion 34Y is held in the toner-container holder 31.

The ID chip 35 previously stores various types of information related to the toner container 32Y. On the other hand, the communication circuit 74 of the toner-container holder 31 exchanges the information by radio with the ID chip 35 while the toner container 32Y is set in the toner-container holder 31. More specifically, the information stored in the ID chip 35 is transmitted to a controller 75 (see FIG. 5) of the apparatus body 100 through the communication circuit 74, or the information for the apparatus body 100 acquired by the controller 75 is transmitted to the ID chip 35 and stored therein.

The ID chip 35 stores information regarding toner such as toner colors, serial numbers of toner (production lot), and dates of toner production, and information regarding recycling of the toner container 32Y such as number of times of recycling, dates of recycling, and recycling manufacturers. When the toner container 32Y is set in the toner-container holder 31, the information stored in the ID chip 35 is transmitted to the controller 75 of the apparatus body 100 through the electric circuit 74. The apparatus body 100 is optimally controlled based on these pieces of information. For example, if the toner color is different from the toner color that should be set in the toner-container holder, the operation of the toner supply device 59 can be stopped, or imaging conditions can be changed according to the serial number or the recycling manufacturer.

Provided in the holder 34c of the held portion 34Y are the sliding portions 34c1 and 34c2 for sliding along the toner-container holder 31 following the operation of its attachment/detachment to/from the toner-container holder 31.

More specifically, a first sliding portion 34c1 is a flat portion formed so as to be parallel with a sliding face 31a (which is a plane with a flat face formed upward; see FIG. 10, and FIG. 45 and FIG. 46 explained later) of the toner-container holder 31, the flat portion being provided in the bottom of the held portion 34Y with which the attachment/detachment is operated. Furthermore, a second sliding portion 34c2 is a flat portion formed so as to be parallel with a sliding face 31b (which is a plane with a flat face formed sideward; see FIG. 10, and FIG. 45 and FIG. 46 explained later) of the toner-container holder 31, the flat portion being provided in the side portion of the held portion 34Y with which the attachment/detachment is operated.

Referring to FIG. 5 and FIG. 7, the concave portion 34m fitted with the fitting member 31d of the toner-container holder 31 is provided in a portion which is an end face of the held portion 34Y and is near the protrusion portion 34a1. The concave portion 34m is formed so as to be fitted with the corresponding fitting member 31d when the attachment operation to the toner-container holder 31 is correct (when the toner-container holder 31 is attached to the normal position).

More specifically, as shown in FIG. 7, positions of the concave portions 34m are differently arranged from one another according to each color of toner contained in the toner containers (container bodies). The concave portion 34m (C) of the toner container corresponding to cyan and a corresponding fitting member (not shown) of the toner-container holder are arranged in the uppermost side, and the concave portion 34m (M) of the toner container corresponding to magenta and a corresponding fitting member (not shown) of the toner-container holder are arranged in the upper side of the middle stage. The concave portion 34m (Y) of the toner container corresponding to yellow and the corresponding fitting member 31d of the toner-container holder are arranged in the lower side of the middle stage, and the concave portion 34m (K) of the toner container corresponding to black and a corresponding fitting member (not shown) of the toner-container holder are arranged in the lowermost side.

This configuration allows prevention of such a failure that a toner container for an inappropriate color (e.g., toner container for yellow) is set in a toner-container holder for a predetermined color (e.g., cyan toner-container holder) and this causes a desired color image not to be formed.

Likewise, referring to FIG. 5 and FIG. 7, the convex portion 34n with which another fitting member (not shown) is fitted is provided on the circumferential surface of the held portion 34Y. Like to the concave portion 34m, the convex portion 34n fitted into a corresponding fitting member when the toner container is properly attached to the toner-container holder 31. It is configured that positions of the convex portions 34n are arranged differently from one other according to each color of toner contained in the toner container (container body).

Such a configuration as above allows prevention of miss-setting of the toner container in the toner-container holder, similarly to the concave portion 34m.

In the first embodiment, as toner contained in the toner containers 32Y, 32M, 32C, and 32K, toner formed so that the following relations hold is used, where Dv (mm) is volume average particle size and Dn (mm) is number average particle size:

$$3 \leq Dv \leq 8 \quad (1)$$

$$1.00 \leq Dv/Dn \leq 1.40 \quad (2)$$

Therefore, toner particles are selected according to an image pattern in the developing process and excellent image quality is maintained, and satisfactory developing capability is maintained even if the toner is stirred for a long time in the developing device. Moreover, the toner can be efficiently and reliably conveyed without blocking the toner supply path such as the tube 71.

The volume average particle size and the number average particle size of toner can be measured by using a typical device such as a Coulter Counter type particle size distribution measuring device: Coulter Counter-TA-II (manufactured by Coulter Electronics Limited) and Coulter Multisizer II (manufactured by Coulter Electronics Limited).

Furthermore, in the first embodiment, as toner contained in the toner containers 32Y, 32M, 32C, and 32K, substantially spherical toner is used, the toner being formed so that a shape factor SF-1 is in a range of 100 to 180 and a shape factor SF-2 is in a range of 100 to 180. This allows suppression of reduction in cleaning performance while high transfer efficiency is maintained. Moreover, the toner can be efficiently and reliably conveyed without blocking the toner supply path such as the tube 71.

Herein, the shape factor SF-1 indicates the sphericity of a toner particle, and it is determined by the following equation.

$$SF\text{-}1=(M^2/S)\times(100\pi/4)$$

In the equation, M is the maximum particle size (the largest particle size in uneven particle sizes) in a project plane of the toner particle, and S is a project area of the toner particle. Therefore, the toner particle whose shape factor SF-1 is 100 is perfectly spherical, and the degree of sphericity lowers as it than becomes greater 100.

The shape factor SF-2 indicates the irregularities of a toner particle, and it is determined by the following equation.

$$SF\text{-}2=(N^2/S)\times(100/4\pi)$$

In the equation, N is a circumferential length in the project plane of the toner particle, and S is the project area of the toner particle. Therefore, the toner particle whose shape factor SF-2 is 100 has no irregularities, and the irregularities become larger as it becomes greater than 100.

The shape factor SF-1 and the shape factor SF-2 are obtained by photographing a toner particle by a scanning electron microscope "S-800" (manufactured by Hitachi, Ltd.) and analyzing the photograph of the toner particle obtained, by an image analyzer "LUSEX3" (manufactured by Nireco Corp.).

The configuration of the toner-container holder 31 is explained below with reference to FIG. 10 and FIG. 11.

Figure 10:
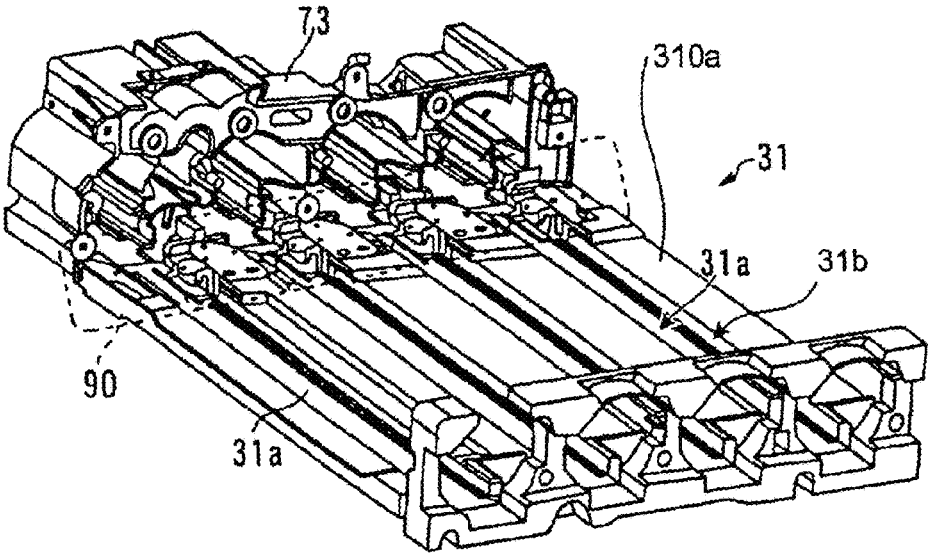
FIG. 10 is a schematic of the toner-container holder.
Figure 11:
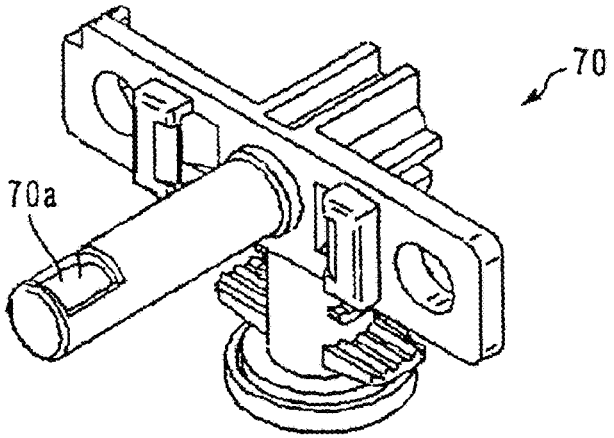
FIG. 11 is a schematic of a nozzle.

FIG. 10 is a schematic of the toner-container holder, and FIG. 11 is a schematic of a nozzle.

Referring to FIG. 10, the toner-container holder 31 includes the sliding faces 31a and 31b along which sliding portions in each held portion of the four toner containers 32Y, 32M, 32C, and 32K slide; the holding portion 73 for fixing the position of the holder 34c of the held portion; the nozzle 70; a drive unit (where the drive gear 31g is provided) for transmitting a rotational driving force to the container body 33Y; the communication circuit 74; arm pairs 90 (biasing unit) for biasing the held portion 34Y toward the holding portion 73 in synchronization with the attachment of the toner container 32Y; and the claw member (biasing member) 76 for biasing the plug member 34d in the direction in which the toner outlet B of the toner container 32Y is closed.

The holding portion 73 holds the held portions of the toner containers 32Y, 32M, 32C, and 32K each in the non-rotating manner. The holding portion 73 includes sliding faces contacting the holder 34c, and a contact face contacting a part of the cap cover 34b. Provided in the sliding faces (side faces) of the holding portion 73 are the positioning members 31c for positioning in synchronization with the attachment operation of the held portion 34Y (see FIG. 5). The positioning member 31c is a convex portion extended along the attachment/detachment direction of the toner container 32Y.

Provided in the sliding face (bottom) of the holding portion 73 is the claw member 76 as a biasing member for biasing the plug member 34d in the direction in which the toner outlet B is closed in synchronization with the detachment of the held portion 34Y (see FIG. 5, and FIG. 12 to FIG. 14). The claw member 76 is pivotally held by the toner-container holder 31 around the rotating spindle 76a in the direction of a double-pointed arrow (R direction) of FIG. 5. More specifically, the claw member 76 is biased by a plate spring 77 (second biasing member) fixed to the lower side of the claw member 76 in FIG. 3 and FIG. 5, in the direction in which the claw member 76 protrudes from a pushed position, which does not obstruct attachment/detachment of the held portion 34Y, to a position of engaging the plug member 34d (biasing in the direction of an arrow R2 of FIG. 13).

Furthermore, the communication circuit 74 and the fitting member 31d are provided on the surface of the holding portion 73 in its rear side.

The nozzle 70 as shown in FIG. 11 is arranged in the holding portion 73 for each toner color. Provided in the nozzle 70 is a toner supply port 70a communicating with the toner outlet B which is formed in the held portion 34Y of the toner container 32Y.

The attachment/detachment operation of the toner container 32Y to/from the toner-container holder 31 is explained below with reference to FIG. 12 to FIG. 16.

Figure 12:
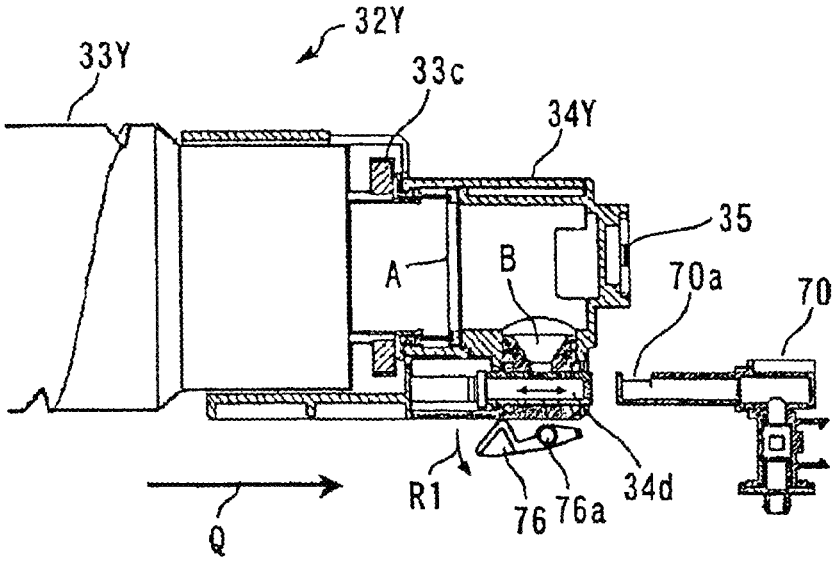
FIG. 12 is a schematic of how a yellow toner container is attached to the toner-container holder when viewed from the longitudinal direction.
Figure 13:
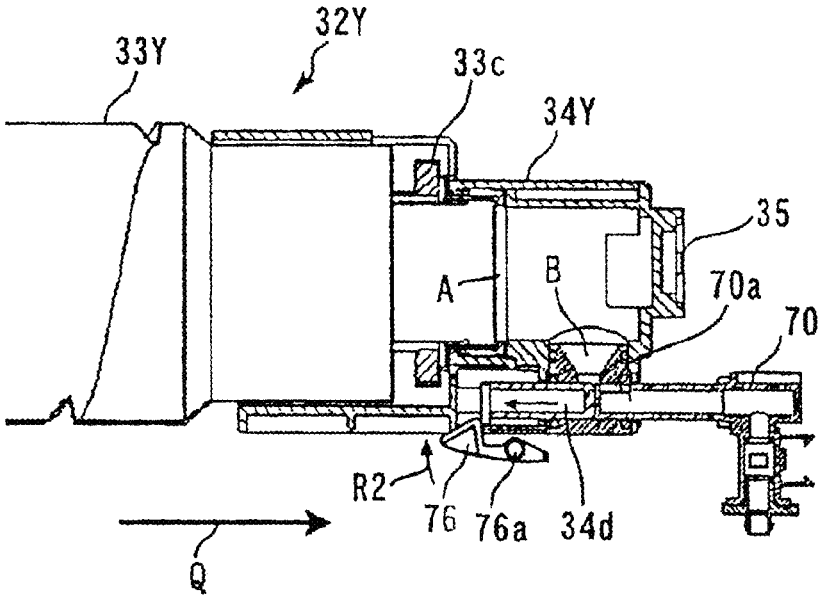
FIG. 13 is a schematic of how the attachment of the toner container is progressed when viewed from the longitudinal direction.
Figure 14:
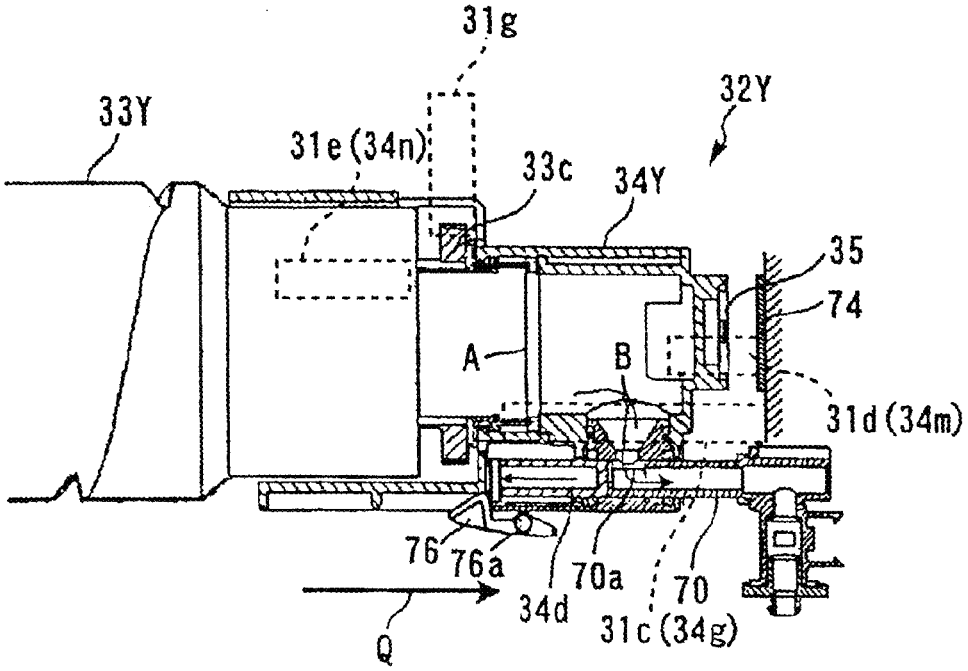
FIG. 14 is a schematic of the toner container attached to the toner-container holder when viewed from the longitudinal direction.
Figure 15:
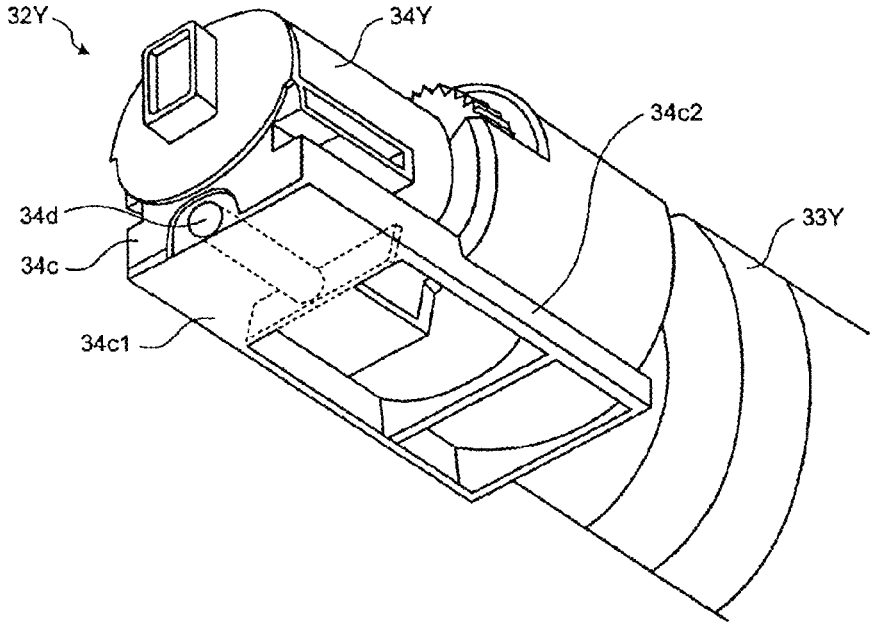
FIG. 15 is a schematic of how the toner container is attached to the toner-container holder when viewed from the holder.
Figure 16:
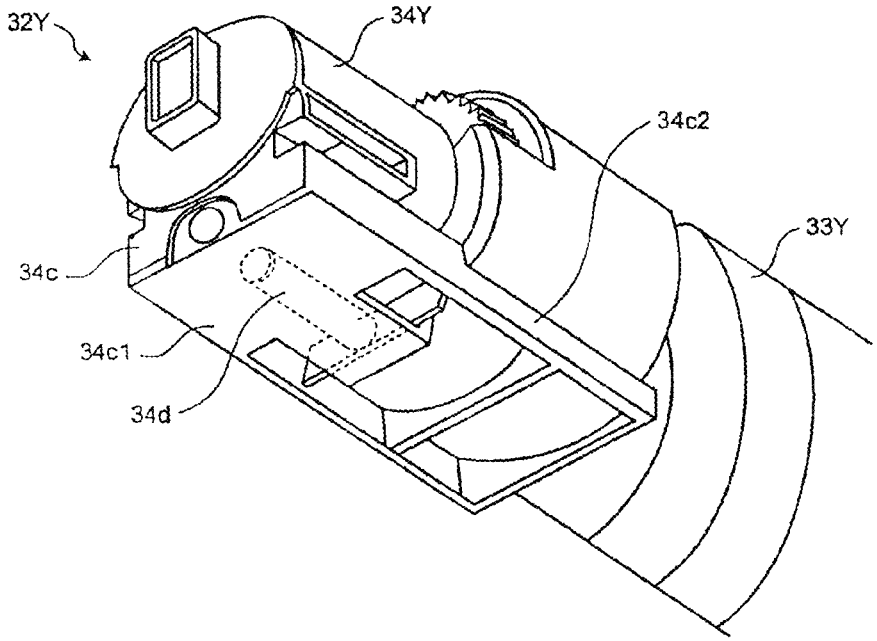
FIG. 16 is a schematic of the toner container attached to the toner-container holder when viewed from the holder.

FIG. 12 is a schematic of how the toner container 32Y for yellow is attached to the toner-container holder 31 when viewed from the longitudinal direction (movement in the direction of an arrow Q). FIG. 13 is a schematic of how the attachment of the toner container 32Y is progressed (when the toner outlet B starts to be opened) when viewed from the longitudinal direction. FIG. 14 is a schematic of the toner container 32Y attached to the toner-container holder 31 (when the opening of the toner outlet B is completed) when viewed from the longitudinal direction. FIG. 15 is a schematic of how the toner container 32Y is attached to the toner-container holder 31 when viewed from the holder 34c side. FIG. 16 is a schematic of the toner container 32Y attached to the toner-container holder 31 when viewed from the holder 34c side.

When the toner container 32Y is attached to the toner-container holder 31 of the apparatus body 100, at first, the main-body cover (not shown) provided on the front face (the near side on the paper of FIG. 1) of the main body of the image forming apparatus 100 is opened to expose the toner-container holder 31 to the front side.

Then, referring to FIG. 12, the toner container 32Y is pushed into the toner-container holder 31 (movement in the direction of the arrow Q). More specifically, the toner container 32Y is attached to the toner-container holder 31 along the longitudinal direction of the container body 33Y (or the toner container 32Y) so that the held portion 34Y becomes the head of the container body 33Y.

At this time, the first sliding portion 34c1 slides along the sliding face 31a of the toner-container holder 31 at the head side of the toner container 32Y, and the second sliding portion 34c2 slides along the sliding face 31b of the toner-container holder 31, and while sliding, the toner container 32Y is pushed into the toner-container holder 31 with good balance by the user gripping the gripper 33d on the rear side of the toner container 32Y.

Thereafter, when the holder 34c of the toner container 32Y reaches the holding portion 73 of the toner-container holder 31, positioning of the held portion 34Y is started. More specifically, the engaging portion 34g of the held portion 34Y and the positioning member 31c of the toner-container holder 31 start to be engaged with each other. During this time, the arm pairs 90 bias the held portion 34Y of the toner container 32Y toward the holding portion 73 (biasing in the direction of the arrow Q).

Furthermore, during this time, the claw member 76 provided in the holding portion 73 of the toner-container holder 31 is pushed downward to the position that does not obstruct the attachment of the held portion 34Y (which is rotation in the direction of an arrow R1 around the rotating spindle 76a). More specifically, the claw member 76 is pushed down by the sliding portion 34c1 in the direction of resisting the biasing force of the plate spring 77 as the second biasing member.

Thereafter, when the attachment operation of the toner container 32Y is further progressed, the plug member 34d starts to open the toner outlet B while the engaging portion 34g and the positioning member 31c are engaged with each other (the state as shown in FIG. 13). More specifically, the plug member 34d is pushed by the nozzle 70 associated with insertion of the front end of the nozzle 70 into the hole of the holder 34c.

At this time, the claw member 76 protrudes from the pushed position in FIG. 12 to the position of engaging with the plug member 34d right before the front end of the nozzle 70 touches the plug member 34d (which is rotation in the direction of an arrow R2 around the rotating spindle 76a). More specifically, the claw member 76 is released from the pushing by the sliding portion 34c1 and is pushed up to its default position by the biasing force of the plate spring as the second biasing member.

At this default position, the claw member 76 is protruded toward a space, which is on the container body 33Y side of the plug member 34d, being apart from the nozzle 70, and which is between the engaging portion (of the plug member 34d) protruded from the surface of the plug member 34d and the side of the container body 33Y, both of them being provided on both sides of the space in the horizontal direction.

Ideally, from the viewpoint of prevention of toner scatter, it is preferable that the claw member 76 engage with the engaging portion of the plug member 34d when the claw member 76 is pushed up, but the claw member 76 is preferably configured to be pushed up to the position apart from the engagement face by about 0.5 to 3 mm to maintain mechanical tolerance. This configuration allows the claw member 76 to wait readily for its engagement with the engaging portion of the plug member 34d when the user pushes the toner container into the toner-container holder.

If the front end of the nozzle 70 touches the front end of the plug member 34d to start movement of the plug member 34d before the claw member 76 is pushed up to the default position, the claw member 76 is not engaged with the engaging portion of the plug member 34d depending on setting of the mechanical tolerance, and after this, when the user feels something different from the feeling and pulls out again the toner container, such a failure that toner may be leaked from the toner outlet is predicted.

The state as shown in FIG. 13 is such that the plug member 34d is held by the nozzle 70 and the claw member 76 and its position is fixed in the toner-container holder 31 (holding portion 73). If the toner container 32Y is further moved in the attachment direction (direction of the arrow Q) from the state of FIG. 13, the toner outlet B is opened while the position of the plug member 34d is fixed in the holding portion 73 (the plug member 34d relatively moves).

Then, referring to FIG. 14, the position of the held portion 34Y is fixed at the position where the holder 34c butts against the holding portion 73 (reference position for butting), and at the same time, the plug member 34d fully opens the toner outlet B and the gear 33c of the toner container 32Y is engaged with the drive gear 31g of the drive unit of the toner-container holder 31. The ID chip 35 as an electronic substrate faces the communication circuit 74 in the position of enabling radio communication. Furthermore, the concave portion 34m and the convex portion 34n for securing non-compatibility of toner containers are fitted in the fitting members 31d and 31e of the apparatus body. The toner outlet B of the toner container 32Y communicates with the toner supply port 70a of the nozzle 70, and the attachment operation of the toner container 32Y is completed.

On the other hand, when the toner container 32Y is taken out (removed) from the toner-container holder 31 of the apparatus body 100, the operation is performed in the reverse of the attachment.

At first, the plug member 34d is biased by the claw member 76 while the position of the plug member 34d in the holding portion 73 is fixed by the nozzle 70 and the claw member 76, in synchronization with separation of the toner container 32Y from the holding portion 73 (detachment operation), to close the toner outlet B (movement from the state of FIG. 14 to the state of FIG. 13). At this time, the end face of the plug member 34d (the right-hand side end face of FIG. 13) is fitted in the fitting portion formed in the held portion 34Y, and closing of the toner outlet B is completed by the plug member 34d. Thereafter, when the toner container 32Y further moves from the state of FIG. 13 in the separating direction (the direction opposite to the arrow Q), the claw member 76 moves to the position where the separation of the held portion 34Y is not obstructed (the state of FIG. 12). After the held portion 34Y is completely separated, the claw member 76 is released from the pushing by the sliding portion 34c1, to return to the default position by the biasing force of the plate spring being the second biasing member.

Here, the plate spring 77 is the second biasing member for biasing the claw member 76 from the pushed position to the engagement position. And such plate spring 77 is formed so that the force with which the claw member 76 biases the plug member 34d becomes greater than sliding resistance (which is produced by the packing of the O-ring associated with the open/close operation) of the plug member 34d. This allows prevention of a failure such that the claw member 76 is pushed by the plug member 34d to move to the pushed position upon the detachment operation of the toner container 32Y so that the toner outlet B is not closed completely.

In other words, the plug member 34d surely closes the toner outlet B upon detachment operation of the toner container 32Y.

In the first embodiment, because the position of the plug member 34d is held by the nozzle 70 and the claw member 76, to be firmly fixed in the toner-container holder 31, the plug member 34d is not displaced even when the apparatus body 100 is in operation. Thus, it is possible to prevent toner scattering from near the toner outlet B.

In the first embodiment, a stroke of the plug member 34d when the toner outlet B is opened/closed is set so as to be longer than a stroke which is movable by a manual operation (for example, the operation of pushing the plug member with fingers). In other words, even if the user touches the plug member 34d of the toner container 32Y by mistake, the stroke of the plug member 34d is set sufficiently long so that the toner outlet B is not opened. More specifically, the plug member 34d is formed so that its length is sufficiently long (particularly, the length from the end face where the nozzle is engaged with the toner outlet), and the bore of the plug member 34d is formed so as to be made sufficiently smaller as compared with the size of the user's finger. Thus, it is possible to prevent toner scattering from near the toner outlet B caused by user's erroneous operation even if the biasing member (claw member 76) for biasing the plug member 34d in the direction of closing the toner outlet B is not provided in the toner container 32Y, as explained in the first embodiment. In the first embodiment, however, because the biasing member (claw member 76) for biasing the plug member 34d is provided in the apparatus body 100, the number of components in the toner container 32Y can be reduced, thus reducing the component cost and the running cost.

In the first embodiment, as shown in FIG. 6, FIG. 15, and FIG. 16, the plug member 34d is provided in the position surrounded by the sliding portions 34c1 and 34c2. That is, the plug member 34d is provided inside the held portion 34Y. This configuration allows the sliding operation (attachment/detachment operation) of the sliding portions 34c1 and 34c2 to be surely performed without obstructing the open/close operation of the toner outlet B by the plug member 34d. In other words, the sliding portions 34c1 and 34c2 serve as a protection wall for the plug member 34d. Furthermore, a cylinder portion of the plug member 34d is covered with the holder 34c of the held portion 34Y, so as not to be exposed irrespective of open/close of the plug. Thus, it is possible to maintain airtightness regardless of opening/closing of the plug. Furthermore, the plug member 34d has two pieces of plates, as an engaging portion with the claw member 76, symmetrically projected in the axial direction of the cylinder portion and in the vertical direction thereof. Although the two pieces of plates are exposed to be engaged with the claw member 76, they are located in the high position by the thickness of the holder 34c. Therefore, even when the toner container 32Y is attached/detached to/from the main body of the image forming apparatus 100, there is no possibility that the plug is opened carelessly due to sliding of the toner container with the sliding face 31a of the toner-container holder 31, and hence, it is configured to protect against toner scatter.

As explained above, in the image forming apparatus according to the first embodiment, the attachment operation and detachment operation of the toner container 32Y are completed by one action (except the open/close operation of the main-body door) such that the sliding portion 34c1 of the toner container 32Y slides along the sliding face 31a.

The toner container 32Y according to the first embodiment includes the held portion 34Y with the toner outlet B provided downward in the vertical direction. The toner outlet B is provided in the lower side in the vertical direction than the opening A, and after the plug member 34d is surely positioned in synchronization with the attachment operation, the plug member 34d is pushed by the nozzle 70 to open the toner outlet B sealed by the packing 34e. Therefore, there is less toner stain in the toner outlet B, and such inconvenience that the user's hands become stained with toner by touching the toner outlet B is prevented.

Because the attachment/detachment operation of the toner container 32Y to/from the toner-container holder 31 is performed by one action associated with the sliding of the sliding portion 34c1, the operability/workability upon replacement of the toner container 32Y is improved. Particularly, by providing the sliding portion 34c1 in the bottom of the held portion 34Y, the sliding portion 34c1 slides along the sliding face 31a while supporting the toner container 32Y.

Moreover, the attachment operation of the toner container 32Y is performed by starting to slide the sliding portion 34c1 while the user directly grips the gripper 33d, starting positioning of the held portion 34Y together with biasing by the arm pairs 90, starting insertion of the nozzle 70, and finishing the positioning of the held portion 34Y, the insertion of the nozzle 70, and connecting to the drive unit as soon as the sliding is finished. Therefore, the user gains a click feeling when the held portion 34Y is positioned at the same time when the sliding of the held portion 34Y (attachment operation by one action) is progressed, and feels certain that no erroneous operation occurs in the attachment operation.

Furthermore, the toner container 32Y is not set in the toner-container holder 31 (apparatus body 100) from the upper side thereof, but the attachment/detachment is performed from the front face of the toner-container holder 31 (apparatus body 100), thus, enhancing the flexibility of layout for the upper side of the toner-container holder 31. For example, even if a scanner (document reader) is disposed right above the toner supply device 59, the operability/workability upon attachment/detachment of the toner container 32Y does not deteriorate. Moreover, the flexibility of layout for the engagement position D between the gear 33c of the toner container 32Y and the drive gear 31g of the apparatus body 100 is also enhanced.

The toner container 32Y is installed in the apparatus body 100 by setting its longitudinal direction as the horizontal direction, and therefore, the toner capacity of the toner container 32Y is increased without any effect on the layout in the height direction of the whole image forming apparatus 100, which allows reduction in the replacement frequency.

As explained above, in the image forming apparatus according to the first embodiment, the plug member 34d of the held portion 34Y opens/closes the toner outlet B in synchronization with the attachment/detachment operation by one action upon attachment/detachment of the toner container 32Y to/from the toner-container holder 31, which allows reliable and smooth opening/closing of the toner outlet B. Therefore, the operability/workability upon replacement of the toner container 32Y is improved, and the occurrence of toner stain is surely reduced.

In the first embodiment, only the toner is contained in each container body of the toner containers 32Y, 32M, 32C, and 32K, but in the case of the image forming apparatus that supplies two-component developer containing toner and carrier to each developing device, the two-component developer can also be contained in each container body of the toner containers 32Y, 32M, 32C, and 32K. Even in this case, the same effect as that of the first embodiment can be obtained.

In the first embodiment, the projection 33b is integrally formed in the inner circumferential surface of the container body 33Y, and the container body 33Y is made to rotate. At the same time, a coil or a screw is rotatably held inside the container body 33Y, and the container body 33Y is not rotated but the coil or the screw can be rotated by the gear 33c. In this case also, the same effect as that of the first embodiment can be obtained if the plug member 34d of the held portion 34Y opens/closes the toner outlet B in synchronization with the attachment/detachment operation of the toner container 32Y by one action.

In the first embodiment, the suction-type screw pump 60 for sending air to the inside of the tube 71 is provided in the toner supply device 59. At the same time, a discharge-type screw pump for sending air to the inside of the tube 71 can also be provided in the toner supply device 59. Furthermore, a diaphragm-type air pump can also be used as a pump connected to the tube 71. Even in these cases, the same effect as that of the first embodiment can be obtained if the plug member 34d of the held portion 34Y opens/closes the toner outlet B in synchronization with the attachment/detachment operation of the toner container 32Y by one action.

Second Embodiment

A second embodiment of the present invention is explained in detail below with reference to FIG. 17 to FIG. 19.

Figure 17:
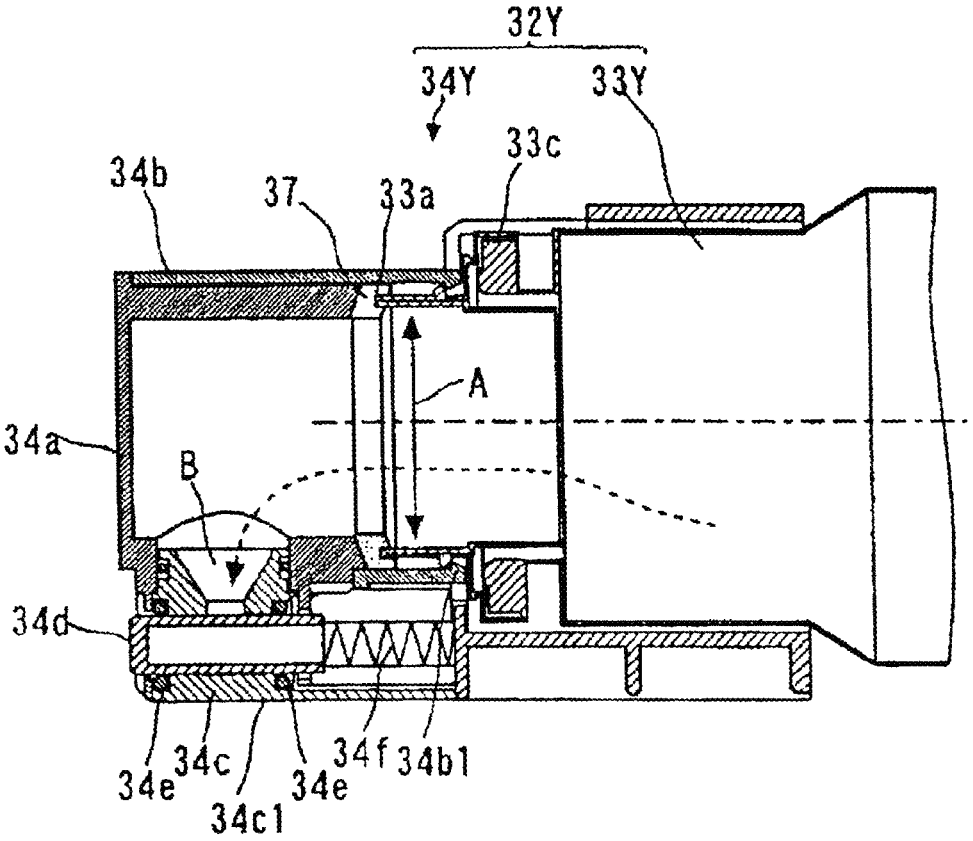
FIG. 17 is a cross-section of a head side of a toner container according to a second embodiment.

FIG. 17 is a cross-section of the head side of a toner container according to the second embodiment, which corresponds to that of FIG. 6 according to the first embodiment.

Referring to FIG. 17, the toner container 32Y according to the second embodiment is different from that of the first embodiment in a point that a compression spring 34f is provided as a member for applying biasing force to the held portion 34Y. More specifically, the compression spring 34f for biasing the plug member 34d in the direction of closing the toner outlet B is provided on the right-hand side of the plug member 34d.

The attachment/detachment operation of the toner container 32Y to/from the toner-container holder 31 is explained below with reference to FIG. 18 and FIG. 19.

Figure 18A:
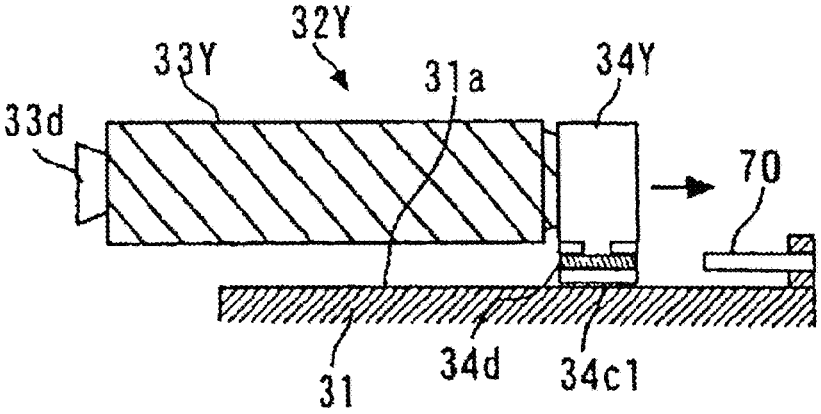
FIG. 18A is a schematic of how the yellow toner container is attached to the toner-container holder when viewed from the longitudinal direction.
Figure 18B:
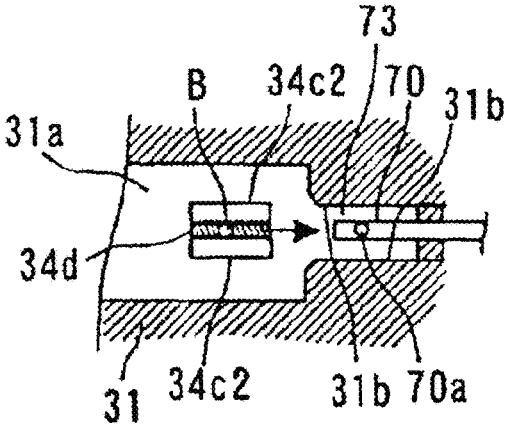
FIG. 18B is a cross-section of a portion around a holder of a held portion when the yellow toner container is attached to the toner-container holder when viewed from the upper side.
Figure 19A:
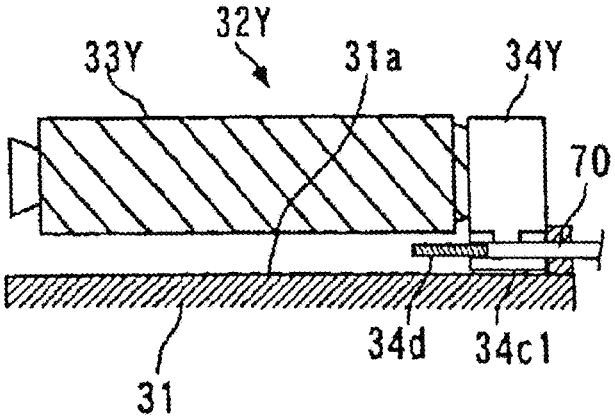
FIG. 19A is a schematic of the toner container attached to the toner-container holder when viewed from the longitudinal direction.
Figure 19B:
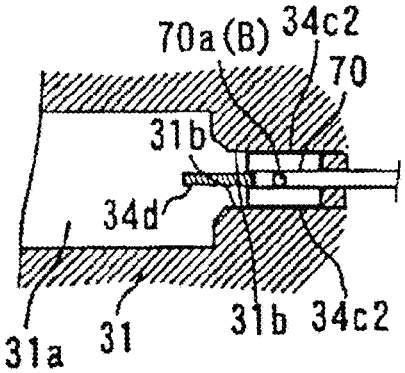
FIG. 19B is a cross-section of the portion around the holder when the toner container is attached to the toner-container holder when viewed from the upper side.

FIG. 18A is a schematic of how the toner container 32Y for yellow is attached to the toner-container holder 31 (movement in the arrow direction) when viewed from the longitudinal direction, and FIG. 18B is a cross-section of a portion around the holder 34c of the held portion 34Y in that state when viewed from the upper side. FIG. 19A is a schematic of the toner container 32Y attached to the toner-container holder 31 (attachment is completed) when viewed from the longitudinal direction, and FIG. 19B is a cross-section of a portion around the holder 34c in that state when viewed from the upper side.

The toner-container holder 31 includes four toner-container holders corresponding to the four toner containers 32Y, 32M, 32C, and 32K. Each of the four toner-container holders includes the sliding faces 31a and 31b along which the sliding portions 34c1 and 34c2 of the held portion 34Y slide; the holding portion 73 for fixing the position of the holder 34c of the held portion 34Y; the nozzle (toner conveying pipe) 70; and a drive unit (not shown) for transmitting a rotational driving force to the container body 33Y. The holding portion 73 includes sliding faces 31a and 31b contacting the holder 34c, and a contact face (not shown) contacting a part of the cap cover 34b.

When the toner container 32Y is attached to the toner-container holder 31 of the apparatus body 100, at first, the main-body cover (not shown) provided on the front face (the near side on the paper of FIG. 1) of the main body of the image forming apparatus 100 is opened to expose the toner-container holder 31 to the front side.

Then, referring to FIG. 18A, the toner container 32Y is pushed into the toner-container holder 31 (movement in the arrow direction). More specifically, the toner container 32Y is attached to the toner-container holder 31 along the longitudinal direction of the container body 33Y (or the toner container 32Y) so that the held portion 34Y becomes the head of the container body 33Y.

At this time, the first sliding portion 34c1 slides along the sliding face 31a of the toner-container holder 31 at the head side of the toner container 32Y, and the second sliding portion 34c2 slides along the sliding face 31b of the toner-container holder 31, and while sliding, the toner container 32Y is pushed into the toner-container holder 31 with good balance by the user gripping the gripper 33d on the rear side of the toner container 32Y.

Then, when the holder 34c of the toner container 32Y reaches the holding portion 73 of the toner-container holder 31, the positioning of the held portion 34Y is started.

Thereafter, the plug member 34d is pushed by the nozzle 70 in response to insertion of the front end of the nozzle 70 into the hole of the holder 34c. The position of the held portion 34Y is fixed in the position where the holder 34c butts against the holding portion 73, and at the same time, the plug member 34d fully opens the toner outlet B. As shown in FIG. 19A and FIG. 19B, this opening allows the toner outlet B of the toner container 32Y to communicate with the toner supply port 70a of the nozzle 70, and the attachment operation of the toner container 32Y is completed.

Movement of the nozzle 70 to the inside or to the outside of the holder 34c and movement of the plug member 34d to the inside or to the outside of the holder 34c are performed when both of the members slidably contact the lip of the packing 34e of the holder 34c (which is a portion forming the bore of the O-ring in FIG. 17, and which corresponds to the front end of a pentagon such as a home base used for a base ball like the cross-section of the O-ring shown in FIG. 17). Therefore, such a failure that toner is leaked from the holder 34c due to insertion or removal of the nozzle 70 is prevented.

In the second embodiment, the attachment operation of the toner container 32Y is completed by one action (except the open/close operation of the main-body door) such that the sliding portion 34c1 of the toner container 32Y slides along the sliding face 31a. In other words, the positioning operation of the held portion 34Y (toner container 32Y) and the insertion operation of the nozzle 70 are sequentially performed in synchronization with the sliding operation such that the sliding portion 34c1 of the toner container 32Y is caused to slide along the sliding face 31a.

When the toner container 32Y is to be taken out (removed) from the toner-container holder 31 of the apparatus body 100, the operation is performed in the reverse of the attachment. In this case, the nozzle 70 also separates from the holder 34c in synchronization with the operation such that the toner container 32Y separates from the holding portion 73, and the plug member 34d is moved to the position of closing the toner outlet B by the biasing force of the compression spring 34f.

The image forming apparatus to/from which the toner container 32Y is attached/detached may use the image forming apparatus according to the first embodiment that includes the claw member 76 as shown in FIG. 3, which is different from an image forming apparatus according to an eleventh embodiment as explained later. In this case, the action of the claw member 76 as explained with reference to FIG. 12 to FIG. 14 can be superimposed on the action of the compression spring 34f. Therefore, to enhance sealing capability of the toner outlet B, the airtightness between the plug member 34d and the packing 34e can be further increased. In that case, a sliding load during movement of the plug member 34d also increases, but the compression spring 34f together with the claw member 76 can increase the movement force of the plug member 34d, so that the toner outlet can be smoothly opened/closed.

In this manner, the detachment operation of the toner container 32Y is completed by one action (except the open/close operation of the main-body door) such that the sliding portion 34c1 of the toner container 32Y slides along the sliding face 31a.

The toner container 32Y according to the second embodiment includes the held portion 34Y with the toner outlet B provided in the lower side in the direction of gravity, and the plug member 34d is pushed by the nozzle 70 in synchronization with the attachment operation, to open the toner outlet B sealed with the packing 34e. Therefore, there is less toner stain in the toner outlet B, and such trouble that the user's hands become stained with toner by touching the toner outlet B is prevented.

The attachment/detachment operation of the toner container 32Y to/from the toner-container holder 31 is performed by one action associated with sliding of the sliding portion 34c1, and therefore, the operability/workability upon replacement of the toner container 32Y is improved. Particularly, by providing the sliding portion 34c1 in the bottom of the held portion 34Y, the sliding portion 34c1 slides along the sliding face 31a while supporting the toner container 32Y.

Moreover, the attachment operation of the toner container 32Y is performed by starting to slide the sliding portion 34c1 while the user directly grips the gripper 33d, starting positioning of the held portion 34Y while sliding, starting insertion of the nozzle 70, and finishing the positioning of the held portion 34Y and the insertion of the nozzle 70 as soon as the sliding is finished. Therefore, the user gains a click feeling when the held portion 34Y is positioned at the same time when the sliding of the held portion 34Y (attachment operation by one action) is progressed, and feels certain that no erroneous operation occurs in the attachment operation.

Furthermore, the toner container 32Y is not set in the toner-container holder 31 (apparatus body 100) from the upper side thereof, but the attachment/detachment is performed from the front face of the toner-container holder 31 (apparatus body 100), thus, enhancing the flexibility of layout for the upper side of the toner-container holder 31. For example, even if a scanner (document reader) is disposed right above the toner-container holder, the operability/workability upon attachment/detachment of the toner container 32Y does not deteriorate.

The toner container 32Y is installed in the apparatus body 100 by setting its longitudinal direction as the horizontal direction, and therefore, the toner capacity of the toner container 32Y is increased without any effect on the layout in the height direction of the whole image forming apparatus 100, which allows reduction in the replacement frequency.

As explained above, in the second embodiment, the sliding portions 34c1 and 34c2 are provided in the held portion 34Y, the sliding portions sliding along the toner-container holder 31 in synchronization with the attachment/detachment operation to/from the toner-container holder 31. Therefore, the operability/workability upon replacement of the toner container 32Y is improved, and the occurrence of toner stain is surely reduced.

Third Embodiment

A third embodiment of the present invention is explained in detail below with reference to FIG. 20.

Figure 20:
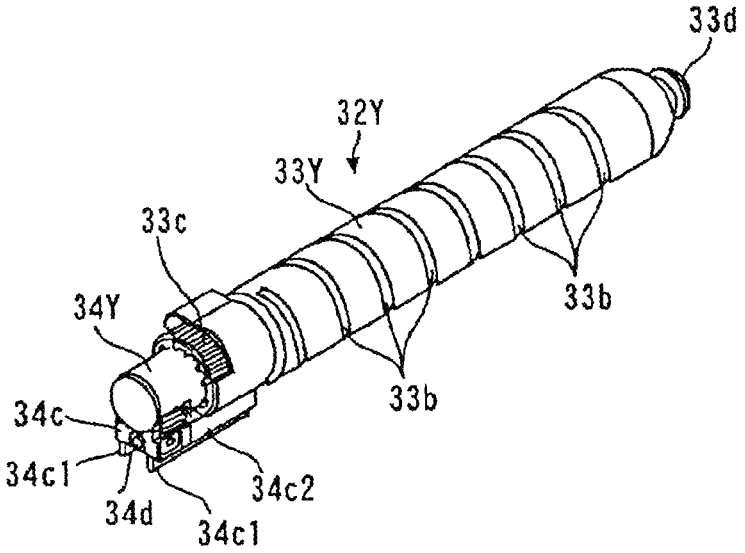
FIG. 20 is a perspective view of a toner container according to a third embodiment.

FIG. 20 is a perspective view of a toner container according to the third embodiment, which corresponds to FIG. 5 according to the first embodiment. In the third embodiment, the shape of the sliding portion 34c1 formed in the held portion 34Y is different from that of the embodiments.

As shown in FIG. 20, in the toner container 32Y according to the third embodiment, the first sliding portion 34c1 of the held portion 34Y is two convex portions (rib) that protrude toward the sliding face 31a of the toner-container holder 31, different from the sliding portion which is formed with the flat portion in the embodiments. More specifically, two convex portions 34c1 as the sliding portion 34c1 are formed so as to have height contactable with the sliding face 31a (they are formed so that the height in the vertical direction is equivalent to the sliding face 31a), and are extended along the longitudinal direction (attachment/detachment direction). Therefore, when the attachment/detachment operation of the toner container 32Y is performed, the two convex portions 34c1 (sliding portion 34c1) slide along the sliding face 31a while the posture of the held portion 34Y (or the toner container 32Y) is maintained.

The attachment/detachment operation of the toner container 32Y according to the third embodiment is also completed by one action (except the open/close operation of the main-body door) such that the sliding portion 34c1 of the toner container 32Y slides along the sliding face 31a, similarly to the embodiments.

As explained above, in the third embodiment, similarly to the embodiments, the configuration of the toner container installed in the toner-container holder is optimized by setting its longitudinal direction as the horizontal direction. Therefore, the operability/workability upon the replacement is improved, and the occurrence of toner stain can be surely reduced.

The shape of the sliding portion 34c1 in the toner container 32Y is not limited to that of the third embodiment or those in the embodiments. Therefore, the same effect as that of the embodiments can be obtained if any sliding portion slides along the sliding face 31a while the posture of the held portion 34Y is maintained.

Fourth Embodiment

A fourth embodiment of the present invention is explained in detail below with reference to FIG. 21 to FIG. 25.

Figure 21:
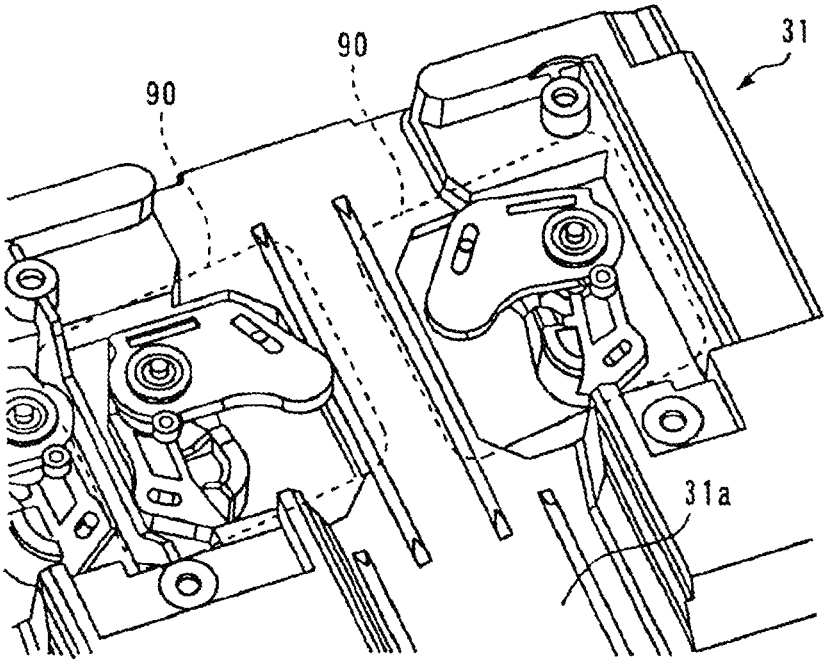
FIG. 21 is a perspective view of arm pairs provided in a toner-container holder according to a fourth embodiment.
Figure 22:
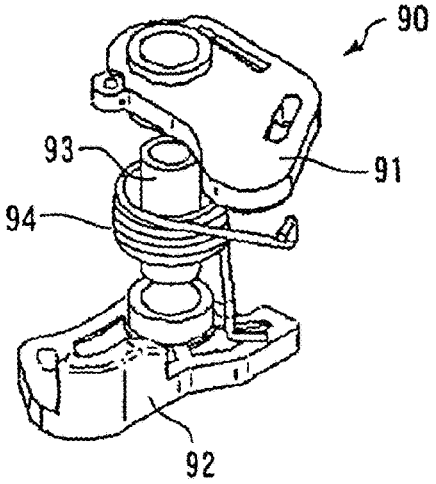
FIG. 22 is an exploded perspective view of the arm pair.

FIG. 21 is a perspective view of the arm pairs 90 provided in the toner-container holder 31 according to the fourth embodiment. FIG. 22 is an exploded perspective view of the arm pair 90. In the following explanation, the drawings used for explanation in the embodiments are used if necessary.

Referring to FIG. 4 and FIG. 10, the toner-container holder 31 includes the sliding faces 31a along which each sliding portion in held portions of the four toner containers 32Y, 32M, 32C, and 32K slides; the holding portion 73 for fixing each position of the holders 34c of the held portions; the nozzles 70; the drive unit for transmitting a rotational driving force to each container body 33Y; the communication circuits 74; the arm pairs 90 serving as the biasing unit.

The holding portion 73 holds the held portions of the toner containers 32Y, 32M, 32C, and 32K each in the non-rotating manner. The holding portion 73 includes sliding faces contacting the holder 34c and a contact face contacting a part of the cap cover 34b. Provided in the sliding faces (side faces) of the holding portion 73 are the positioning members 31c for positioning in synchronization with the attachment of the held portion 34Y (see FIG. 5). The positioning member 31c is a convex portion extended along the attachment/detachment direction of the toner container 32Y.

The nozzle 70 shown in FIG. 11 is provided for each toner color in the holding portion 73. The nozzle 70 has the toner supply port 70a communicating with the toner outlet B formed in the held portion 34Y of the toner container 32Y.

Referring to FIG. 10 and FIG. 21, the arm pairs 90 are provided for each toner color in the holding portion 73 of the toner-container holder 31. As shown in FIG. 21, the arm pairs 90 are disposed on both sides sandwiching the held portion of the toner container.

Referring to FIG. 22, the arm pair 90 includes a first arm 91 (second biasing element), a second arm 92 (biasing element), a spindle 93, and a torsion spring 94. The arm pair 90 is integrally provided via the spindle 93, and affects the force on both directions in the direction of rotation around the spindle 93 by the torsion spring 94. More specifically, the first arm 91 and the second arm 92 affect the force on both directions in the direction of rotation around the spindle 93. The force increases more as an angle formed between the first arm 91 and the second arm 92 increases.

The arm pairs 90 configured in the above manner serve as a biasing unit for biasing the held portion 34Y toward the holding portion 73 (biasing it toward the direction of the arrow Q) while the toner container 32Y is set in the toner-container holder 31. More specifically, the arm pairs 90 bias a flat portion 34k being a biased portion of the held portion 34Y with the toner container 32Y set in the toner-container holder 31. Furthermore, the arm pairs 90 are configured so that the sliding portions 34c2 of the held portion 34Y (the second sliding portions disposed in the two side portions of the held portion 34Y) come in contact with the arm pairs 90 in synchronization with attachment/detachment operation of the toner container 32Y to slide. In the fourth embodiment, the flat portion 34k being the biased portion of the held portion 34Y biased by the arm pairs 90 is a flat (which connects between the ends of the two side portions and is orthogonal to the attachment/detachment direction in the fourth embodiment) intersecting the side portions in the ends of the two side portions of the held portion 34Y where the sliding portions 34c2 are formed.

Based on the configuration above, the toner container 32Y is set in the holding portion 73 while the two sliding portions 34c2 held by the two arm pairs 90 are sliding with sufficient balance, and the posture of the held portion 34Y in the holding portion 73 is maintained by the arm pairs 90 (the held portion is biased to the nozzle 70 side and its position is fixed). Therefore, the operability/workability upon replacement of the toner container 32Y is improved, and the occurrence of the toner stain associated with replacing work can be reliably reduced.

The attachment/detachment operation of the toner container 32Y to/from the toner-container holder 31 is explained below with reference to FIG. 23 to FIG. 25 and FIG. 12 to FIG. 14.

Figure 23:
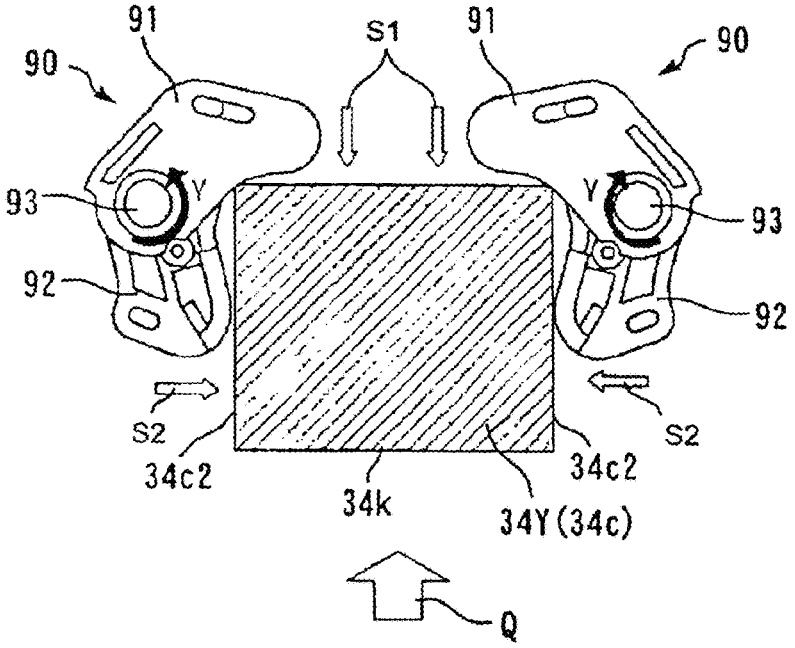
FIG. 23 is a schematic of a relation between the arm pairs and the held portion when the yellow toner container is to be attached to the toner-container holder when viewed from the upper side.
Figure 24:
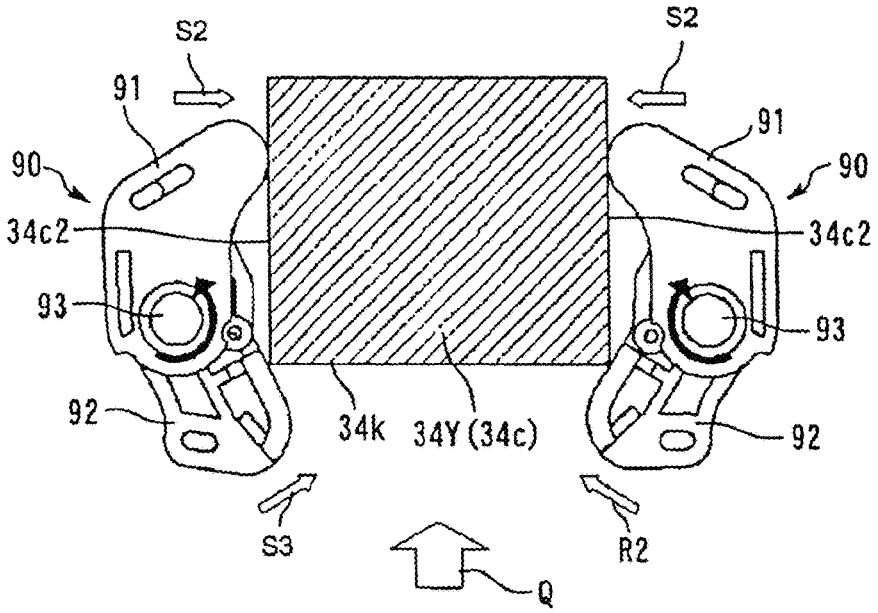
FIG. 24 is a schematic of the relation between the arm pairs and the held portion when the attachment of the toner container is progressed when viewed from the upper side.
Figure 25:
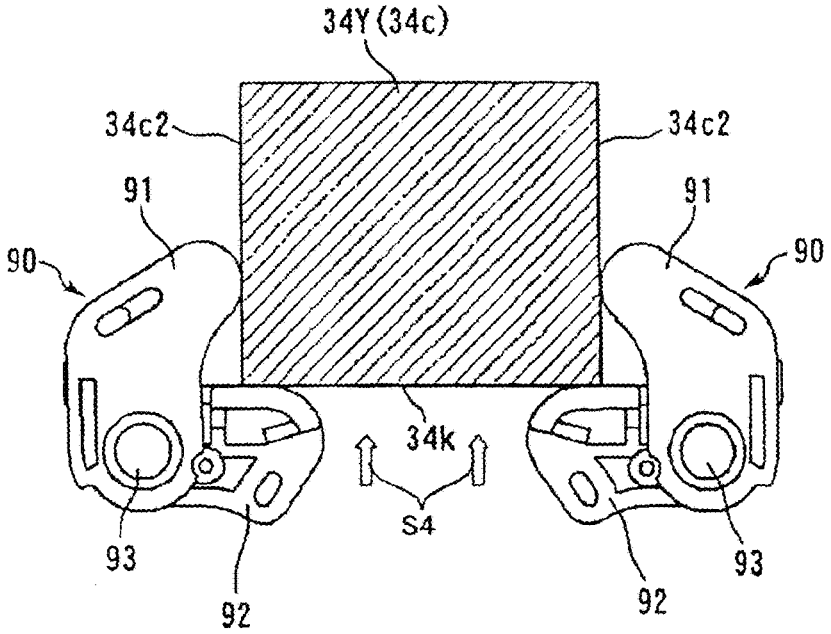
FIG. 25 is a schematic of the relation between the arm pairs and the held portion when the toner container is attached to the toner-container holder when viewed from the upper side.

FIG. 12 is a schematic of how the yellow toner container 32Y is attached to the toner-container holder 31 (movement in the direction of the arrow Q) when viewed from the longitudinal direction, and FIG. 23 is a schematic of a relation between the arm pairs 90 and the held portion 34Y (the holder 34c) in that state when viewed from the upper side. FIG. 13 is a schematic of how the attachment of the toner container 32Y is progressed (the toner outlet B starts to be opened) when viewed from the longitudinal direction, and FIG. 24 is a schematic of a relation between the arm pairs 90 and the held portion 34Y (the holder 34c) in that state when viewed from the upper side. FIG. 14 is a schematic of the toner container attached to the toner-container holder 31 (opening of the toner outlet B is completed) when viewed from the longitudinal direction, and FIG. 25 is a schematic of a relation between the arm pairs 90 and the held portion 34Y (the holder 34c) in that state when viewed from the upper side.

When the toner container 32Y is to be attached to the toner-container holder 31 of the apparatus body 100, at first, the main-body cover (not shown) provided on the front face (the near side on the paper of FIG. 1) of the main body of the image forming apparatus 100 is opened to expose the toner-container holder 31 to the front side.

Then, referring to FIG. 12, the toner container 32Y is pushed into the toner-container holder 31 (movement in the direction of the arrow Q). More specifically, the toner container 32Y is attached to the toner-container holder 31 along the longitudinal direction of the container body 33Y (or the toner container 32Y) so that the held portion 34Y becomes the head of the container body 33Y.

At this time, the sliding portion 34c1 slides along the sliding face 31a of the toner-container holder 31 at the head side of the toner container 32Y, and the toner container 32Y is pushed into the toner-container holder 31 with sufficient balance by the user gripping the gripper 33d on the rear side of the toner container 32Y.

Thereafter, referring to FIG. 23, when the holder 34c (the held portion 34Y) of the toner container 32Y reaches the position of the arm pairs 90 in the toner-container holder 31, the first arms 91 come in contact with the front edge of the holder 34c (the held portion 34Y) and the second arms 92 come in contact with the side faces (sliding portions 34c2) of the holder 34c (the held portion 34Y), and the arm pairs 90 are thereby widened in directions of a black arrow (g direction) of FIG. 23. Then, by widening the arm pairs 90 in the directions of the black arrow (g direction), the first arms 91 affect forces on the holder 34c in the direction of an arrow S1 and the second arms 92 affect forces thereon in directions of an arrow S2, by spring forces of the torsion springs 94. In this case, the second arms 92 face each other on both side faces of the holder 34c, and the forces from both directions indicated by the arrow S2 are cancelled out. Therefore, the forces acting from the second arms 92 on the sliding portions 34c2 become a slight amount of sliding resistance between resins, and hence, the forces in the directions of the arrow S1 by the first arms 91 are mainly acted on the held portion 34Y. These forces are a force in the direction in which the toner container 32Y is detached from the holding portion 73.

Thereafter, the toner container 32Y is further pushed thereinto against the force in the detachment direction, and when the holder 34c of the toner container 32Y reaches the holding portion 73 of the toner-container holder 31, in addition to sliding of the first sliding portion 34c1 along the sliding face 31a, the positioning of the held portion 34Y is started while the second sliding portions 34c2 are sliding along the arm pairs 90. More specifically, the engaging portion 34g of the held portion 34Y and the positioning member 31c of the toner-container holder 31 start to be engaged with each other.

Then, the attachment operation of the toner container 32Y is further progressed, and the plug member 34d starts to open the toner outlet B while the engaging portion 34g and the positioning member 31c are engaged (state shown in FIG. 13). That is, the front end of the nozzle 70 is inserted into the hole of the holder 34c, and at the same time, the plug member 34d is relatively pushed by the nozzle 70.

At this time, in addition to the sliding of the second sliding portions 34c2 along the first arms 91, the second arms 92 bias the held portion 34Y toward the holding portion 73 (biasing in the direction of the arrow Q).

More specifically, referring to FIG. 24, the first arms 91 are widened by the front edge of the holder 34c (the held portion 34Y), to come in contact with the second sliding portions 34c2. At the same time, the second arms 92 start contacting the rear end of the holder 34c (flat portion 34k). At this time, the forces by the first arms 91 from both directions of the arrow S2 are cancelled out. Therefore, the forces acting from the first arms 91 on the sliding portions 34c2 become about a slight amount of sliding resistance between the resins, and as a result, the forces by the second arms 92 from the directions of an arrow S3 mainly act on the held portion 34Y. These forces are a force in the direction in which the toner container 32Y is biased toward the holding portion 73 (direction of the arrow Q).

Referring to FIG. 14, the position of the held portion 34Y is fixed at the position where the holder 34c butts against the holding portion 73 (reference position for butting), and at the same time, the plug member 34d fully opens the toner outlet B, and the gear 33c of the toner container 32Y is engaged with the drive gear of the drive unit in the toner-container holder 31. Furthermore, the ID chip 35 is fixed in a position communicable with the communication circuit 74. The toner outlet B of the toner container 32Y and the toner supply port 70a thereby communicate with each other, and the attachment operation of the toner container 32Y is completed.

At this time, referring to FIG. 25, the first arms 91 are in contact with the second sliding portions 34c2, and the second arms 92 are in contact with the flat portion 34k (rear end of the holder 34c) as the biased portion. With this situation, only the forces by the second arms 92 in the directions of an arrow S4 act on the held portion 34Y. These forces are a force (positioning force) for holding the held portion 34Y of the toner container 32Y in the holding portion 73. In the fourth embodiment, the two arm pairs 90 are in contact with the two parts (both ends) of the flat portion 34k, to thereby bias the held portion 34Y with sufficient balance toward the attachment direction.

Even when the toner container 32Y is manually detached by the user, the first arms 91 and the second arms 92 are in such positions as shown in FIG. 23, before or after the engaging portion 34g of the held portion 34Y is disengaged from the positioning member 31c of the toner-container holder 31. At this time, the first arms 91 also affect the forces on the held portion 34Y in the S1 directions in which the toner container 32Y is detached from the holding portion 73, and these forces support the user to conduct the pull-out operation, which facilitates the detachment.

Furthermore, by the time the force to support the detachment is produced by the first arms 91, the operation passes through the states as shown in FIG. 25 and FIG. 24. But, at this time, the forces, indicated by the arrows S3 and S4, biasing the toner container 32Y toward the holding portion 73 are produced in the second arms 92, and these forces are used to push the toner container 32Y back to the holding portion 73 to close the toner outlet so as to suppress toner scatter when the user performs a slow and weak detachment operation, and because the pulling-out requires force, these forces can prompt the user to do such a quick pull-out operation in which toner is less scattered.

In the fourth embodiment, referring to FIG. 6, the sliding portions 34c2 being the biased portion are formed so that their height (position in the vertical direction) becomes almost equivalent to the height of the toner outlet B (or the plug member 34d). Consequently, when the sliding portions 34c2 slide along the arm pairs 90, even if the torque (rattle) around the central axis of the nozzle 70 in the longitudinal direction is affected on the held portion 34Y, it is prevented that the forces acting from the first arms 91 and the second arms 92 on the sliding portions 34c2 become forces of promoting the torque. As a result, such a failure that the toner outlet B (or the plug member 34d) and the nozzle 70 are displaced from each other is prevented.

In the fourth embodiment, the attachment operation of the toner container 32Y to the toner-container holder 31 is configured in such a manner that after the sliding portions 34c2 start to slide along the arm pairs 90, the nozzle 70 starts to push the plug member 34d, and as soon as the sliding portions 34c2 finish sliding along the arm pairs 90, the arm pairs 90 bias (positioning) the flat portion 34k (biased portion). In other words, as shown in FIG. 6, the length of the sliding portions 34c2 in their attachment/detachment direction is set so as to be sufficiently long. This allows reliable operation such that after the held portion 34Y starts to be smoothly attached to the toner-container holder 31, the nozzle 70 pushes the plug member 34d, and the holding portion 73 positions the held portion 34Y.

The fourth embodiment is configured so that a movement distance, in the attachment/detachment direction of the plug member 34d associated with the attachment/detachment operation of the toner container 32Y to/from the toner-container holder 31, is shorter than a distance from the toner outlet B to the flat portion 34k (biased portion) in the attachment/detachment direction. Based on this configuration, the nozzle 70 and the plug member 34d are surely engaged after the held portion 34Y starts to be smoothly attached to the toner-container holder 31.

In the fourth embodiment, as shown in FIG. 7, the engaging portion 34g of the held portion 34Y is provided in the upper side of the sliding portion 34c2 (second sliding portion) and the toner outlet B (or the plug member 34d) in their vertical direction. Therefore, even if toner is leaked from the toner outlet B, most of the toner leaked drops in the direction of gravity, thus reducing a failure such that the toner is adhered to the engaging portion 34g to cause poor engagement with the positioning member 31c.

As explained above, in the fourth embodiment, similarly to the embodiments, the configuration of the toner container to be installed in the toner-container holder is optimized based on the longitudinal direction set as the horizontal direction. Therefore, the operability/workability upon the replacement is improved, and the occurrence of toner stain can be surely reduced.

Furthermore, in the fourth embodiment, the toner container 32Y is set in the holding portion 73 while the two sliding portions 34c2 held by the two arm pairs 90 are smoothly sliding, and the held portion 34Y is held by the holding portion 73 due to the biasing force of the arm pairs 90. Therefore, the operability/workability upon the replacement of the toner container 32Y is further improved, and the occurrence of toner stain associated with the replacing work can be surely reduced.

Fifth Embodiment

A fifth embodiment of the present invention is explained in detail below with reference to FIG. 26.

Figure 26:
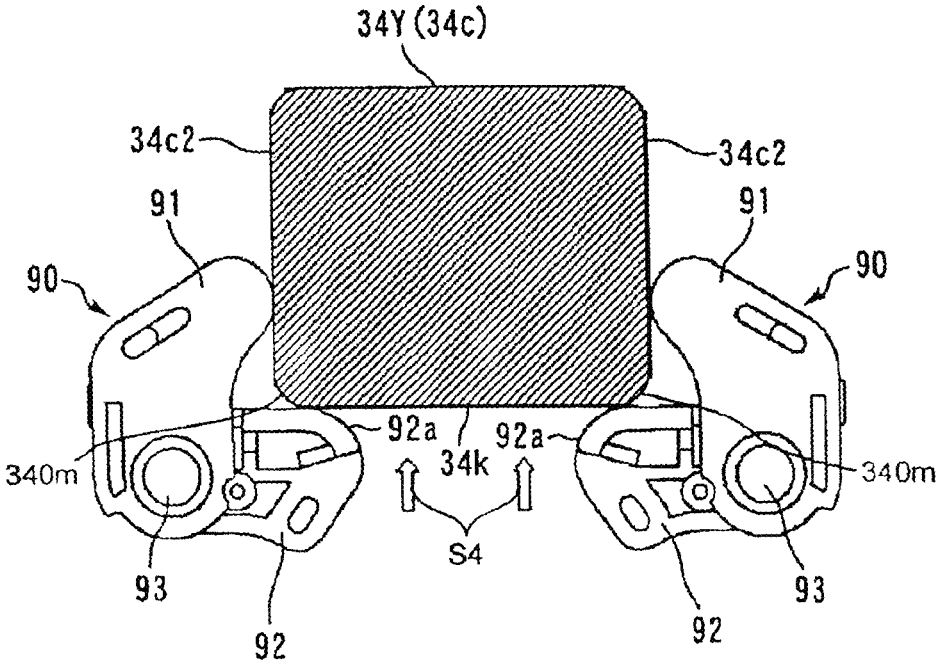
FIG. 26 is a schematic of the arm pairs when a toner container according to a fifth embodiment is attached to the toner-container holder.

FIG. 26 is a schematic of the arm pairs 90 when the toner container 32Y according to the fifth embodiment is attached to the toner-container holder 31, and corresponds to FIG. 25 according to the fourth embodiment. In the fifth embodiment, corner portions 340m are used as the biased portions of the held portion 34Y in the toner container 32Y, and this point is different from the fourth embodiment in which the flat portion 34k is used as the biased portion of the held portion 34Y.

Referring to FIG. 26, in the fifth embodiment also, the arm pairs 90 function as the biasing unit for biasing the held portion 34Y toward the holding portion 73 while the toner container 32Y is set in the toner-container holder 31. More specifically, the arm pairs 90 bias the corner portions 340m (curved portions) as the biased portions of the held portion 34Y while the toner container 32Y is set in the toner-container holder 31. Furthermore, the arm pairs 90 are configured so that the second sliding portions 34c2 of the held portion 34Y come in contact with the arm pairs 90 to slide in synchronization with the attachment/detachment operation of the toner container 32Y. Here, the corner portions 340m, which are the biased portions of the held portion 34Y biased by the arm pairs 90, are corners (two corner portions) in respective ends of the two side portions of the held portion 34Y where the sliding portions 34c2 are formed.

Based on the configuration above, the toner container 32Y is set in the holding portion 73 while the two sliding portions 34c2 held by the two arm pairs 90 are smoothly sliding, and the posture of the held portion 34Y in the holding portion 73 is maintained by the arm pairs 90. In the fifth embodiment, the two arm pairs 90 come in contact with the two corner portions 340m to thereby bias the held portion 34Y in the attachment direction with good balance.

In the fifth embodiment, the corner portion 340m of the held portion 34Y is rounded (round chamfering). The round form of the corner portion 340m is formed so that it is smaller than the round form of a contact portion (contact portion 92a of the second arm 92) of the arm pair 90 in contact with the corner portion 340m. Therefore, a shift is smoothly performed from the operation such that the sliding portions 34c2 slide along the arm pairs 90 to the operation such that the arm pairs 90 bias the held portion 34Y (corner portions 340m).

As explained above, in the fifth embodiment, similarly to the embodiments, the configuration of the toner container to be installed in the toner-container holder is optimized based on the longitudinal direction set as the horizontal direction. Therefore, the operability/workability upon the replacement is improved, and the occurrence of toner stain can be surely reduced.

Furthermore, in the fifth embodiment, similarly to the fourth embodiment, the toner container 32Y is set in the holding portion 73 while the two sliding portions 34c2 held by the two arm pairs 90 are smoothly sliding, and the held portion 34Y is held by the holding portion 73 due to the biasing force of the arm pairs 90. Thus, the operability/workability upon the replacement of the toner container 32Y is further improved, and the occurrence of toner stain associated with the replacing work can be surely reduced.

Sixth Embodiment

A sixth embodiment of the present invention is explained in detail below with reference to FIG. 27 to FIG. 29.

The toner container 32Y according to the sixth embodiment also includes the sliding portions 34c1 and 34c2 provided in the holder 34c of the held portion 34Y, the sliding portions for sliding along the toner-container holder 31 in synchronization with the attachment/detachment operation to/from the toner-container holder 31.

More specifically, the first sliding portion 34c1 is the flat portion formed so as to be parallel with the sliding face 31a (which is the upper face; see FIG. 27A) of the toner-container holder 31, the flat portion being provided in the bottom of the held portion 34Y with which the attachment/detachment is operated. Furthermore, the second sliding portion 34c2 is a flat portion formed so as to be parallel with the sliding face 31b (side face; see FIG. 27B) of the toner-container holder 31, the flat portion being provided in the side portion of the held portion 34Y with which the attachment/detachment is operated.

The attachment/detachment operation of the toner container 32Y to/from the toner-container holder 31 is explained below with reference to FIG. 27 and FIG. 29.

Figure 27A:
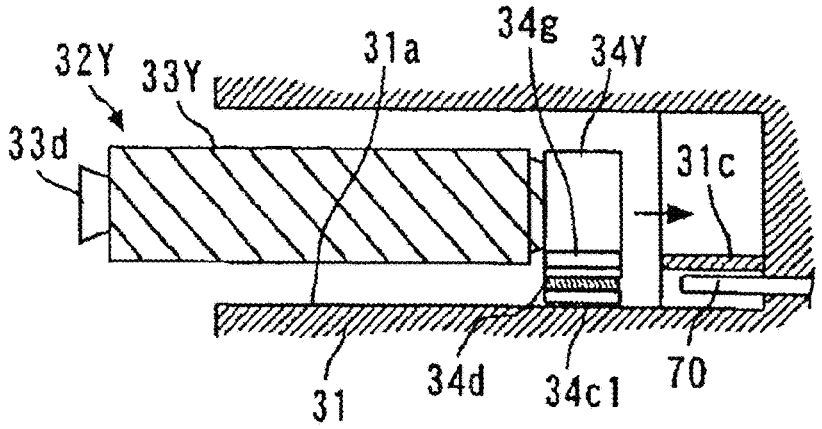
FIG. 27A is a schematic of how the yellow toner container is attached to the toner-container holder when viewed from the longitudinal direction.
Figure 27B:
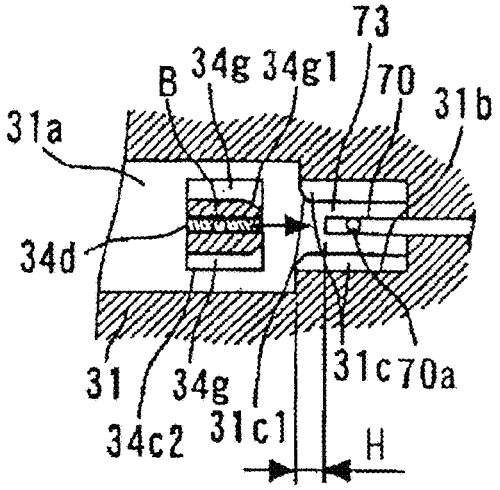
FIG. 27B is a schematic of the portion around the holder when the yellow toner container is to be attached to the toner-container holder when viewed from the upper side.
Figure 28A:
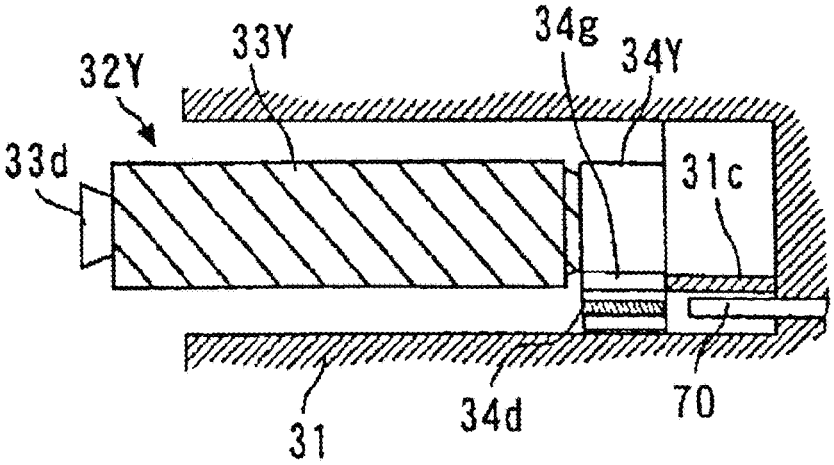
FIG. 28A is a schematic of how the attachment of the toner container is progressed when viewed from the longitudinal direction.
Figure 28B:
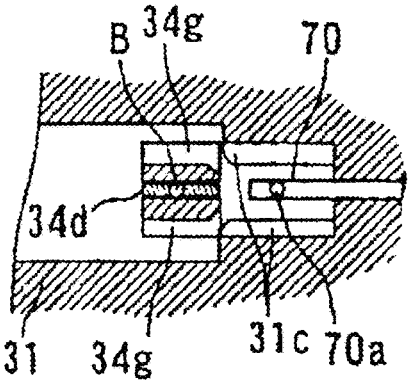
FIG. 28B is a schematic of the portion around the holder of the held portion when the attachment of the toner container is progressed when viewed from the upper side.
Figure 29A:
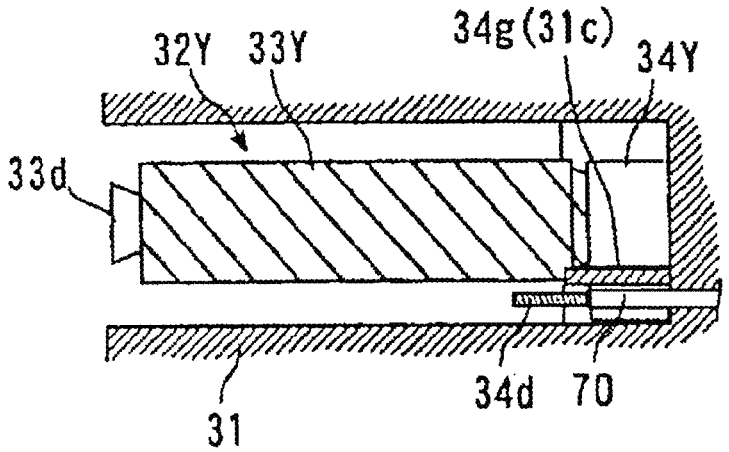
FIG. 29A is a schematic of the toner container attached to the toner-container holder when viewed from the longitudinal direction.
Figure 29B:
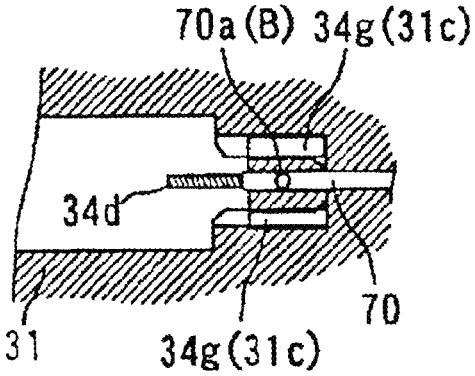
FIG. 29B is a schematic of the portion around the holder when the toner container is attached to the toner-container holder when viewed from the upper side.

FIG. 27A is a schematic of how the yellow toner container 32Y is attached to the toner-container holder 31 (movement in the arrow direction) when viewed from the longitudinal direction, and FIG. 27B is a schematic of the portion around the holder 34c of the held portion 34Y in that state when viewed from the upper side. FIG. 28A is a schematic of how the attachment of the toner container 32Y is progressed (positioning of the held portion 34Y is started) when viewed from the longitudinal direction, and FIG. 28B is a schematic of the portion around the holder 34c of the held portion 34Y in that state when viewed from the upper side. FIG. 29A is a schematic of the toner container 32Y attached to the toner-container holder 31 (attachment is completed) when viewed from the longitudinal direction, and FIG. 29B is a schematic of the portion around the holder 34c in that state when viewed from the upper side.

Provided in the toner-container holder 31 are four toner-container holders corresponding to the four toner containers 32Y, 32M, 32C, and 32K, respectively. Each of the four toner container holders includes the sliding faces 31a and 31b along which the sliding portions 34c1 and 34c2 of the held portion 34Y slide; the holding portion 73 for fixing the position of the holder 34c of the held portion 34Y; the nozzle 70; and the drive unit (not shown) for transmitting a rotational driving force to the container body 33Y. The holding portion 73 includes the sliding faces 31a and 31b contacting the holder 34c, and the contact face (not shown) contacting a part of the cap cover 34b. Provided in the sliding face 31b (side face) of the holding portion 73 is the positioning member 31c for positioning in synchronization with the attachment operation of the held portion 34Y. The positioning member 31c is a convex portion extended along the attachment/detachment direction of the toner container 32Y.

When the toner container 32Y is attached to the toner-container holder 31 of the apparatus body 100, at first, the main-body cover (not shown) provided on the front face (the near side on the paper of FIG. 1) of the main body of the image forming apparatus 100 is opened to expose the toner-container holder 31 to the front side.

Then, referring to FIG. 27A, the toner container 32Y is pushed into the toner-container holder 31 (movement in the arrow direction). More specifically, the toner container 32Y is attached to the toner-container holder 31 along the longitudinal direction of the container body 33Y (or the toner container 32Y) so that the held portion 34Y becomes the head of the container body 33Y.

At this time, the first sliding portion 34c1 slides along the sliding face 31a of the toner-container holder 31 at the head side of the toner container 32Y, and while sliding, the toner container 32Y is pushed into the toner-container holder 31 with sufficient balance by the user gripping the gripper 33d on the rear side of the toner container 32Y.

Referring to FIG. 28A, when the holder 34c of the toner container 32Y reaches the holding portion 73 of the toner-container holder 31, positioning of the held portion 34Y is started while the second sliding portions 34c2 are sliding along the sliding faces 31b in addition to sliding of the first sliding portion 34c1 along the sliding face 31a. More specifically, the engaging portion 34g of the held portion 34Y and the positioning member 31c of the toner-container holder 31 start to be engaged with each other.

Thereafter, when the attachment operation of the toner container 32Y is further progressed, the plug member 34d starts to open the toner outlet B while the engaging portion 34g and the positioning member 31c are engaged with each other. More specifically, the plug member 34d is pushed by the nozzle 70 associated with insertion of the front end of the nozzle 70 into the hole of the holder 34c. Then, as shown in FIG. 29A, the position of the held portion 34Y is fixed in the position where the holder 34c butts against the holding portion 73 (reference position for butting), and at the same time, the plug member 34d fully opens the toner outlet B. The toner outlet B of the toner container 32Y and the toner supply port 70a of the nozzle 70 thereby communicate with each other, and the attachment operation of the toner container 32Y is completed.

As explained above, in the sixth embodiment, the attachment operation of the toner container 32Y to the toner-container holder 31 is configured so that the plug member 34d starts to open the toner outlet B after the positioning of the held portion 34Y is started. More specifically, the front end of the positioning member 31c is formed so that it is located closer to the side of the held portion 34Y than the front end of the nozzle 70 with respect to the held portion 34Y that moves in the attachment direction (i.e., in the direction shown by the arrow in FIG. 27A). In other words, referring to FIG. 27B, the positioning member 31c is formed so as to be made longer than the nozzle 70 by a predetermined length H leftward from the reference position for butting in the holding portion 73.

More specifically, in the sixth embodiment, the attachment operation of the toner container 32Y is completed by one action (except the open/close operation of the main-body door) such that the sliding portion 34c1 of the toner container 32Y slides along the sliding face 31a. In other words, the sliding portion 34c1 of the toner container 32Y is caused to slide along the sliding face 31a, and in synchronization with this operation, the positioning operation of the held portion 34Y is started, and then, the insertion operation of the nozzle 70 is started.

Therefore, the nozzle 70 is surely brought into contact with the plug member 34d (hole) of the held portion 34Y which is accurately positioned by the positioning member 31c. This allows prevention of damage to the nozzle 70 (or the held portion 34Y), which may arise, because the nozzle 70 misses the plug member 34d but hits against the held portion 34Y. In other words, if the insertion operation of the nozzle 70 is started before the held portion 34Y is accurately positioned, the nozzle 70 may miss the plug member 34d but hit against the held portion 34Y, and this causes the stress exceeding the allowable stress to act on the nozzle 70 (or the held portion 34Y), and the nozzle 70 (or the held portion 34Y) may thereby be deformed.

In the sixth embodiment, referring to FIG. 27B, the positioning member 31c has a taper 31c1 (or chamfer) formed at the front end of the side where the held portion 34Y is attached. Furthermore, the engaging portion 34g of the held portion 34Y also has a taper 34g1 (or chamfer) formed at the front end of the side where the positioning member 31c is engaged. This allows smooth engagement between the engaging portion 34g of the held portion 34Y and the positioning member 31c of the toner-container holder 31 during the attachment/detachment operation of the toner container 32Y.

Furthermore, movement of the nozzle 70 to the inside or the outside of the holder 34c and movement of the plug member 34d to the inside or the outside of the holder 34c are performed when both of the members slidably contact the lip of the packing 34e of the holder 34c. Therefore, such a failure that toner is leaked from the holder 34c due to insertion or removal of the nozzle 70 is prevented.

When the toner container 32Y is taken out (removed) from the toner-container holder 31 of the apparatus body 100, the operation is performed in the reverse of the attachment. At this time, the nozzle 70 also separates from the holder 34c in synchronization with the operation of the toner container 32Y separating from the holding portion 73, and the plug member 34d moves to the position of closing the toner outlet B by the biasing force of the compression spring 34f.

In this manner, the detachment operation of the toner container 32Y is completed by one action (except the open/close operation of the main-body door) such that the sliding portion 34c1 of the toner container 32Y slides along the sliding face 31a.

The toner container 32Y according to the sixth embodiment includes the held portion 34Y with the toner outlet B provided in the lower side in the direction of gravity, and after the plug member 34d is surely positioned in synchronization with the attachment operation, the plug member 34d is pushed by the nozzle 70 to open the toner outlet B sealed with the packing 34e. Therefore, there is less toner stain in the toner outlet B, and such trouble that the user's hands become stained with toner by touching the toner outlet B is prevented.

The attachment/detachment operation of the toner container 32Y to/from the toner-container holder 31 is performed by one action associated with sliding of the sliding portion 34c1, and therefore, the operability/workability upon replacement of the toner container 32Y is improved. Particularly, by providing the sliding portion 34c1 in the bottom of the held portion 34Y, the sliding portion 34c1 slides along the sliding face 31a while supporting the toner container 32Y.

Moreover, the attachment operation of the toner container 32Y is performed by starting to slide the sliding portion 34c1 while the user directly grips the gripper 33d, starting positioning of the held portion 34Y associated with the sliding, starting insertion of the nozzle 70, and finishing the positioning of the held portion 34Y and the insertion of the nozzle 70 as soon as the sliding is finished. Therefore, the user gains a click feeling when the held portion 34Y is positioned at the same time when the sliding of the held portion 34Y (attachment operation by one action) is progressed, and feels certain that no erroneous operation occurs in the attachment operation.

Furthermore, the toner container 32Y is not set in the toner-container holder 31 (apparatus body 100) from the upper side thereof, but the attachment/detachment is performed from the front face of the toner-container holder 31 (apparatus body 100), thus, enhancing the flexibility of layout for the upper side of the toner-container holder 31. For example, even if a scanner (document reader) is disposed right above the toner-container holder, the operability/workability upon attachment/detachment of the toner container 32Y does not deteriorate.

The toner container 32Y is installed in the apparatus body 100 by setting its longitudinal direction as the horizontal direction, and therefore, the toner capacity of the toner container 32Y is increased without any effect on the layout in the height direction of the whole image forming apparatus 100, which allows reduction in the replacement frequency.

As explained above, in the sixth embodiment, when the toner container 32Y is to be attached to the toner-container holder 31, the positioning of the held portion 34Y is started in synchronization with the attachment operation, and then the plug member 34d starts to open the toner outlet B. Therefore, the toner outlet B is unfailingly and smoothly opened. The operability/workability upon replacement of the toner container 32Y can thereby be improved, and the occurrence of toner stain can be surely reduced.

Seventh Embodiment

A seventh embodiment of the present invention is explained in detail below with reference to FIG. 30A and FIG. 30B.

Figure 30A:
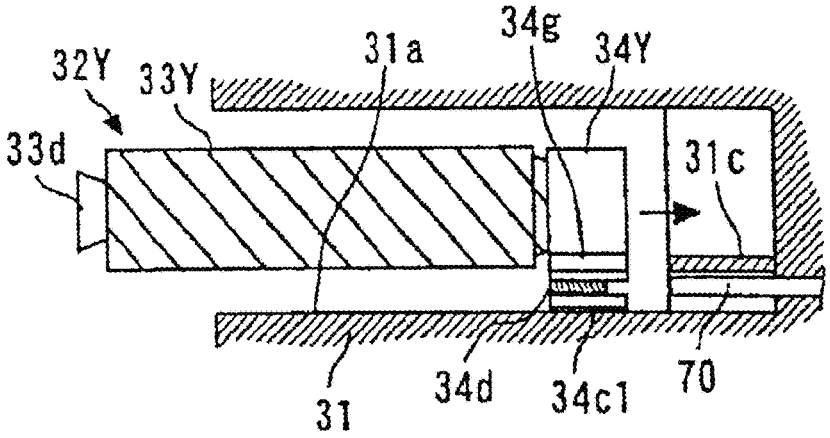
FIG. 30A is a schematic of how a toner container according to a seventh embodiment is attached to the toner-container holder.
Figure 30B:
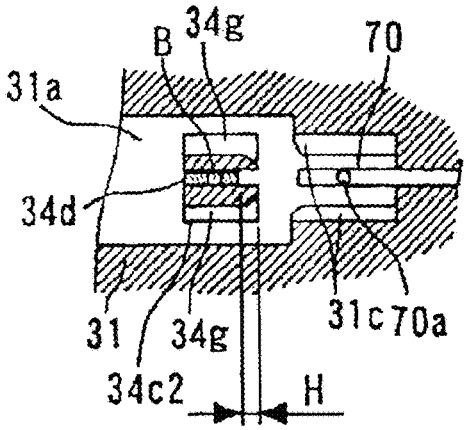
FIG. 30B is a schematic of how the toner container according to the seventh embodiment is attached to the toner-container holder.

FIG. 30A and FIG. 30B are schematics of how the toner container 32Y according to the seventh embodiment is attached to the toner-container holder 31, and correspond to FIG. 27A and FIG. 27B according to the sixth embodiment. The seventh embodiment is different from the sixth embodiment mainly in the shape of the held portion 34Y of the toner container 32Y.

The toner container 32Y according to the seventh embodiment also includes the container body 33Y and the held portion 34Y (bottle cap), similarly to the sixth embodiment. The plug member 34d being the open/close member is provided in the held portion 34Y of the toner container 32Y, and the engaging portion 34g engaged with the positioning member 31c of the toner-container holder 31 is provided therein.

The held portion 34Y according to the seventh embodiment is different from the sixth embodiment in the following manner. The front end of the engaging portion 34g engaging with the positioning member is formed such that when the held portion 34Y moves in the attachment direction (i.e., in the direction shown by the arrow in FIG. 30A) with respect to the toner-container holder 31, the front end is located closer to the toner-container holder 31 side (right-hand side on the paper) than the front end of the plug member 34d pushed by the nozzle 70. In other words, the engaging portion 34g is formed so as to be longer by a predetermined length H in the holding portion 73 side than the plug member 34d. In the toner-container holder 31, the positioning member 31c and the nozzle 70 are formed so as to be almost equivalent to each other in length from the reference position for butting in the holding portion 73.

Based on the configuration above, in the seventh embodiment, similarly to the sixth embodiment, during the attachment operation of the toner container 32Y to the toner-container holder 31, the positioning of the held portion 34Y is started, and then the plug member 34d starts to open the toner outlet B. Therefore, it is possible to prevent, before occurring, the damage given to the nozzle 70 (or the held portion 34Y) caused by the case where the nozzle 70 misses the plug member 34d but hits against the held portion 34Y.

As explained above, in the seventh embodiment, similarly to the sixth embodiment, when the toner container 32Y is to be attached to the toner-container holder 31, after the positioning of the held portion 34Y is started in synchronization with the attachment operation, the plug member 34d starts to open the toner outlet B. Therefore, the toner outlet B is unfailingly and smoothly opened. The operability/workability upon replacement of the toner container 32Y can thereby be improved, and the occurrence of toner stain can be surely reduced.

Eighth Embodiment

An eighth embodiment of the present invention is explained in detail below with reference to FIG. 31.

Figure 31:
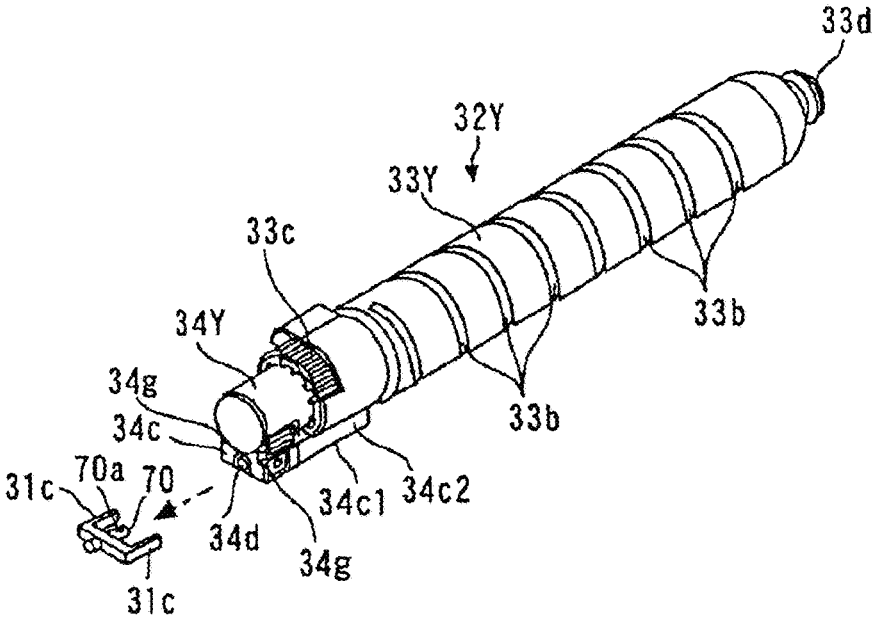
FIG. 31 is a perspective view of a toner container according to an eighth embodiment.

FIG. 31 is a perspective view of the toner container according to the eighth embodiment, and corresponds to FIG. 5 of the first embodiment. The eighth embodiment is different from the first embodiment in the shape of the positioning member 31c provided in the toner-container holder.

Referring to FIG. 31, the positioning member 31c provided in the toner-container holder according to the eighth embodiment is protruded together with the nozzle 70 from the rear side of the holding portion of the toner-container holder to the side of the held portion 34Y, unlike the first embodiment in which the positioning member 31c is integrally formed on the wall face (side face) of the toner-container holder. Similarly to the sixth embodiment, the positioning member 31c according to the eighth embodiment is also formed so as to be longer than the nozzle 70 by a predetermined length from the reference position for butting in the holding portion to the side of the held portion 34Y.

Based on the configuration above, in the eighth embodiment also, similarly to the sixth embodiment, during the attachment operation of the toner container 32Y to the toner-container holder 31, the positioning of the held portion 34Y is started, and then the plug member 34d starts to open the toner outlet B. Therefore, it is possible to prevent, before occurring, the damage given to the nozzle 70 (or the held portion 34Y) caused by the case where the nozzle 70 misses the plug member 34d but hits against the held portion 34Y.

As explained above, in the eighth embodiment, similarly to the sixth embodiment, when the toner container 32Y is to be attached to the toner-container holder 31, after the positioning of the held portion 34Y is started in synchronization with the attachment operation, the plug member 34d starts to open the toner outlet B. Therefore, the toner outlet B is unfailingly and smoothly opened. The operability/workability upon replacement of the toner container 32Y can thereby be improved, and the occurrence of toner stain can be surely reduced.

Ninth Embodiment

A ninth embodiment of the present invention is explained in detail below with reference to FIG. 32.

Figure 32:
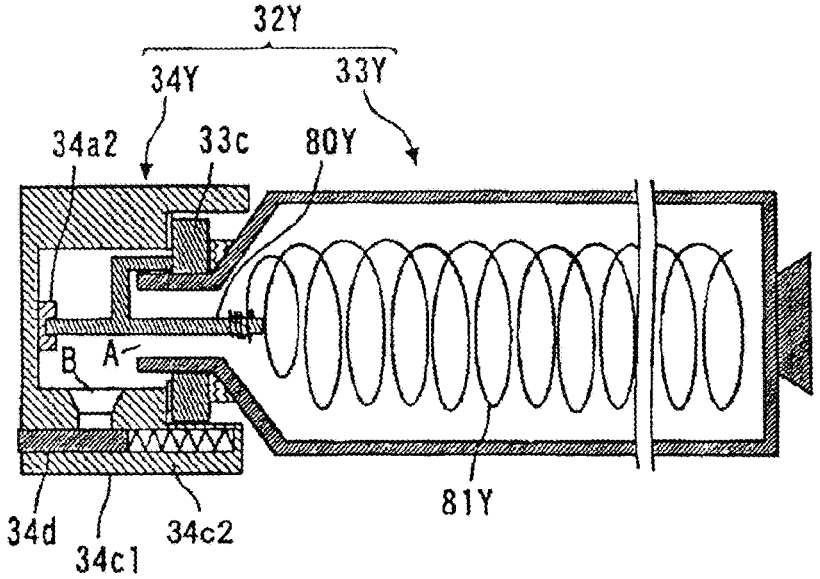
FIG. 32 is a cross-section of a toner container according to a ninth embodiment.

FIG. 32 is a cross-section of a toner container according to the ninth embodiment. The toner container 32Y according to the ninth embodiment has some points that the container body 33Y together with the held portion 34Y is held by the toner-container holder 31 in a non-rotating manner, and that a coil 81Y as the conveyor member is provided in the container body 33Y, and these points are different from the embodiments in which the container body 33Y rotates to convey the toner contained therein to the opening A.

As shown in FIG. 32, the toner container 32Y mainly includes the container body 33Y and the held portion 34Y.

The opening A is provided in the head of the container body 33Y, and the gear 33c is rotatably provided around the outer periphery of the opening A. The gear 33c is engaged with the drive gear of the apparatus body 100 to rotate the coil 81Y.

A rotating axis 80Y is integrally formed with the gear 33c, and the spiral-shaped coil 81Y is connected to the rotating axis 80Y. One end of the rotating axis 80Y is supported by a bearing portion 34a2 of the held portion 34Y. The coil 81Y is extended from the opening A over the rear end (bottom) inside the container body 33Y. The gear 33c rotates around the container body 33Y to rotate the rotating axis 80Y and the coil 81Y.

Therefore, the toner contained in the container body 33Y is conveyed toward the opening A by the toner conveying force of the coil 81Y.

Because the outer diameter of the coil 81Y is smaller than the internal diameter of the container body 33Y, the toner conveying force can be exerted on the toner near the rotational central axis which is far from the inner circumferential surface of the container body 33Y. Furthermore, the coil 81Y is comparatively flexible in shape and is supported only by one end thereof, thus, the position is swaying during rotation. This can totally exert the toner conveying force from the inner circumferential surface of the container body 33Y over the rotational central axis. Therefore, even if the large amount of toner is contained in the container body 33Y and toner aggregation occurs therein due to environmental changes or "being left too long", the aggregation status is weakened by the toner conveying force due to the coil 81Y, and reduction in toner amount to be discharged can thereby be prevented.

In the ninth embodiment, similarly to the embodiments, when the toner container 32Y is attached/detached to/from the toner-container holder 31, the plug member 34d of the held portion 34Y opens/closes the toner outlet B in synchronization with the attachment/detachment operation performed by the one action. In this case, the positioning of the held portion 34Y is started, and then the plug member 34d starts to open the toner outlet B. Furthermore, the sliding portions 34c1 and 34c2 are provided in the held portion 34Y so as to slide along the toner-container holder 31 in synchronization with the attachment/detachment operation to/from the toner-container holder 31.

As explained above, in the ninth embodiment, similarly to the embodiments, the configuration of the toner container installed in the toner-container holder is optimized based on its longitudinal direction set as the horizontal direction. Therefore, the operability/workability upon the replacement is improved, and the occurrence of toner stain can be surely reduced.

The coil 81Y is used as the conveyor member in the ninth embodiment, but a screw can also be used as the conveyor member. In this case also, the same effect as that of the fourth embodiment can be obtained.

Tenth Embodiment

A tenth embodiment of the present invention is explained in detail below with reference to FIG. 33 and FIG. 34.

Figure 33:
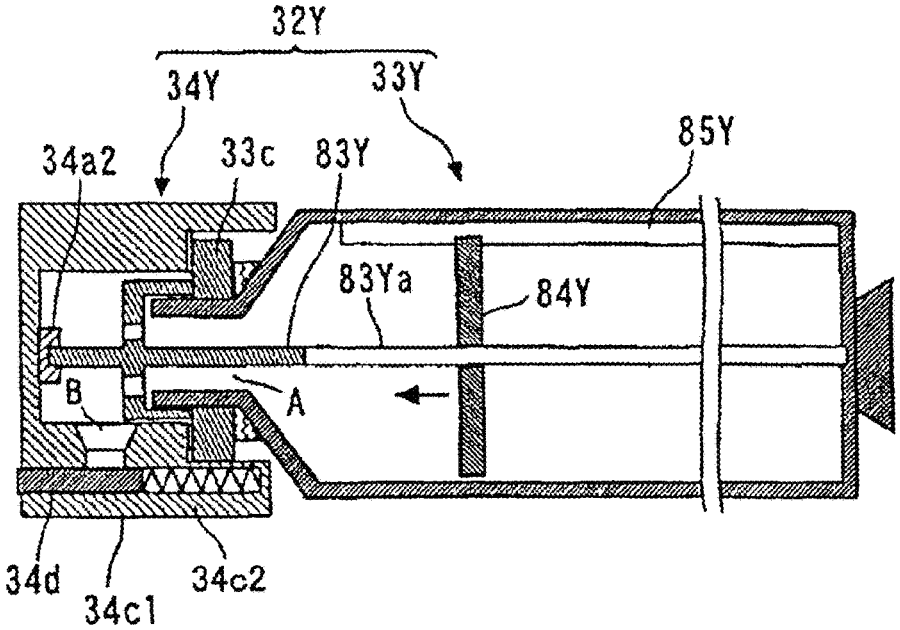
FIG. 33 is a cross-section of a toner container according to a tenth embodiment.
Figure 34:
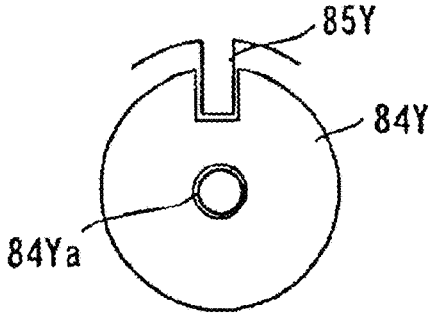
FIG. 34 is a schematic of a plate member.

FIG. 33 is a cross-section of a toner container according to the tenth embodiment, which corresponds to FIG. 32 according to the ninth embodiment. FIG. 34 is a schematic of a plate member 84Y. The toner container according to the tenth embodiment is different from the ninth embodiment in that the plate member 84Y is used as the conveyor member.

As shown in FIG. 33, the toner container 32Y mainly includes the container body 33Y and the held portion 34Y.

The opening A is provided in the head of the container body 33Y, and the gear 33c is rotatably provided around the outer periphery of the opening A. The gear 33c is engaged with the drive gear of the apparatus body 100 to be rotated, similarly to the ninth embodiment.

A threaded rod 83Y is integrally formed with the gear 33c, and the plate member 84Y is provided on the threaded rod 83Y. More specifically, a male screw portion 83Ya of the threaded rod 83Y is screwed with a female screw portion 84Ya in the plate member 84Y (see FIG. 34). Referring to FIG. 34, a notched portion is formed on the plate member 84Y, and this notched portion is engaged with a guide portion 85Y which is protruded along the inner circumferential surface of the container body 33Y.

Referring to FIG. 33, the threaded rod 83Y is supported at its one end by the bearing portion 34a2 of the held portion 34Y, and is supported at the other end by a bearing portion provided in the rear side of the container body 33Y. The gear 33c is made to rotate around the container body 33Y, and the threaded rod 83Y is also integrally rotated. Therefore, the plate member 84Y engaged with the threaded rod 83Y moves along the screw feeding direction (movement in the arrow direction toward the opening A) while being guided by the guide portion 85Y (without being rotated following the threaded rod 83Y). The speed of the movement of the plate member 84Y is set comparatively slowly in accordance with the speed of toner consumption of the container body 33Y.

In this manner, the toner contained in the container body 33Y is conveyed to the opening A side by the toner conveying force of the plate member 84Y.

Here, the outer diameter of the plate member 84Y is formed so as to be slightly smaller than the internal diameter of the container body 33Y, and the toner conveying force can be exerted on the toner near the rotational central axis A which is far from the inner circumferential surface of the container body 33Y. Therefore, even if the large amount of toner is contained in the container body 33Y and toner aggregation occurs therein due to environmental changes or "being left too long", the aggregation status is weakened by the toner conveying force due to the plate member 84Y, and reduction in toner amount to be discharged can thereby be prevented.

In the tenth embodiment, similarly to the embodiments, when the toner container 32Y is attached/detached to/from the toner-container holder 31, the plug member 34d of the held portion 34Y opens/closes the toner outlet B in synchronization with the attachment/detachment operation performed by the one action. In this case, the positioning of the held portion 34Y is started, and then the plug member 34d starts to open the toner outlet B. Furthermore, the sliding portions 34c1 and 34c2 are provided in the held portion 34Y so as to slide along the toner-container holder 31 in synchronization with the attachment/detachment operation to/from the toner-container holder 31.

As explained above, in the tenth embodiment, similarly to the embodiments, the configuration of the toner container installed in the toner-container holder is optimized based on its longitudinal direction set as the horizontal direction.

Therefore, the operability/workability upon the replacement is improved, and the occurrence of toner stain can be surely reduced.

Eleventh Embodiment

An eleventh embodiment of the present invention is explained in detail below with reference to FIG. 35 to FIG. 42. In the conventional technology, there is little toner stain in the toner outlet of the toner container, and such trouble that the user's hands become stained with toner by touching the toner outlet can be expected to be suppressed. However, there are some problems that the operability (setting) upon the replacement of the toner container is inadequate because the position of the held portion is not fixed when the toner container is installed and that toner may scatter from near the toner outlet upon the replacement of the toner container.

To resolve the problems, the following embodiment provides a toner-container holder and an image forming apparatus capable of reliably reducing the occurrence of toner scatter with easy operation when the toner container is replaced.

The configuration and the operation of the overall image forming apparatus are explained first.

Figure 35:
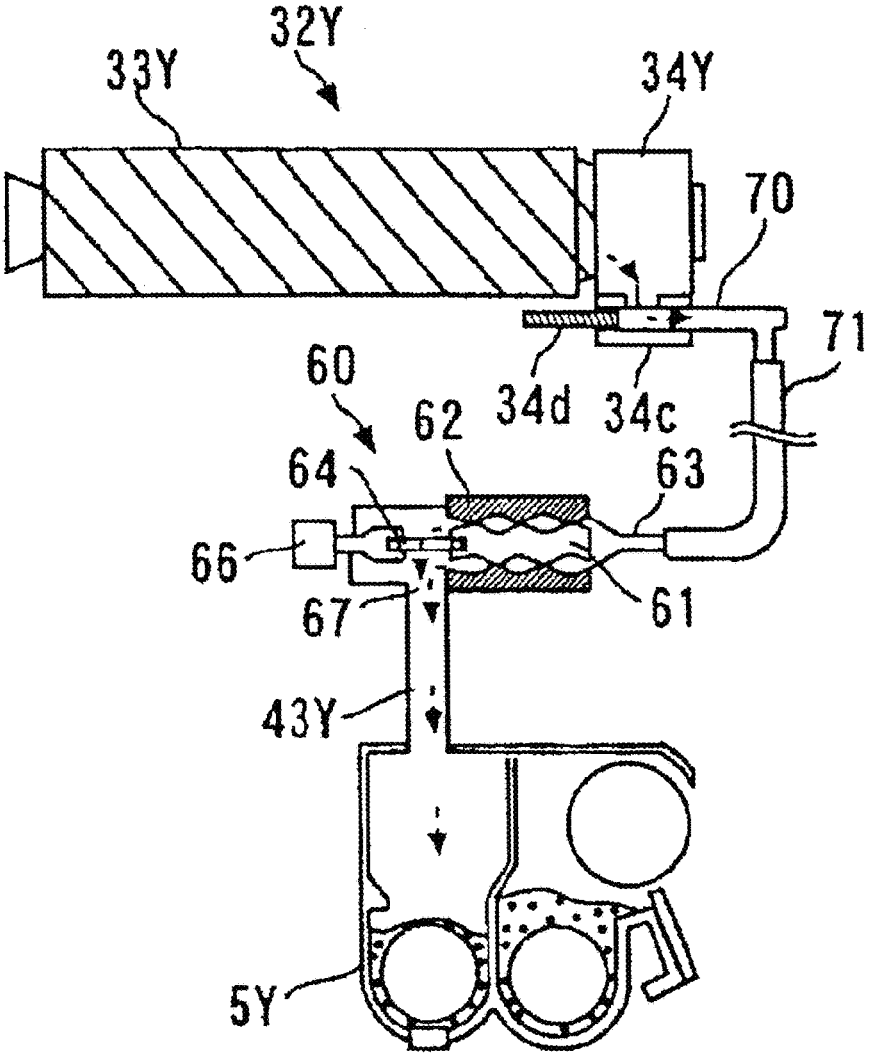
FIG. 35 is a schematic of a toner supply path of the image forming apparatus.

FIG. 35 is a schematic of a toner supply path of the image forming apparatus according to the eleventh embodiment. The overall configuration of the image forming apparatus according to the eleventh embodiment is the same as that of the image forming apparatus according to the first embodiment with reference to FIG. 1, FIG. 2, and FIG. 4. However, there are some different points in a toner supply device of the image forming apparatus according to the eleventh embodiment from the toner supply device 59 of the image forming apparatus according to the first embodiment. That is, as shown in FIG. 35, the plug member 34d does not include the claw member 76 shown in FIG. 3, and the ID chip 35 of the toner container 32Y is directly provided on the flat portion of the front end thereof without providing the protrusion portion 34a1 on the head of the held portion 34Y. The rest of the components are the same as those of the image forming apparatus according to the first embodiment.

The toner container is explained below with reference to FIG. 36 to FIG. 38.

Similarly to the first embodiment explained with reference to FIG. 1 and FIG. 4, in the eleventh embodiment, the four substantially cylindrical toner containers 32Y, 32M, 32C, and 32K (toner bottles) are detachably provided in the toner-container holder 31. The toner containers 32Y, 32M, 32C, and 32K are replaced with new ones when they come to the end of their lives such that almost all of toner contained is consumed and the container becomes empty. The toner of each color contained in the toner containers 32Y, 32M, 32C, and 32K is supplied as necessary to each developing device of the imaging units 6Y, 6M, 6C, and 6K through the toner supply path as shown in FIG. 35.

Figure 36:
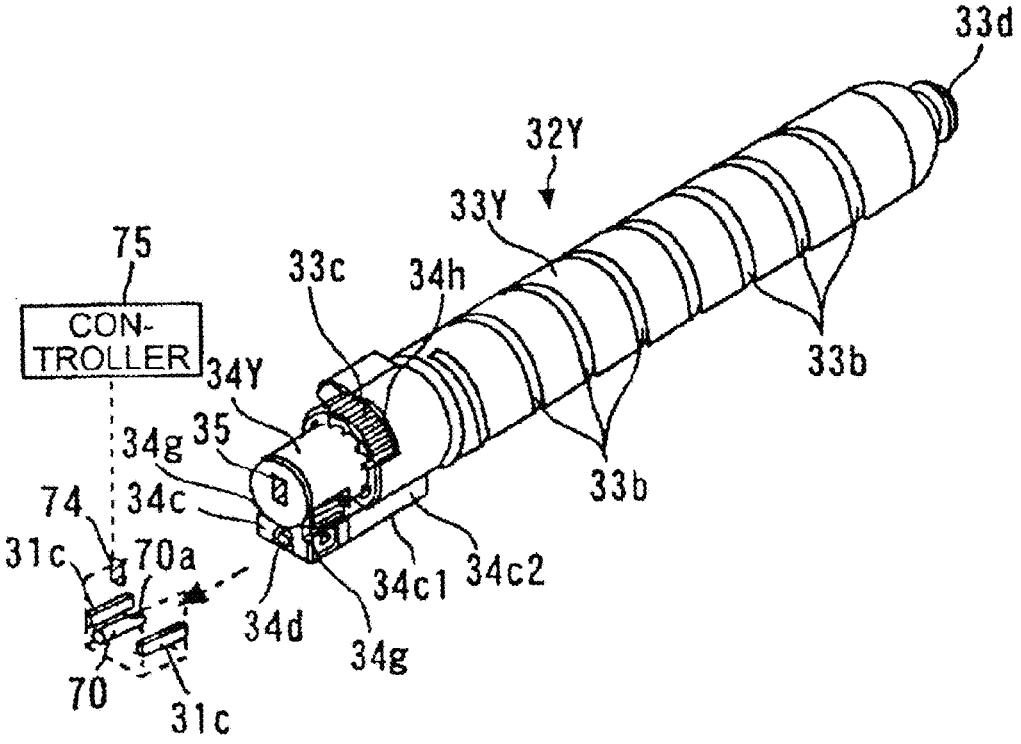
FIG. 36 is a perspective view of a toner container.

FIG. 36 is a perspective view of the toner container 32Y. FIG. 37 is a cross-section of a head side (the side where the held portion 34Y is provided) of the toner container 32Y. FIG. 38 is a schematic of the toner container 32Y of FIG. 37 when viewed from the direction of the arrow M.

The other three toner containers 32M, 32C, and 32K have almost the same configuration as the toner container 32Y containing yellow toner, except different toner colors contained. Hereinafter, explanation of the other three toner containers 32M, 32C, and 32K is omitted, and only the toner container 32Y containing yellow toner is explained below.

Figure 37:
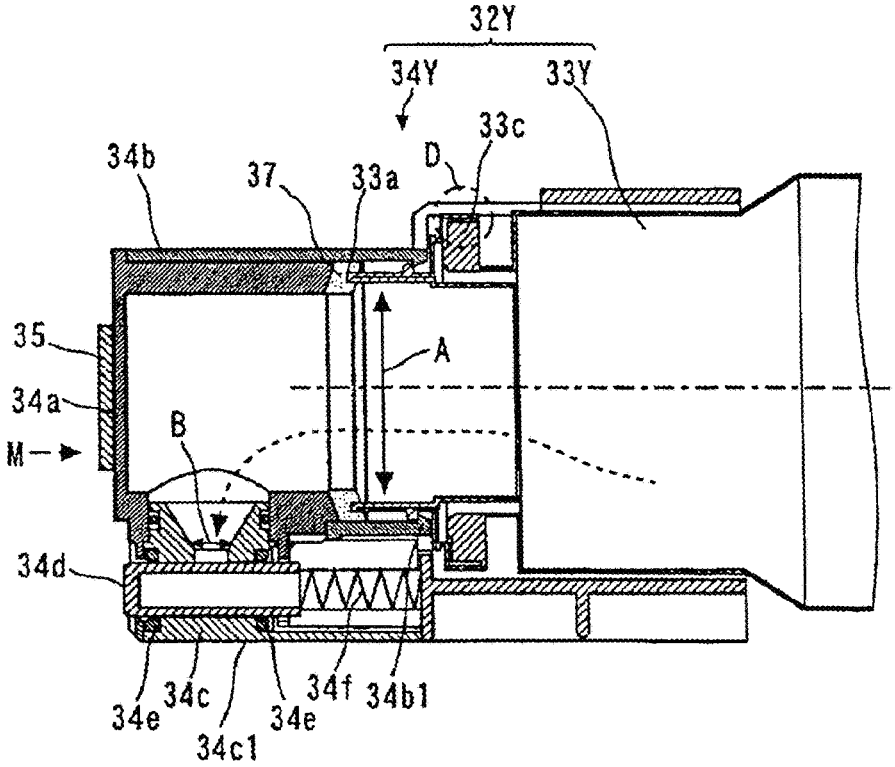
FIG. 37 is a cross-section of a head side of the toner container.
Figure 38:
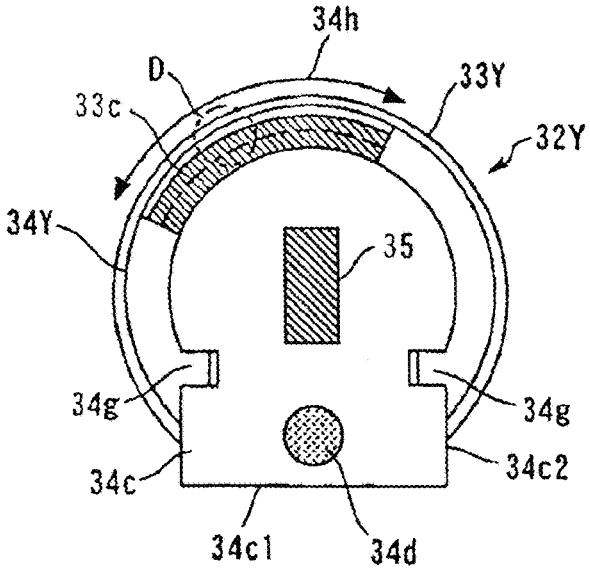
FIG. 38 is a schematic of the toner container when viewed from the M direction in FIG. 37.

Referring to the toner container according to the eleventh embodiment shown in FIG. 36 to FIG. 38, the portions equivalent to those of the toner container of the first embodiment are assigned with the same reference numerals as those in FIG. 5 to FIG. 7, and explanation thereof is omitted. The toner container according to the eleventh embodiment does not include the stirring member 33f, the claw member 76, the rotating spindle 76a, the protrusion portion 34a1, the concave portion 34m, the fitting member 31d, and the convex portion 34n, which are provided in the toner container of the first embodiment. Further, the drive gear 31g of FIG. 5 is not shown in FIG. 36.

The toner container according to the eleventh embodiment includes the compression spring 34f as the biasing unit. The compression spring 34f is provided on the right side of the plug member 34d of FIG. 37 so as to bias the plug member 34d in the direction of closing the toner outlet B. The ID chip 35 of the eleventh embodiment is disposed on the position that is the plane of the held portion 34Y orthogonal to the attachment/detachment direction (i.e., in the direction shown by the arrow in FIG. 36) with respect to the toner-container holder 31 and that faces the communication circuit 74 during the attachment/detachment operation.

The sliding portions 34c1 and 34c2 are provided in the holder 34c of the held portion 34Y so as to slide along the toner-container holder 31 in synchronization with the attachment/detachment operation to/from the toner-container holder 31.

More specifically, the first sliding portion 34c1 is a flat portion formed so as to be parallel with the sliding face (guide rail) 31a of a base plate 310a (which is a plane with a flat face formed upward; see FIG. 10) provided in the toner-container holder 31, the flat portion being provided in the bottom of the held portion 34Y with which the attachment/detachment is operated. Furthermore, the second sliding portion 34c2 is a flat portion formed so as to be parallel with the sliding face 31b (which is a plane with a flat face formed sideward; see FIG. 10) of the toner-container holder 31, the flat portion being provided in the side portion of the held portion 34Y with which the attachment/detachment is operated.

As shown in FIG. 37, the toner container 32Y has the toner outlet B (or the plug member 34d) provided in the lower side in the vertical direction (lower side in FIG. 37) than the opening A of the container body 33Y while the toner container 32Y is set in the toner-container holder 31.

This allows the toner in the toner container 32Y to move in the direction indicated by the dotted line of FIG. 37 and be discharged from the toner outlet B opened in synchronization with the attachment operation of the toner container 32Y. In other words, the toner in the container body 33Y is discharged from the opening A, and is discharged from the toner outlet B provided in the lower side in the vertical direction.

The toner outlet B is provided in a more rear side (left side of FIG. 37) than the container body 33Y (or the opening A) with respect to the attachment direction to the toner-container holder 31.

This allows the toner outlet B to be smoothly and unfailingly opened/closed in synchronization with the attachment/detachment operation of the toner container 32Y along the longitudinal direction (axial direction). In other words, when the toner container 32Y is to be attached, the positioning of the held portion 34Y is started, and then the nozzle 70 and the plug member 34d are preferentially contacted with each other. Furthermore, because the holding portion 73 of the toner-container holder 31 including the nozzle 70 can be provided in the rear side in the attachment direction (left side of FIG. 37), the layout of the apparatus body 100 is simplified.

Further, the toner outlet B is provided in a more rear side (left side of FIG. 37) in the attachment direction to the toner-container holder 31, than the gear 33c which is disposed on the periphery of the container body 33Y and is near the opening A.

This allows the toner outlet B to be smoothly and reliably opened/closed in synchronization with the attachment/detachment operation of the toner container 32Y along the longitudinal direction. In other words, when the toner container 32Y is to be attached, the positioning of the held portion 34Y is started, and then the nozzle 70 and the plug member 34d are preferentially contacted with each other, and thereafter, the gear 33c and the drive gear 31g are engaged with each other.

The toner-container holder 31 according to the eleventh embodiment is explained below. The toner-container holder 31 according to the eleventh embodiment is explained with reference to FIG. 10 and FIG. 11 in the first embodiment and FIG. 21 and FIG. 22 in the fourth embodiment.

As shown in FIG. 10, the toner-container holder 31 includes the sliding face 31a along which a sliding portion in each held portion of the four toner containers 32Y, 32M, 32C, and 32K slides; the holding portion 73 for fixing the position of the holder 34c of the held portion; the nozzle 70 being an engaging member; a drive unit for transmitting a rotational driving force to the container body 33Y; the communication circuit 74; and the arm pairs 90 serving as the biasing member and the second biasing member.

The holding portion 73 holds the held portions of the toner containers 32Y, 32M, 32C, and 32K each in the non-rotating manner. The holding portion 73 includes sliding faces contacting the holder 34c and a contact face contacting a part of the cap cover 34b. Provided in the sliding faces (side faces) of the holding portion 73 are the positioning members 31c for positioning in synchronization with the attachment operation of the held portion 34Y (see FIG. 36). The positioning member 31c is a convex portion extended along the attachment/detachment direction of the toner container 32Y.

The nozzle 70 as shown in FIG. 11 is provided in the holding portion 73 for each toner color. Provided in the nozzle 70 is the toner supply port 70a communicating with the toner outlet B which is formed in the held portion 34Y of the toner container 32Y.

Referring to FIG. 10 and FIG. 21, the arm pairs 90 are provided for each toner color near the holding portion 73 of the toner-container holder 31 (position right before insertion of the held portion of the toner container into the holding portion). As shown in FIG. 21, the arm pairs 90 are disposed on both sides sandwiching the held portion of the toner container.

Referring to FIG. 22, the arm pair 90 includes the first arm 91, the second arm 92, the spindle 93, and the torsion spring 94. The arm pair 90 is integrally provided via the spindle 93, and affects the force on both directions in the direction of rotation around the spindle 93 by the torsion spring 94. More specifically, the first arm 91 and the second arm 92 affect the force on both directions in the direction of rotation around the spindle 93. The force increases more as an angle formed between the first arm 91 and the second arm 92 increases.

The arm pairs 90 configured in the above manner serve as a biasing unit for biasing the held portion 34Y (toner container 32Y) toward the holding portion 73 (biasing it toward the direction of the arrow Q of FIG. 4) in synchronization with the attachment operation of the toner container 32Y. Furthermore, the arm pairs 90 also serve as the second biasing member for biasing the held portion 34Y (toner container 32Y) in the direction (opposite direction to the arrow Q of FIG. 4) in which the held portion 34Y (toner container 32Y) is separated from the holding portion 73 in synchronization with the detachment operation of the toner container 32Y.

Figure 39:
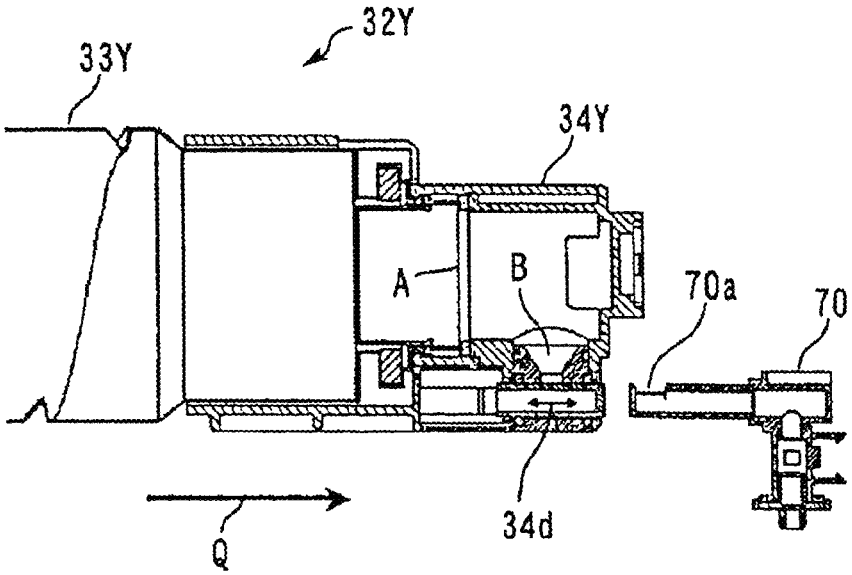
FIG. 39 is a schematic of how the yellow toner container is attached to the toner-container holder when viewed from the longitudinal direction.
Figure 40:
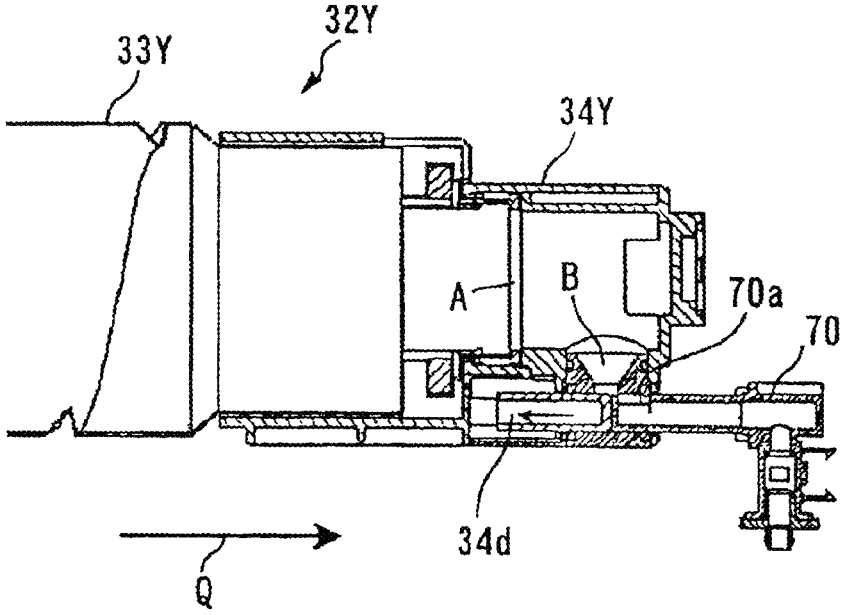
FIG. 40 is a schematic of how the attachment of the toner container is progressed when viewed from the longitudinal direction.
Figure 41:
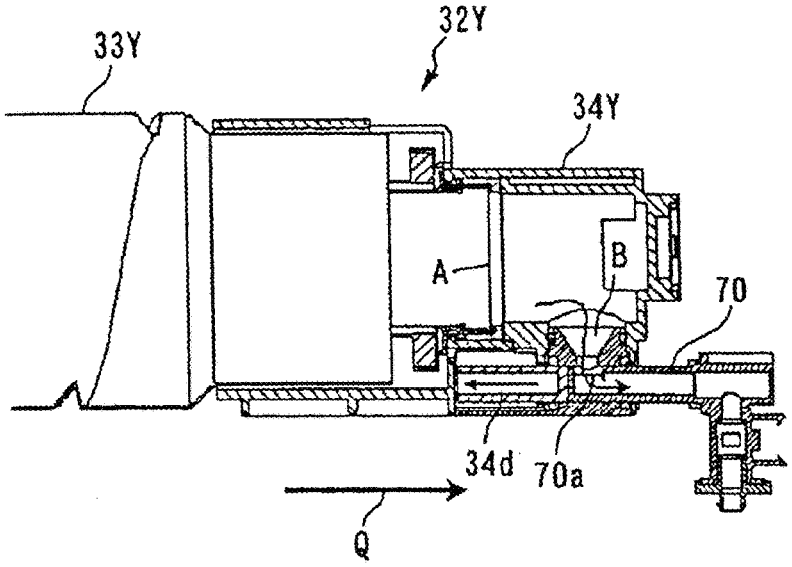
FIG. 41 is a schematic of the toner container attached to the toner-container holder when viewed from the longitudinal direction.

FIG. 39 is a schematic of how the yellow toner container 32Y is attached to the toner-container holder (movement in the direction of the arrow Q) when viewed from the longitudinal direction. FIG. 40 is a schematic of how the attachment of the toner container 32Y is progressed (when the toner outlet B starts to be opened) when viewed from the longitudinal direction. FIG. 41 is a schematic of the toner container 32Y attached to the toner-container holder 31 (when the toner outlet B is fully opened) when viewed from the longitudinal direction.

The attachment/detachment operation of the toner container 32Y to/from the toner-container holder 31 is the same as that of the fourth embodiment explained with reference to FIG. 12 to FIG. 14 and FIG. 23 to FIG. 25.

In the eleventh embodiment, the movement of the held portion 34Y to the holding portion 73 and the opening of the toner outlet B of the toner container 32Y are performed by the biasing force of the arm pairs 90.

Figure 42:
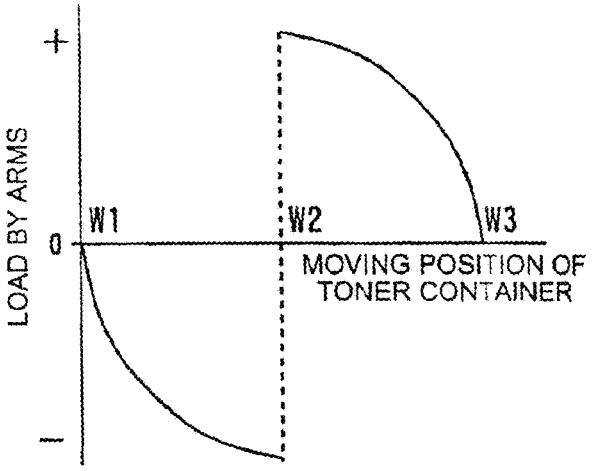
FIG. 42 is a graph indicating a relation between a moving position of the held portion and a load applied from the arm pairs to the held portion during the attachment operation of the toner container.

FIG. 42 is a graph indicating a relation between a moving position of the held portion 34Y (toner container 32Y) and a load applied from the arm pairs 90 to the held portion 34Y during the attachment operation of the toner container.

As shown in FIG. 42, when the held portion 34Y moves to the position of W1 (positions in FIG. 39 and FIG. 23), the held portion 34Y undergoes the force in the opposite direction to the attachment direction (direction of the arrow Q). In other words, the force in the direction of separating the toner container 32Y from the holding portion 73 is applied to the toner container 32Y right before being biased toward the holding portion 73 by the arm pairs 90. This causes the user to push the toner container 32Y into the side of the holding portion 73 with the strength overcoming the force. Therefore, the pushing strength by the user is added to the biasing force of the arm pairs 90 applied to the held portion 34Y, and the toner outlet B is thereby burst open.

The held portion 34Y further moves to the position of W2 in FIG. 42 (positions in FIG. 40 and FIG. 24), and the held portion 34Y undergoes the force (biasing force by the arm pairs 90) in the attachment direction (the direction of the arrow Q). At this time, an object to be sealed by the packing 34e of the held portion 34Y is switched from the plug member 34d to the nozzle 70. The switching speed is accelerated by the arm pairs 90, and this enables reduction of the time for which sealing capability is degraded due to switching between the objects to be sealed.

The position of the held portion 34Y is fixed in the position of W3 (positions in FIG. 41 and FIG. 25) in FIG. 42.

In this manner, in the eleventh embodiment, the speed of opening the toner outlet B of the toner container 32Y is mechanically determined by the arm pairs 90 without being determined based on the user's operation speed (the speed of pushing the toner container). Therefore, the time for which the sealing capability of the held portion 34Y is degraded is not made extremely long, but made short almost constantly at any time, and toner scattered from near the toner outlet B is thereby reduced.

In the eleventh embodiment, the biasing operation by the arm pairs 90 and the positioning operation of the held portion 34Y are started in synchronization with one action (except the open/close operation of the main-body door) such that the sliding portion 34c1 of the toner container 32Y slides along the sliding face 31a, and then, the insertion operation of the nozzle 70 is started, and finally, linkage of the gear 33c to the drive gear is completed. This allows improved operability of the attachment operation of the toner container 32Y.

When the toner container 32Y is to be taken out (removed) from the toner-container holder 31 of the apparatus body 100, the operation is performed in the reverse of the attachment. In this case, the nozzle 70 also separates from the holder 34c in synchronization with the operation such that the toner container 32Y separates from the holding portion 73, and the plug member 34d is moved to the position of closing the toner outlet B by the biasing force of the compression spring 34f.

In this manner, the detachment operation of the toner container 32Y is completed by one action (except the open/close operation of the main-body door) such that the sliding portion 34c1 of the toner container 32Y slides along the sliding face 31a.

At this time, the arm pairs 90 serve as the second biasing members for biasing the held portion 34Y (toner container 32Y) in the direction in which the held portion 34Y is separated from the holding portion 73 in synchronization with the detachment operation of the toner container 32Y. This allows the speed of closing the toner outlet B of the toner container 32Y to be mechanically determined by the arm pairs 90 without being determined based on the user's operation speed (the speed of pulling out the toner container). Therefore, the time for which the sealing capability of the held portion 34Y is degraded is not made extremely long, but made short almost constantly at any time, and toner scattered from near the toner outlet B is thereby reduced.

The effects in the eleventh embodiment are sorted out relating to the background art.

In the technologies described in Patent documents 1 to 4, if the user's operation speed of manually attaching/detaching the toner container gets slow, toner may scatter from near the toner outlet.

More specifically, in the technologies described in Patent document 1 and Patent document 2, the user manually rotates the held portion of the toner container on the toner-container holder, to cause the shutter to move and open the toner outlet. In other words, the speed of opening the toner outlet of the toner container is determined based on the user's operation speed (the speed of rotating the held portion). If the speed of opening the toner outlet of the toner container is extremely slow, there is a high probability that the toner near the toner outlet may scatter outside the toner container, and the apparatus body may be contaminated with the toner. This is because the sealing capability near the toner outlet during the opening operation of the toner outlet (dynamic state) is degraded as compared with that before and after the toner outlet is opened (static state). Therefore, if the speed of opening the toner outlet of the toner container is extremely decreased, the time for which the sealing capability is degraded is increased, and the toner is thereby scattered from near the toner outlet.

Likewise, in the technology described in Patent document 4, the user manually rotates the open/close holder with the toner storage container (toner container) set therein, to cause the toner conveying pipe (nozzle) to push the plug member and open the toner outlet sealed with the packing. In other words, the speed of opening the toner outlet of the toner storage container is determined based on the user's operation speed (the speed of rotating the open/close holder). Therefore, similarly to the technologies in Patent document 1 and Patent document 2, if the speed of opening the toner outlet of the toner storage container is extremely decreased, the time for which the sealing capability due to packing is degraded is increased, and the toner is thereby scattered from near the toner outlet.

Here, to resolve the problems, some measures can also be considered. That is, an opening area of the toner outlet is made smaller or adhesion of a seal member disposed near the toner outlet is enhanced. However, the former measure restricts the toner amount to be discharged from the toner container, and the latter measure reduces the operability of attaching/detaching the toner container caused by the seal member with enhanced adhesion.

In the eleventh embodiment, the toner-container holder 31 is configured so as to bias the toner container 32Y toward the holding portion 73 of the toner-container holder 31 in synchronization with the attachment operation of the toner container 32Y. This allows reliable reduction in occurrence of toner scatter no matter how the user operates for replacement of the toner container 32Y, without reducing the toner amount to be discharged from the toner container 32Y and the operability upon the replacement.

The toner container 32Y according to the eleventh embodiment includes the held portion 34Y with the toner outlet B provided downwardly in the vertical direction. The toner outlet B is provided in the lower side than the opening A in the vertical direction, and the plug member 34d is surely positioned in synchronization with the attachment operation, and then, is pushed by the nozzle 70 to open the toner outlet B sealed with the packing 34e. Therefore, there is little toner stain in the toner outlet B, and such trouble that the user's hands become stained with toner by touching the toner outlet B is prevented.

Because the attachment/detachment operation of the toner container 32Y to/from the toner-container holder 31 is performed by one action associated with the sliding of the sliding portion 34c1, the operability/workability upon replacement of the toner container 32Y is improved. Particularly, by providing the sliding portion 34c1 in the bottom of the held portion 34Y, the sliding portion 34c1 slides along the sliding face 31a while supporting the toner container 32Y.

Moreover, the attachment operation of the toner container 32Y is performed by starting the sliding of the sliding portion 34c1 while the user directly grips the gripper 33d, starting the positioning of the held portion 34Y together with the biasing by the arm pairs 90, starting the insertion of the nozzle 70, and finishing the positioning of the held portion 34Y, the insertion of the nozzle 70, and connecting to the drive unit as soon as the sliding is finished. Therefore, the user gains a click feeling when the held portion 34Y is positioned at the same time when the sliding of the held portion 34Y (attachment operation by one action) is progressed, and feels certain that no erroneous operation occurs in the attachment operation.

Furthermore, the toner container 32Y is not set in the toner-container holder 31 (apparatus body 100) from the upper side thereof, but the attachment/detachment is performed from the front face of the toner-container holder 31 (apparatus body 100), thus, enhancing the flexibility of layout for the upper side of the toner-container holder 31. For example, even if a scanner (document reader) is disposed right above the toner-container holder 31, the operability/workability upon attachment/detachment of the toner container 32Y does not deteriorate. Moreover, the flexibility of layout for the engagement position D between the gear 33c of the toner container 32Y and the drive gear of the apparatus body 100 is also enhanced.

The toner container 32Y is installed in the apparatus body 100 by setting its longitudinal direction as the horizontal direction, and therefore, the toner capacity of the toner container 32Y is increased without any effect on the layout in the height direction of the whole image forming apparatus 100, which allows reduction in the replacement frequency.

As explained above, in the eleventh embodiment, when the toner container 32Y is replaced, the operation for the replacement is easy, and the occurrence of toner scatter can be surely reduced.

Furthermore, the toner-container holder 31 is configured so as to bias the toner container 32Y toward the holding portion 73 of the toner-container holder 31 in synchronization with the attachment operation of the toner container 32Y. This allows reliable reduction in occurrence of toner scatter no matter how the user operates for replacement of the toner container 32Y, without reducing the toner amount to be discharged from the toner container 32Y and the operability upon the replacement.

In the eleventh embodiment, only the toner is contained in each container body of the toner containers 32Y, 32M, 32C, and 32K, but two-component developer containing carrier and toner can also be stored in each container body of the toner containers 32Y, 32M, 32C, and 32K for the image forming apparatus 100 that supplies the two-component developer to each developing device as necessary. Even if the case, by providing the arm pairs 90 for biasing the toner container 32Y toward the holding portion 73 of the toner-container holder 31 in synchronization with the attachment operation of the toner container 32Y, the occurrence of toner scatter can unfailingly be reduced.

Twelfth Embodiment

A twelfth embodiment is explained in detail below with reference to FIG. 43 to FIG. 46.

Figure 43:
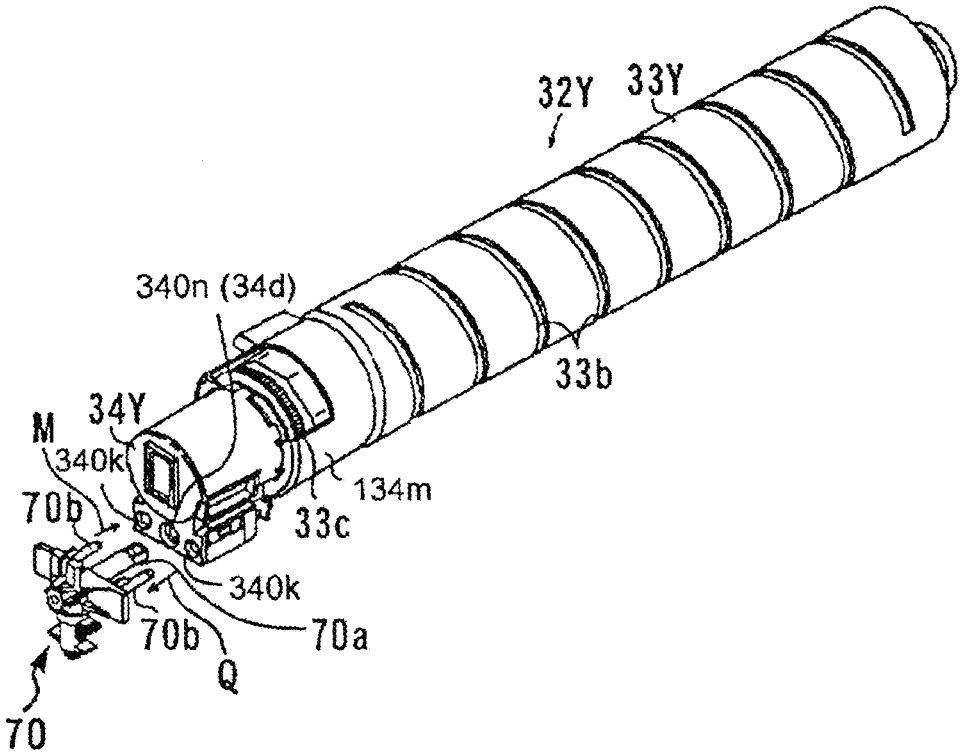
FIG. 43 is a perspective view of a toner container detachably attached to a toner-container holder according to a twelfth embodiment.
Figure 44:
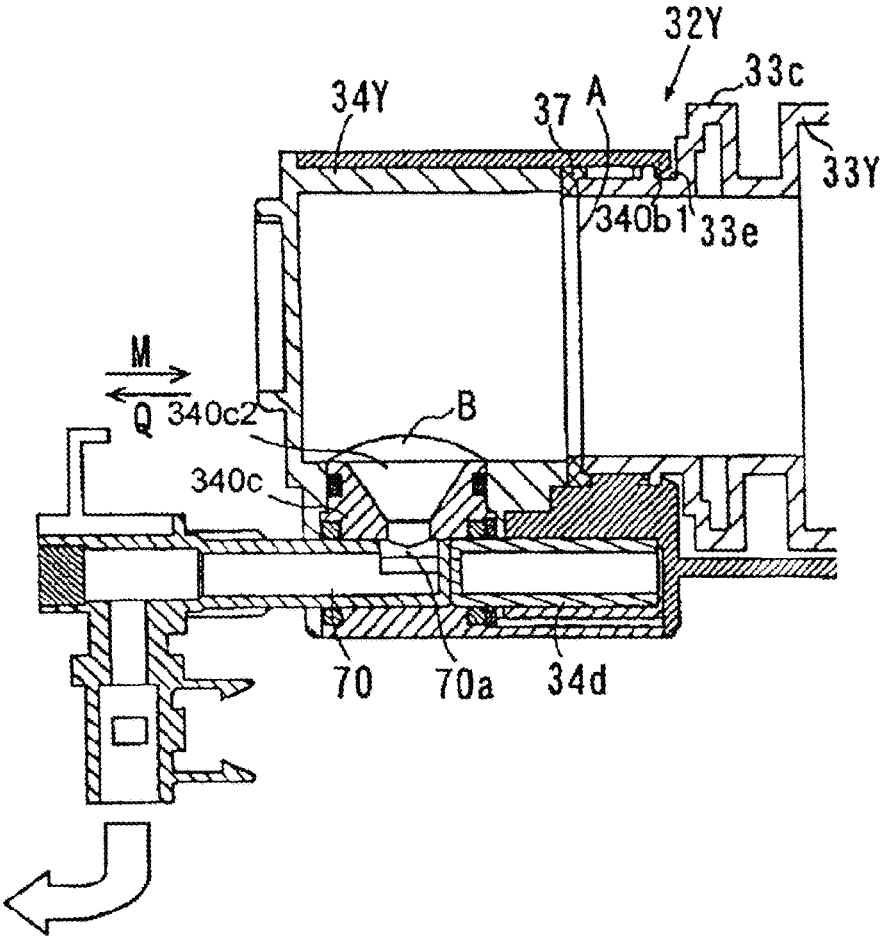
FIG. 44 is a cross-section of the toner container according to the twelfth embodiment.

FIG. 43 is a perspective view of the toner container 32Y detachably provided in the toner-container holder 31 according to the twelfth embodiment, and corresponds to FIG. 36 according to the eleventh embodiment. FIG. 44 is a cross-section of the toner container 32Y according to the twelfth embodiment. The toner-container holder 31 according to the twelfth embodiment is different from that of the eleventh embodiment in a point that a positioning pin 70b engaged with a positioning hole 340k of the toner container 32Y is provided in the nozzle 70.

Similarly to the eleventh embodiment, the image forming apparatus 100 according to the twelfth embodiment includes the toner-container holder 31 (set portion) as an attachment portion provided between the stack portion (discharge portion) 30 and the intermediate transfer unit (intermediate transfer element) 15. The attachment portion is a portion where the toner containers (toner bottles) 32Y, 32M, 32C, and 32K being agent storage containers are detachably attached, each of the toner containers storing toner to be supplied to each developing device of the imaging units 6Y, 6M, 6C, and 6K.

As shown in FIG. 43 and FIG. 44, the toner container (toner bottle) 32Y set in the apparatus body (printer) 100 includes the cylindrical container body (bottle body) 33Y with the opening A formed in one end thereof, and the held portion (cap) 34Y relatively rotatable with respect to the container body 33Y with the opening A. Formed around the periphery of the container body 33Y is the projection 33b (spiral that is projected toward the inside of the container) being a conveyor portion for conveying the toner contained to the opening A side through rotation. The opening A is a cylinder which is formed around the axis line (rotating axis) of the container body 33Y and of which diameter is smaller than the diameter of the container body 33Y. To discharge the toner from the opening A having the smaller diameter, a second spiral (second projection) and a suction portion for sucking the toner toward the second spiral are provided between the projection 33b and the opening A (although both of them are not shown, they are provided in a location behind a holder 134m).

The held portion (cap) 34Y is attached to the container body 33Y through the holder 134m. As shown in FIG. 44, a claw (claw portion) 340b1 is provided on an outer periphery so of the cylinder of the held portion 34Y. The claw 340b1 is engaged in a circumferential groove 33e formed in the container body 33Y, and this allows relative rotation of the held portion 34Y and the container body 33Y. The joint portion between the container body 33Y and the held portion 34Y is formed with the seal member (seal) 37, to prevent toner leakage from the joint portion. The gear (bottle gear) 33c is provided integrally with the container body 33Y near the position of attaching the held portion 34Y of the container body 33Y. The gear 33c is used as an input portion for rotating the container body 33Y.

The toner outlet (supply port) B is formed in the lower part of the periphery of the held portion 34Y. More specifically, the toner outlet B is integrally provided with a funnel-shaped opening 340c2 provided in a holder (output member) 340c. The nozzle 70 (toner conveying pipe) being the engaging member is inserted into a nozzle hole 340n provided in the holder 340c, and the toner outlet B and the nozzle 70 thereby communicate with each other through the toner supply port 70a. The plug member (shutter) 34d is fitted in the nozzle hole 340n, and when the toner container 32Y is not engaged with the nozzle 70, a series of toner supply path is blocked. Although it is not shown in the twelfth embodiment, the biasing unit is set not in the toner container 32Y side but in the toner-container holder 31 side, the biasing unit biasing the plug member 34d in the direction resisting the direction in which it is pushed by the nozzle 70.

As shown in FIG. 43, the positioning pins 70b are arranged on both sides of the nozzle body on the side of the apparatus body 100 with the nozzle 70 provided therein. The positioning pin 70b is inserted into the positioning hole 340k provided in the held portion 34Y. The supply side of the nozzle 70 communicates with the suction port of the suction-type screw pump 60, similarly to the eleventh embodiment. As the screw pump, a uniaxial eccentric screw pump (Mohno pump) capable of continuously feeding a fixed amount with a high solid/gas ratio can be used.

In the toner container 32Y configured in the above manner, the held portion 34Y with the holder (output member) 340c fixed thereto is projected outwardly from the outer circumferential surface of the container body 33Y, when viewed from the direction of the arrow M of FIG. 43. In other words, the holder 340c, which is a projected portion projected along the attachment/detachment direction, is formed in the held portion 34Y so as not to overlap the projection plane in the attachment/detachment direction (directions of the arrows M and Q) of the container body 33Y.

When the toner container 32Y is correctly set in the toner-container holder (set portion) 31 in the direction of the arrow Q, the positioning pins 70b are inserted into the positioning holes 340k and the nozzle 70 is inserted into the nozzle hole 340n. More specifically, by moving the toner container 32Y along the axial direction (longitudinal direction) with the held portion 34Y as the front end, the nozzle 70 is inserted into the nozzle hole 340n. Then, when the nozzle 70 is inserted into the nozzle hole 340n, the plug member 34d is pushed out toward the rear side from the nozzle hole 340n, and the toner supply port (reception hole) 70a of the nozzle 70 communicates with the toner outlet B (opening 340c2) to enable toner supply.

In the toner-container holder according to the twelfth embodiment also, the toner supply operation is performed in the same manner as that of the eleventh embodiment. In other words, the toner contained is fed to the held portion 34Y side through rotation of the container body 33Y, and the toner outlet B is filled with the toner. If the toner outlet B which is the suction side is filled with the toner, the suction-type screw pump can certainly convey the toner. Therefore, the toner of the amount according to the operation time can be supplied to the developing device.

Toner supply is performed in this manner, while the user sets the toner container 32Y in the toner-container holder 31. Therefore, if the toner container 32Y is not correctly set therein or if there is a set failure, the nozzle 70 is not properly inserted into the nozzle hole 340n, which leads to a failure in supply of toner.

Figure 45:
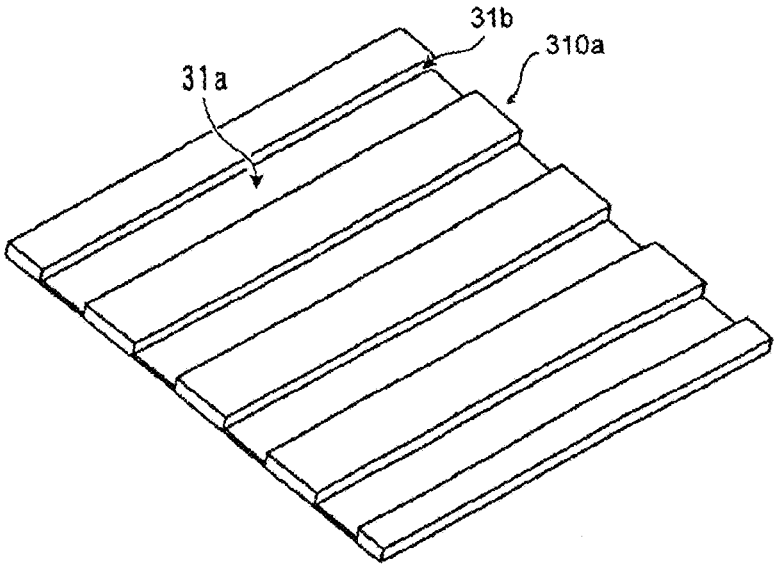
FIG. 45 is a perspective view of a base plate provided in the toner-container holder.
Figure 46:
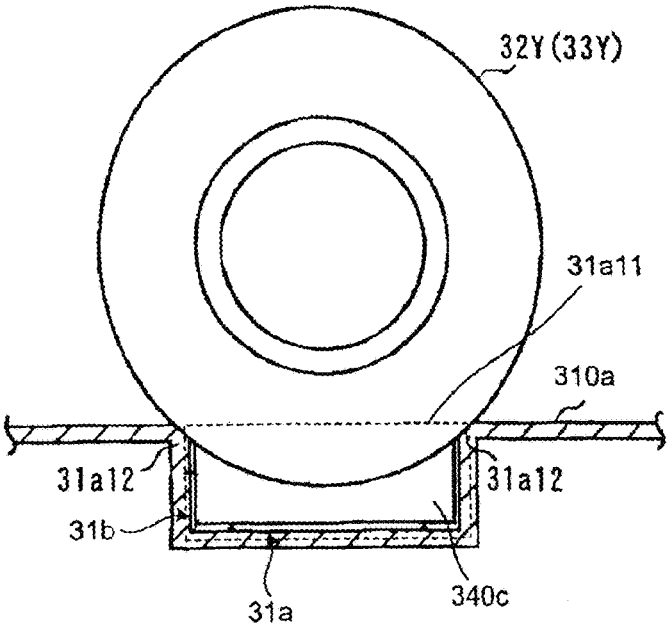
FIG. 46 is a partially enlarged cross-section of the base plate on which the toner container is set.

FIG. 45 is a perspective view of the base plate 310a provided in the toner-container holder (set portion) 31, and FIG. 46 is a partially enlarged cross-section of the base plate 310a on which the toner container 32Y is provided.

Referring to FIG. 45 (see also FIG. 10), the base plate 310a provided in the toner-container holder 31 has spaces in which the toner containers 32Y for four colors can be attached, and the sliding faces 31a and 31b are formed in each attachment position of the toner containers 32Y. The four toner containers 32Y are set in one piece of the base plate 310a in the twelfth embodiment, but the base plate 310a can also be independently provided for each toner container 32Y according to the number of the toner containers 32Y.

As shown in FIG. 46, the sliding face 31a and the sliding faces 31b formed in the base plate 310a form a guide groove 31a11 in which the held portion 34Y is fit. The sliding faces 31b of the guide groove 31a11 and the upper surface of the base plate 310a form a guide edge 31a12 as a bend, which supports the container body 33Y. The guide groove 31a11 is configured so as to guide the holder 340c (projected portion) projected from the outer circumference of the container body 33Y when viewed in the vertical direction on the paper of FIG. 46. In other words, the guide groove 31a11 is formed so that the projected portion 340c of the held portion 34Y is fitted in the guide groove 31a11. The guide edge 31a12 is formed along an edge between the start point and the end point of the guide groove 31a11, and is chamfered so as to easily support the rotating container body 33Y.

Because the toner-container holder 31 configured in the above manner includes the sliding faces 31a and 31b which form the guide groove 31a11, when the held portion 34Y is fitted in the guide groove 31a11, the rotation around the center of axle of the held portion 34Y is restricted. Therefore, if the toner container 32Y is placed on the sliding face 31a while the held portion 34Y is fitted in the guide groove 31a11 to move along the direction of the arrow Q, the toner container 32Y can be easily, reliably, and correctly set. More specifically, by fitting the held portion 34Y in the guide groove 31a11, displacement does not occur in the nozzle hole 340n and the positioning hole 340k. Therefore, when the toner container 32Y is set therein in the arrow Q direction, the positioning pins 70b are surely inserted into the positioning holes 340k, and the nozzle 70 is reliably inserted into the nozzle hole 340n.

In the twelfth embodiment, the toner container 32Y slides along the sliding face 31a in parallel with the axis line from start to completion of the attachment operation. At the same time, the method may be changed to a method of sliding the toner container 32Y, at the beginning of the attachment operation, in the direction orthogonal to the arrow Q direction with the held portion 34Y as the head, and then, attaching it in the arrow Q direction. The method may also be changed to a method of setting the toner container 32Y on the sliding face 31a from the upper side thereof at the beginning of the attachment operation, and then sliding it along the arrow Q direction to be attached.

The image forming apparatus 100 according to the twelfth embodiment is configured to provide a toner discharge mechanism in the rear side viewed from the operator (user), and to dock the nozzle hole 340n of the toner container 32Y with the nozzle 70 of the apparatus body 100 side in the rear side of the apparatus body 100. Based on the configuration above, even if toner scatter occurs in the docking portion, the position is far from the operator. Therefore, the operator's hand is not easily stained with toner as compared with the case where the toner discharge mechanism (docking structure) is in the near side of the apparatus body 100. Further, because the docking structure is provided in the rear side of the apparatus body 100, the operator hardly operates while holding the held portion 34Y upon its attachment. And it is verified through experiments on the operations that the operator usually holds the container body 33Y to push it in. If the operator holds the container body 33Y, then the held portion 34Y side may be rotated during operation, which may cause the operability to get worse, but in the twelfth embodiment, because the rotation of the held portion 34Y is restricted by the sliding face 31a, the operability is improved. Therefore, even if the toner discharge mechanism (docking structure) is provided in the rear side of the apparatus body 100, the operability upon replacement of the toner container 32Y is improved.

The relation of the configuration and the effect of the toner-container holder 31 according to the twelfth embodiment is summarized below. Most of the configurations and the effects as explained below are common to those of the toner-container holder according to the eleventh embodiment.

In the twelfth embodiment, the main part of the held portion (cap) 34Y on the discharge side of the toner container 32Y is a substantial cylinder, and part of the cylinder has the holder 340c (projected portion, protrusion portion) projected toward the space including the toner shutter mechanism. Based on the holder 340c, the toner container 32Y is fitted in the guide groove 31a11 formed on the side of the apparatus body 100 for attachment, the positional relation with the nozzle 70 for sucking toner can be accurately determined.

The toner container 32Y is moved along the sliding face 31a, and the toner outlet B is engaged with the nozzle 70, to prevent a set failure of the toner container 32Y or erroneous setting thereof. According to the configuration of the twelfth embodiment, as compared with Patent documents 1 to 4 which require a plurality of actions for the detachment operation of the toner container 32Y, the detachment operation of the toner container 32Y is completed by one action (except the open/close operation of the main-body door) such that the toner container 32Y moves along the sliding face 31a.

The guide edges 31a12 for the sliding face 31a are provided, and this helps rotatably and surely support the toner container 32Y after being attached.

The guide groove 31a11 for the sliding face 31a is provided, and this helps eliminate displacement of the toner container 32Y upon its attachment, thus unfailingly preventing a set failure or an erroneous set of the toner container 32Y.

If the user holds only the container body 33Y and tries to set it in the apparatus body, the held portion 34Y is rotating unless any thing restricts the rotation. At this time, a moment force is produced around the center of the rotation of the held portion 34Y, and the holder (projected portion) 340c faces downward. Therefore, in the twelfth embodiment, the guide groove 31a11 is formed in the lower side in the vertical direction. With this formation, even if the user holds only the container body 33Y, the holder 340c is fitted in the guide groove 31a11 on its own, and the erroneous-set prevention performance of the toner container 32Y is improved.

In the twelfth embodiment, because the toner outlet B for docking the nozzle 70 (toner supply port 70a) is formed in the holder (projected portion) 340c, the toner outlet B moves along the sliding face 31a, and this allows prevention of rotational displacement of the toner outlet B. Therefore, the user can easily and surely dock the toner outlet B with the nozzle 70 without being conscious especially. Different from the opening operation of the toner outlet by the collet chuck system in Patent document 5 and Patent document 6, the twelfth embodiment has a mechanism of pushing the plug member 34d by the nozzle 70 in synchronization with the attachment operation to open the toner outlet B without using a lever or the like. This prevents toner scattering upon replacement of the toner container 32Y.

Because the user can easily perform attachment/detachment operation of the toner container 32Y by holding only the container body 33Y, the toner discharge mechanism (docking portion between the nozzle 70 and the toner outlet B) can be provided in the rear side of the apparatus body 100.

As explained above, the twelfth embodiment is configured to allow easy operation, and also allow occurrence of toner scatter to be surely reduced when the toner container 32Y is replaced.

Figure 47:
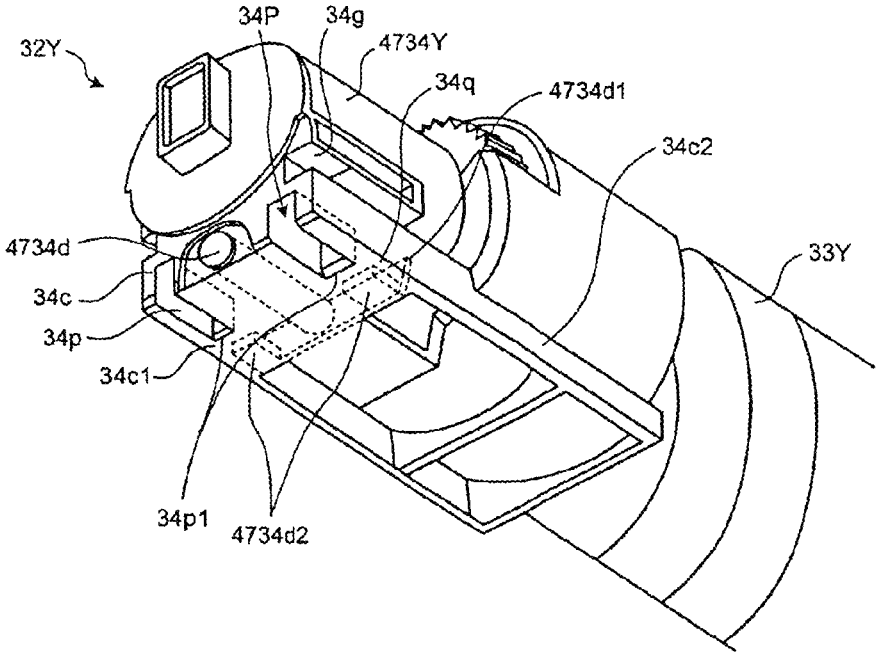
FIG. 47 is a schematic of the toner container in which a plug member closes the toner outlet when viewed from the holder.
Figure 48:
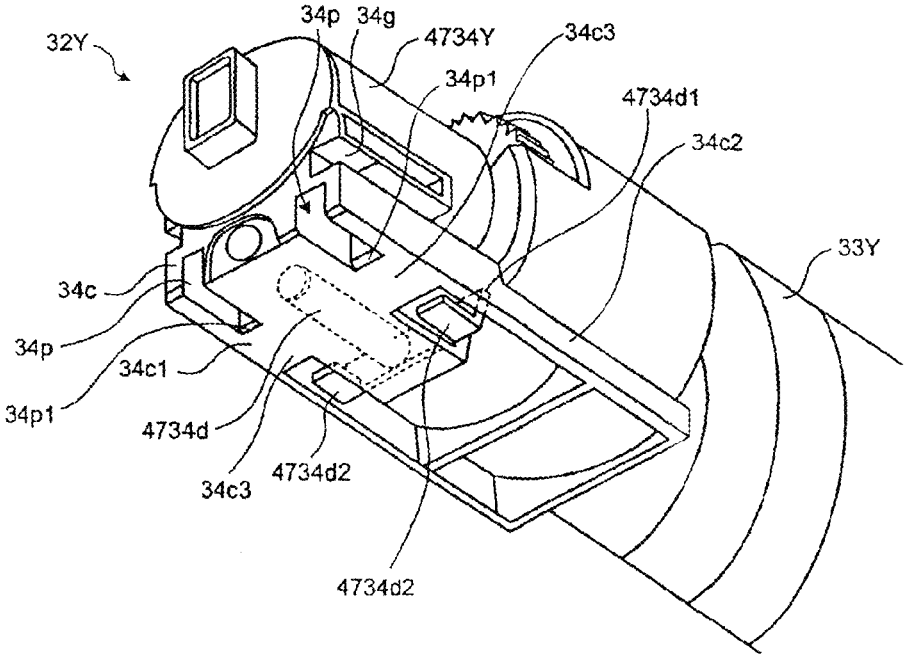
FIG. 48 is a schematic of the toner container when attached to the toner-container holder and the plug member opens the toner outlet when viewed from the holder.
Figure 49:
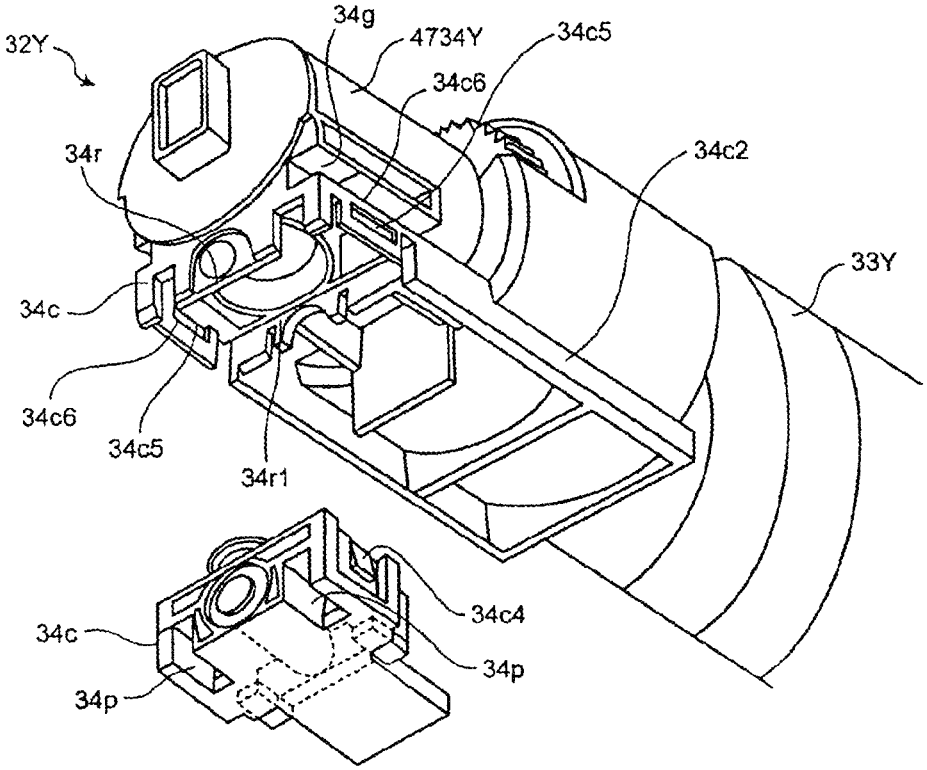
FIG. 49 is a schematic of the holder and a snap mechanism for engaging the holder with the held portion.
Figure 50:
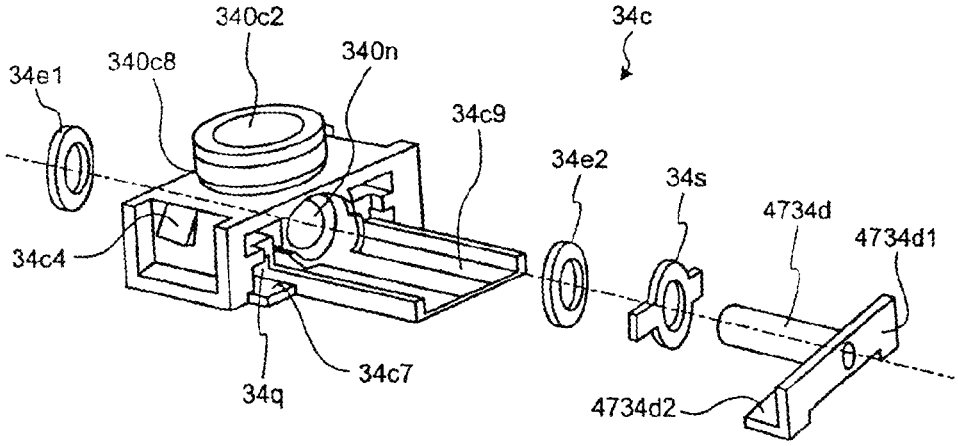
FIG. 50 is a perspective view of details of the components of the holder.

A thirteenth embodiment is explained below with reference to FIG. 47 to FIG. 50. FIG. 47 is a schematic of the toner container 32Y in which a plug member 4734d closes the toner outlet B, and FIG. 48 shows the same view when the plug member 4734d opens the toner outlet B. Although FIG. 47 and FIG. 48 correspond to FIG. 15 and FIG. 16 respectively in the first embodiment, there are points mainly different from the first embodiment. The points are such that grooves 34p are formed in a held portion 4734Y and the plug member 4734d is differently shaped. FIG. 49 is a schematic of the holder 34c provided separately from the held portion 4734Y and not shown in FIG. 47 and FIG. 48, and of a snap mechanism for engaging the holder 34c with the held portion 4734Y, to make the configuration of the plug member 4734d easy to see. FIG. 50 is an exploded perspective view of the holder 34c to explain details of the components of the holder 34c. The configuration of the holder 34c is the same as that of the first embodiment. The details of these configurations and the effect due to these configurations are explained below.

The groove 34p opened downwardly is formed at two positions which are in a path of the claw member 76. These grooves allow the claws of the claw member 76 to move into or move back along the respective grooves 34p during the attachment/detachment operation. A corner portion 34p1, against which the claw member 76 butts, and a wall surface 34c3 (a part of the sliding portion 34c1) are provided at the rear end of the groove 34p. Specifically, the wall surface 34c3 is used when the claw member 76 changes its posture after butting against the corner portion 34p1 and moves while the claws of the claw member 76 are in contact with the wall surface 34c3.

FIG. 48 shows how the plug member 4734d which is pushed by the nozzle 70 opens the toner outlet B. The claw member 76 engages with the back of a protrusion portion 4734d1, as explained below. The details and the effect of the protrusion portion 4734d1 will be explained later with reference to FIG. 50 to FIG. 52. Further, the operation of the toner container 32Y in which the claw member 76 is engaged with the protrusion portion 4734d1 and the effect thereof will be explained later with reference to FIG. 53A to FIG. 56B.

Similarly to the configuration of the first embodiment, the plug member 4734d of FIG. 47 has a plate ((hereinafter, "protrusion portion 4734d1") which is an engaging portion for engaging the claw member 76, and is extended and protruded to both sides of the axis of the cylinder portion of the plug member 4734d, the both sides being perpendicular to the axial direction of the cylinder portion. The plug member 4734d also has two plates (hereinafter, "second protrusion portions 4734d2") protruded from near the both ends of the protrusion portion 4734d1 so as to form planes perpendicular to the plate surface of the protrusion portion 4734d1. Similarly to the first embodiment, the protrusion portion 4734d1 is extended and projected to the both sides from the axis of the cylinder portion of the plug member 4734d, and the protrusion portion 4734d1 is engaged with the claw member 76 at symmetrical two positions. Therefore, the force to move the plug member 4734d by the claw member 76 can be imparted evenly on both sides, and as a result, the closing operation of the toner outlet B can be smoothly performed. In addition to or as an alternative, a spring may be used to urge the plug member 4734d towards the closed position.

The backside 34c7 of the wall surface 34c3 has two storage portions 34q, one on each side of the plug member 4734d, as shown in FIG. 50. More specifically, the storage portion 34q stores both the protrusion portion 4734d1 and the second protrusion portion 4734d2 when the toner outlet B is completely closed by the plug member 4734d such that the claw member 76 does not contact 4734d1 and 4734d2 as the toner container is being mounted into the image forming device. By providing the storage portion 34q for storing the protrusion portion 4734d1, the protrusion portion 4734d1 is not exposed to the outside when the toner outlet B is closed. Therefore, it is possible to prevent failure by the plug member 4734d being accidentally opened by erroneous operation by the user, namely, caused by the protrusion portion 4734d1 catching any projection or being moved by a user.

Figure 51:
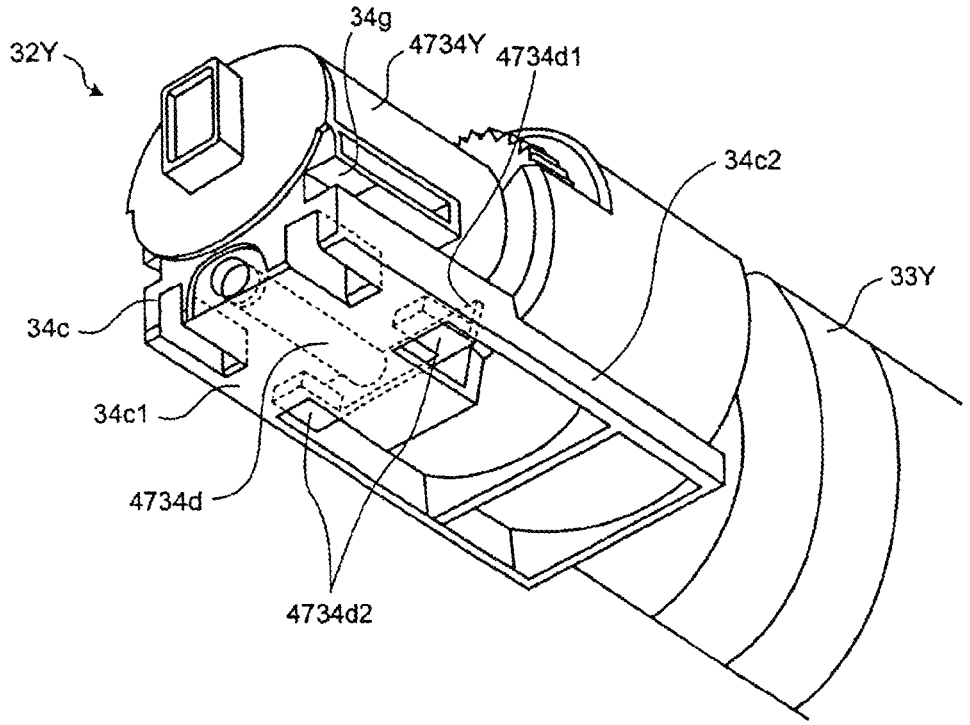
FIG. 51 is a schematic of how the plug member is displaced and the protrusion portion slightly moves to the side where the toner outlet is opened.
Figure 52:
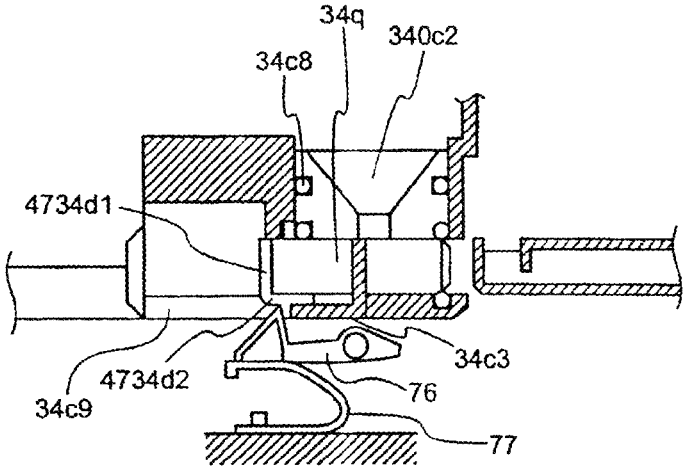
FIG. 52 is a schematic of how a second protrusion portion closes a space between the storage portion and the protrusion portion.

Further, the effect due to provision of the second protrusion portion 4734d2 is explained below with respect to FIG. 51 and FIG. 52. FIG. 51 is a schematic of how the plug member 4734d is displaced and the protrusion portion 4734d1 moves back when the protrusion portion 4734d1 is pushed inwardly by the nozzle 70 of the image forming apparatus, thus causing the toner outlet to open. FIG. 52 is a schematic of how the second protrusion portion 4734d2 closes a space between the storage portion 34q and the protrusion portion 4734d1. As shown in FIG. 51, even if the user starts the attachment operation when the plug member 4734d is partly displaced to the open position such that the protrusion portion 4734d1 is partly moved back and the toner outlet B is partly opened, the second protrusion portion 4734d2 closes the space between the storage portion 34q and the protrusion portion 4734d1 as shown in FIG. 52. Thus, when the plug member 4734d is partly pushed in as the toner container is being mounted, the claw member 76 slides along the bottom surface 34c3, then slides along the bottom of the second protrusion portion 4734d2 until the claw member 76 slides past the protrusion portion 4734d1. Therefore, it is possible to prevent a failure in the mounting process which opens the toner outlet B, or failure in closing thereof by the plug member 4734d, thus preventing toner scatter.

The configuration of the holder 34c formed with another component different from the held portion 4734Y is explained in detail below with reference to FIG. 49 and FIG. 50. Independent components are the plug member 4734d made of resin having slidability such as polyacetal and the packing 34e made of rubber, of which material is different from that of the holder 34c. And, these independent components are set in the holder 34c explained in the first embodiment upon assembly. Therefore, it is desired that the held portion 4734Y and the holder 34c be different components. As an alternative, these components can be integrally formed and/or be the same component. For the setting, as shown in FIG. 49, the holder 34c includes two convex claws 34c4 for the snap mechanism at the positions on both sides of the plug member 4734d. The held portion 4734Y is formed with a thin plate so as to cause the positions corresponding to the convex claws 34c4 to have elasticity, and the thin plate has engaging portions 34c6 for the snap mechanism in which holes 34c5 are formed so that the convex claws 34c4 can be engaged in the holes. By fitting the holder 34c in the held portion 4734Y from its lower side so that the convex claws 34c4 and the holes 34c5 are respectively engaged with each other, the holder 34c and the held portion 4734Y can be assembled. The assembled state in which the convex claws 34c4 are respectively engaged in the holes 34c5 is shown in FIG. 5 related to the first embodiment.

The configuration of the holder 34c and the components disposed therein are explained below with reference to FIG. 50. The upper portion of the holder 34c has the mortar-shaped or funnel-shaped vertical path (opening 340c2) that forms the toner outlet B, which is explained in the first embodiment, and the packing (O-ring 34c8) is provided around the path so as to keep the tightness between the holder 34c and the held portion 4734Y. The opening 340c2 has the nozzle hole 340n into which the nozzle 70 is inserted and which is provided in its lower part in the horizontal direction, and two pieces of packing are provided in both ends of the nozzle hole 340n. A packing 34e1, also considered to be a pliable element or washer, out of the two pieces of packing, located in the side of the nozzle 70 across the holder 34c, can be fixed in such a manner that the front side around the packing is pressed by a member 34r of the held portion 4734Y. On the other hand, a packing 34e2 located in the side of the protrusion portion 4734d1 of the plug member 4734d across the holder 34c is pressed by an arch-shaped member 34r1 formed in the held portion 4734Y so as to avoid the cylinder portion of the plug member 4734d when the holder 34c is set in the held portion 4734Y from the lower side. As a member for supporting the pressing, there is a pressing support member 34s made of resin, which includes a ring and a plate protruded in the horizontal direction and is disposed between the packing 34e2 and the arch-shaped member 34r1. To temporarily fix the packing 34e1, the packing 34e2, and the pressing support member 34s to the holder 34c upon assembly, the cylinder portion of the plug member 4734d is previously inserted into these components, and the holder 34c is simply set in the held portion 4734Y from the lower side as shown in FIG. 49.

Further, plate member 34c9 that is concave-shaped in cross section extends in the axis direction of the nozzle hole 340n from the holder 34c. This plate member 34c9 is configured to be moved by being sandwiched by the two second protrusions 34d2 of the plug member 34d, and to prevent the plug member 34d from rotating.

The effect of the pressing support member 34s is explained below. To set the holder 34c in the held portion 4734Y from the lower side, the held portion 4734Y needs to have an arch-shaped space as explained above. In this case, if the pressing support member 34s is not provided, there is no member for pressing the packing 34e2 in the lower side of the periphery thereof. If there is no such member, the packing 34e2 may curl up due to friction caused by the sliding operation of the plug member 4734d, which leads to failure in toner conveyance and causes toner scatter. Therefore, by providing the pressing support member 34s, the whole periphery of the packing 34e2 can also be pressed, similarly to the packing 34e1.

The relationship between the positioning operation of the held portion 4734Y and the operation of the claw member 76 is explained below. The claw member 76 receives an upward force (force in the R2 direction of FIG. 13) by the plate spring 77 which is the second biasing member. The upward force acts so as to push the held portion 4734Y upward when the claw member 76 is pushed downward to the position where the attachment of the held portion 4734Y is not obstructed. Therefore, the attachment operation may be unsuccessful depending on the arrangement of the claw member 76 in the toner-container holder 31 and the upward force of the plate spring 77.

In other words, there is a case where the claw member 76 is engaged with the sliding portion 34c1 provided on the under-surface of the held portion 4734Y before the positioning members 31c of the toner-container holder 31 are engaged with the engaging portions 34g of the held portion 4734Y. In this case, if the upward force is strong, the engaging portions 34g, with which the positioning members 31c of the holding portion 73 on the main body of the image forming apparatus are engaged, are turned obliquely upward, and the positioning members 31c are inserted into the engaging portions 34g in that state. It is also possible for the positioning members 31c to fail to engage with the engaging portions 34g. In either situation, the positioning members 31c are not properly engaged with the engaging portions 34g, which causes a failure in the attachment.

In order to prevent improper mounting due to movement or rotation of the held portion 4734Y, according to one embodiment, the relative positions of the positioning members 31c and the claw member 76 are arranged so that during the mounting process, the positioning members engage with the engaging portions 34g before the claw member 76 is engaged with or pushes upwardly on the held portion 4734Y. Alternatively, the spring 77 which pushes up on the claw member 76 can be selected so that it has less bias on the claw member 76. Such a smaller amount of bias or spring strength will reduce or eliminate the issue of the rotation or lifting of the held portion 4734Y. When the toner container, or cap or held portion thereof initially contacts the claw member 76, the weaker spring will allow the claw member 76 to move and not change the orientation or angle of the toner container.

Alternative ways of keeping the toner container from rotating upwardly so that container can be properly mounted include mounting a stopping or blocking device above the toner container or above the cap of the toner container within the image forming device to keep the toner container stable during mounting. The stopping device could be a flat and horizontal blocking device, for example. Alternatively, a rounded stopping device which corresponds to the shape of the cap can be installed within the image forming device to keep the toner container from raising or rotating upwardly.

Additionally or alternatively, the cap can be molded, machined, cut, or otherwise constructed so that it has gutters, channels, grooves or slots on the under-face, as illustrated in FIGS. 47-56B which are part of the thirteenth embodiment. With such a construction, portions of the claw member 76 do not exert any or sufficient upward pressure to move the toner container upwardly until the positioning members 31c which are part of the image forming device, engage with the corresponding slots, gutters, or channels 34g which are engaging portions and part of the cap of the toner container.

In the thirteenth embodiment, two grooves 34p into which the claw member 76 can enter are formed on the plane that faces the nozzle 70 upon the attachment of the held portion 4734Y. Consequently, the connection to the held portion is performed in such a manner that the positioning members 31c first start to engage the engaging portions 34g. Then, the claw member 76 contacts the held portion and exerts an upward pressure thereon. The interaction of the positioning members 31c and engaging portions 34g prevent upward movement of the container or held portion, and thus during insertion, the claw member 76 is pushed downward so as not to obstruct the attachment, and thereafter, the claw member 76 engages the plug member 4734d, and the nozzle 70 comes in contact with the plug member 4734d slightly afterward. The effect of the grooves 34p is explained below with reference to FIG. 53A to FIG. 56B.

Figure 53A:
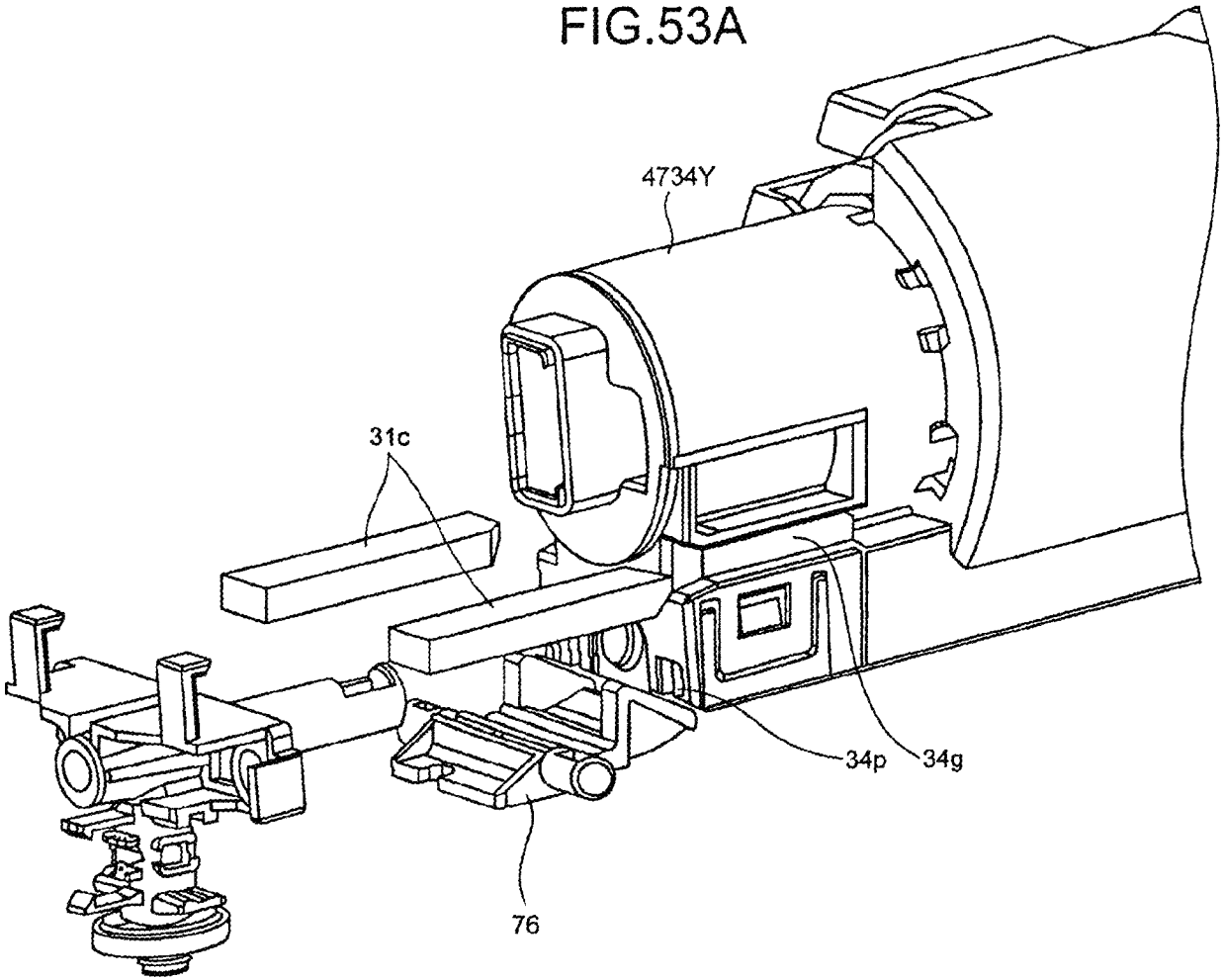
FIG. 53A is a perspective view of how the engaging portions of the toner container face the positioning members of the toner-container holder.
Figure 53B:
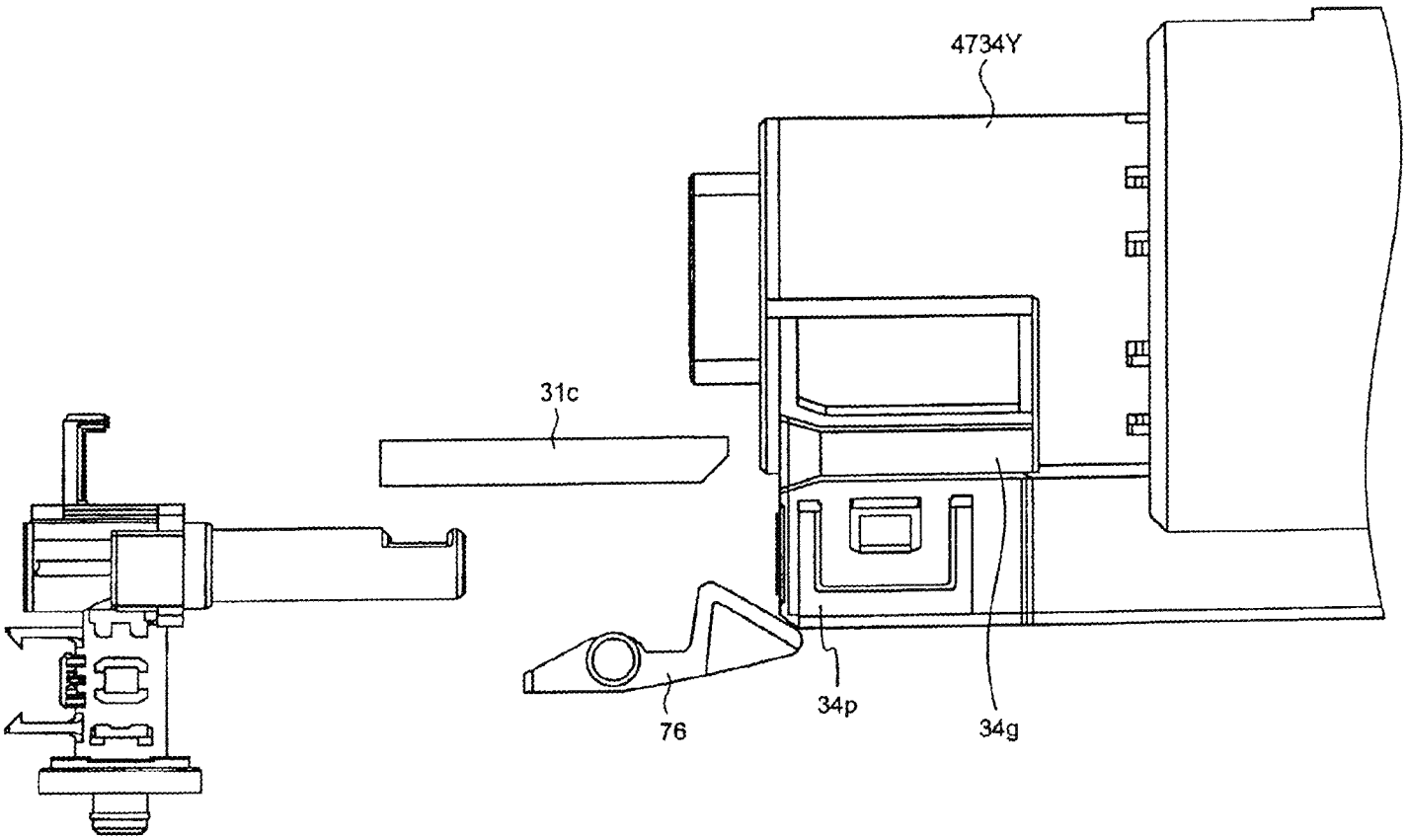
FIG. 53B is a side view of how the engaging portion of the toner container faces the positioning member of the toner-container holder.
Figure 54A:
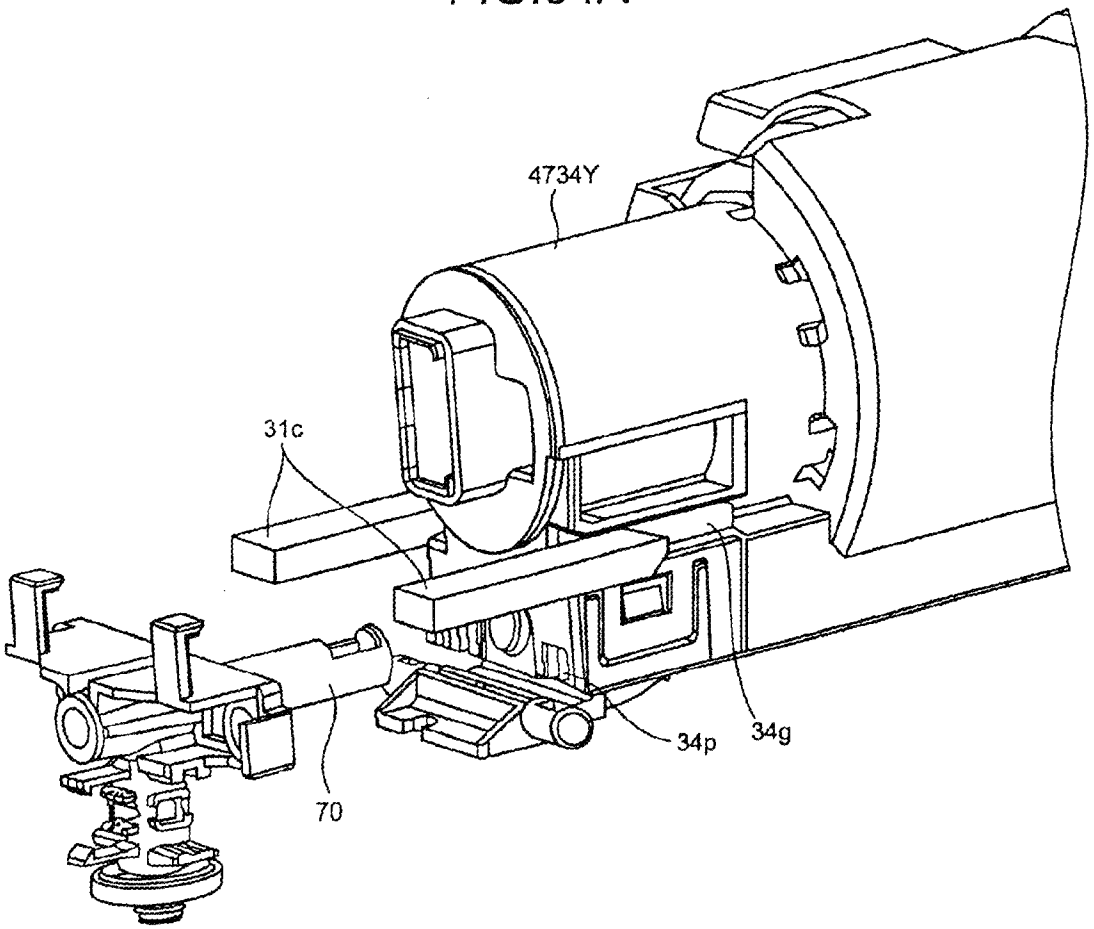
FIG. 54A is a perspective view of how the held portion starts to be engaged with the positioning members.
Figure 54B:
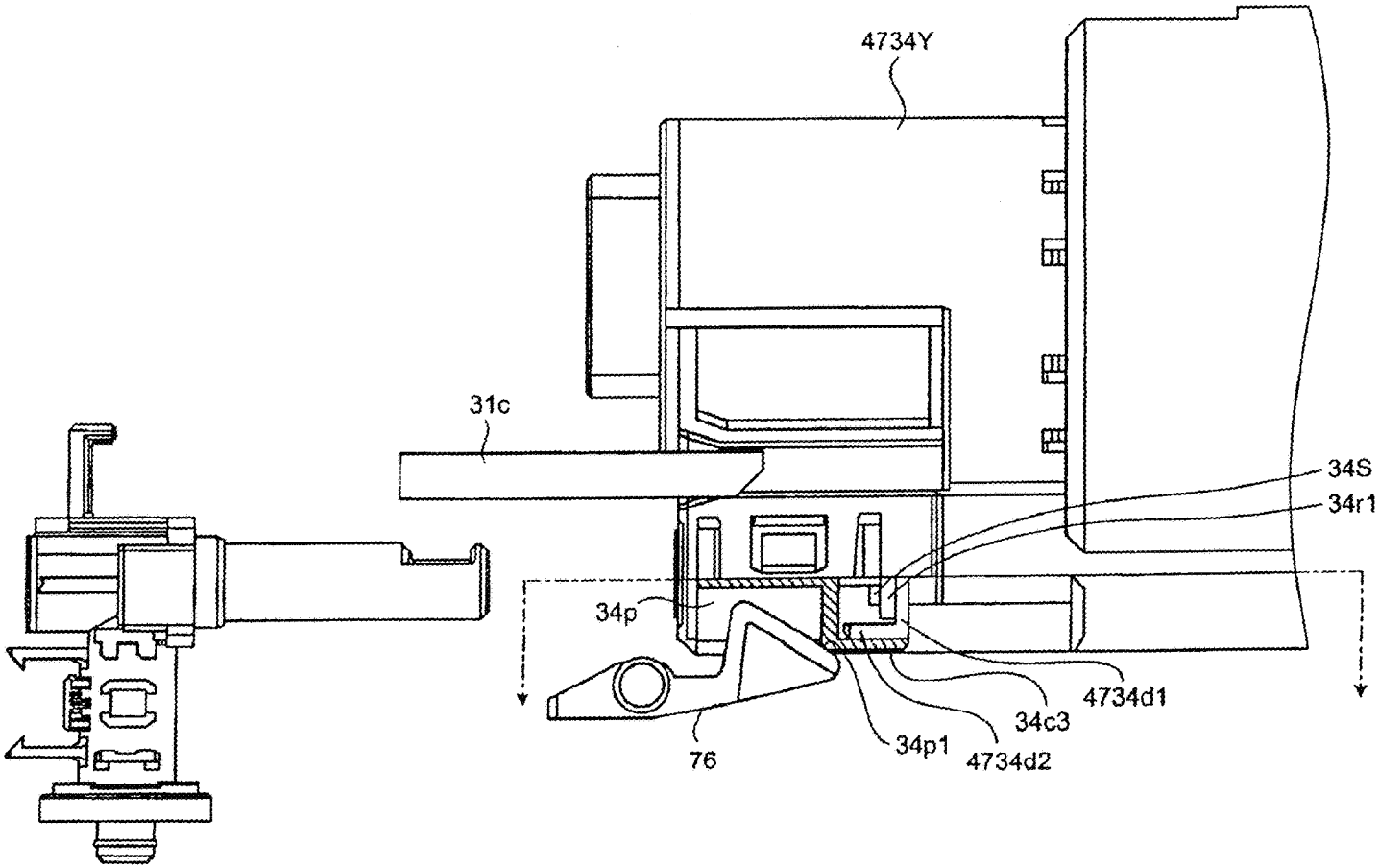
FIG. 54B is a partially cross-sectional side view of how the held portion starts to be engaged with the positioning members.
Figure 55A:
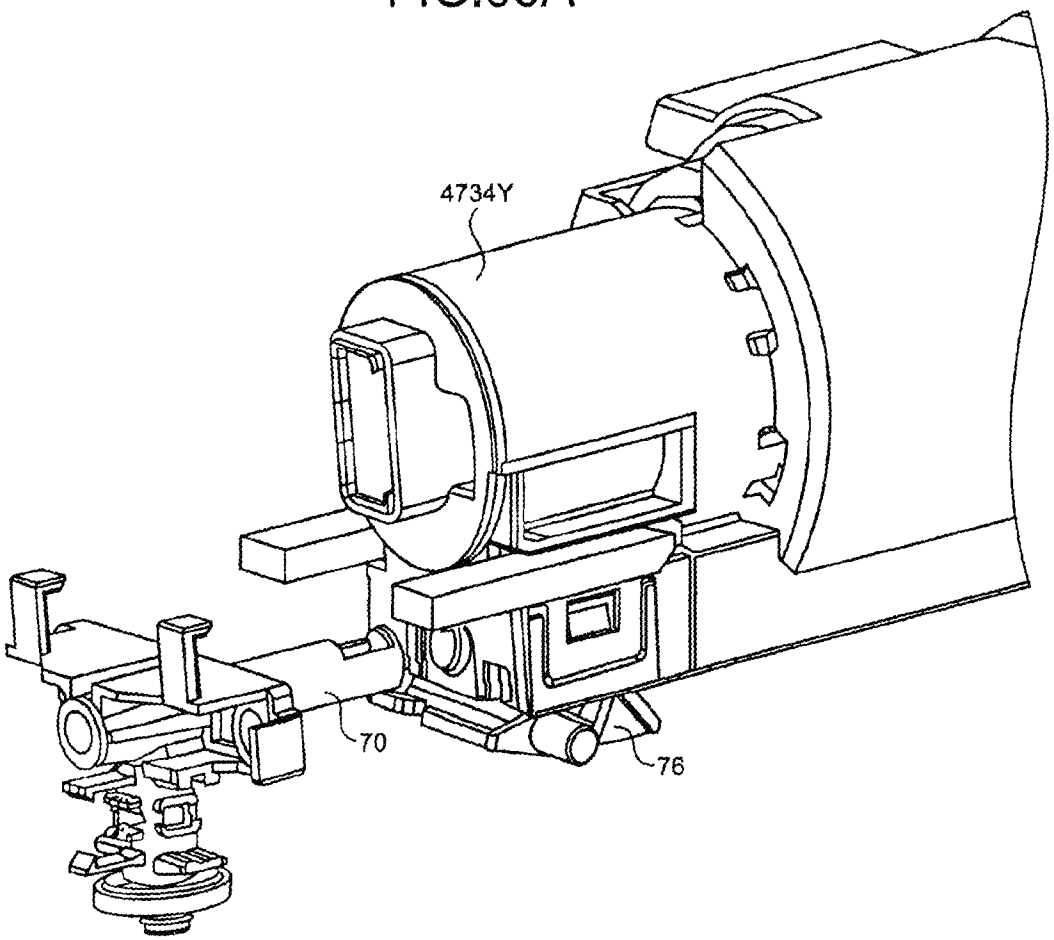
FIG. 55A is a perspective view of how the claw member is pushed downward to a position where the attachment of the held portion is not obstructed.
Figure 55B:
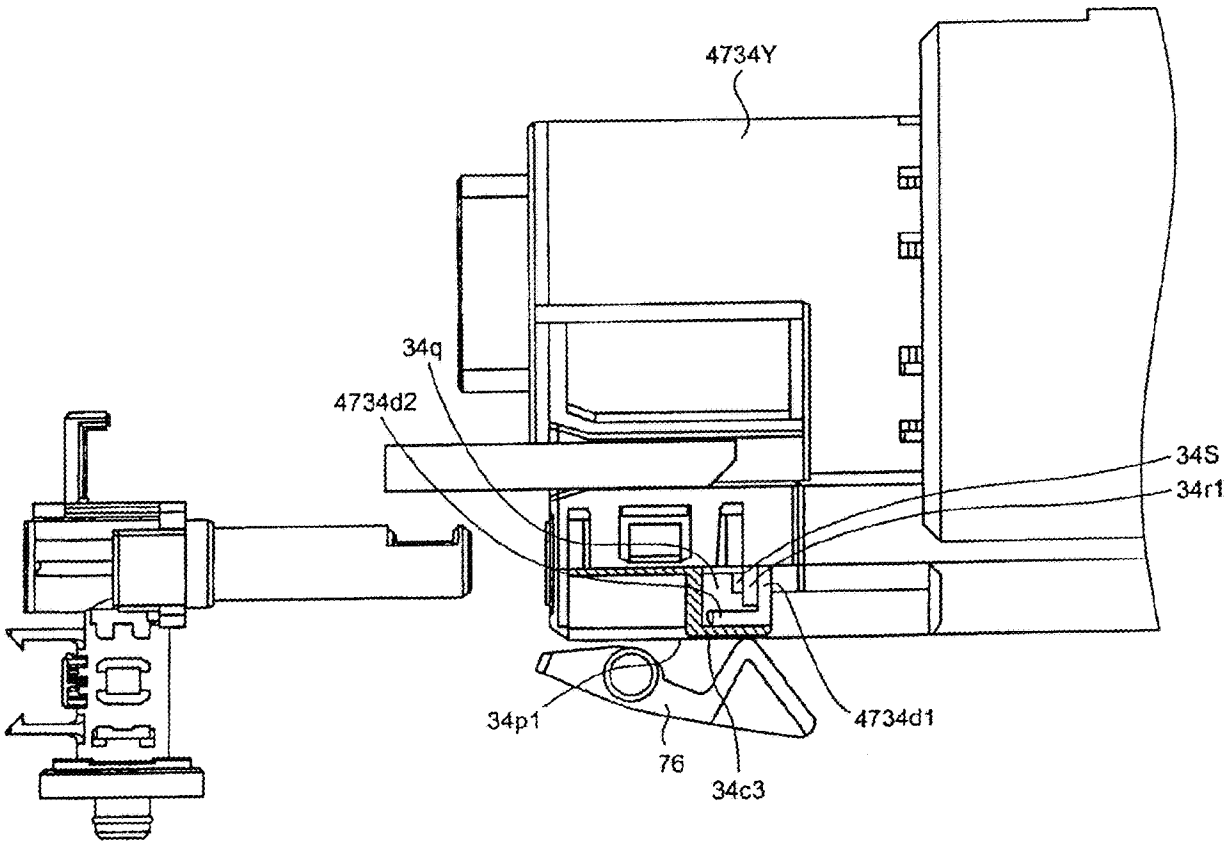
FIG. 55B is a partially cross-sectional side view of how the claw member is pushed downward to the position where the attachment of the held portion is not obstructed.
Figure 56A:
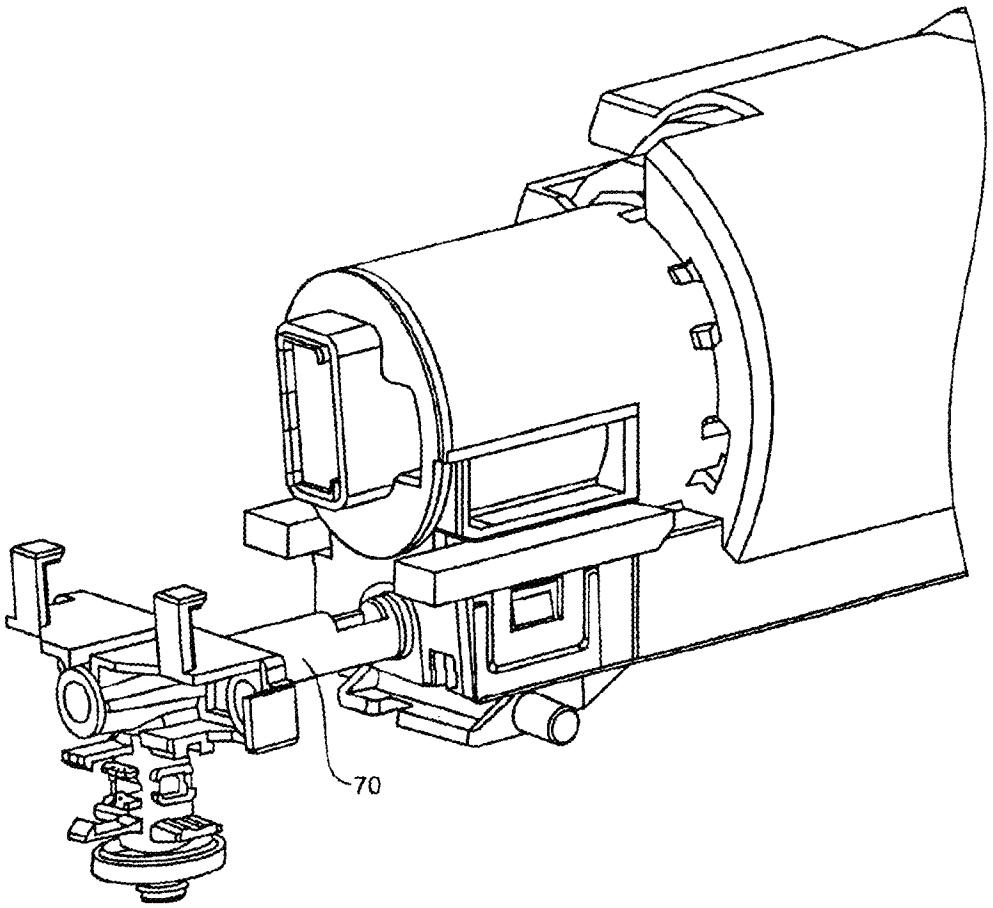
FIG. 56A is a perspective view of how the claw member returns to the default position so that the claw member is engaged with the engaging portion of the plug member after the push shown in FIG. 55A and FIG. 55B.
Figure 56B:
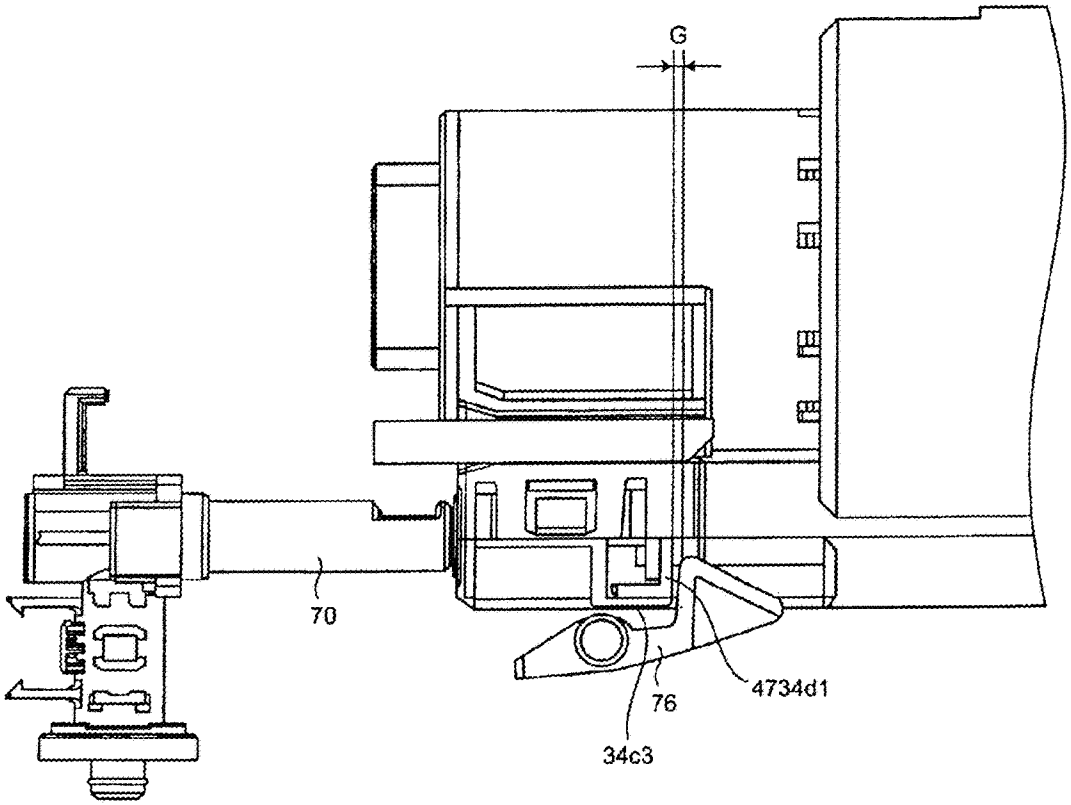
FIG. 56B is a partially cross-sectional side view of how the claw member returns to the default position so that the claw member is engaged with the engaging portion of the plug member after the push shown in FIG. 55A and FIG. 55B.

FIG. 53A is a perspective view of how the engaging portions 34g of the toner container 32Y align with the positioning members 31c of the toner-container holder 31 during mounting of the toner container, and FIG. 53B is a side view of the same. FIG. 54A is a perspective view of how a held portion 4743Y starts to be engaged with the positioning members 31c and FIG. 54B is a partial cross-sectional side view of the same. FIG. 55A is a perspective view of how the claw member 76 is pushed down during the installation of the toner container and FIG. 55B is a partial cross-sectional side view of the same. FIG. 56A is a perspective view of how the claw member 76 returns to the default position so that the claw member 76 engages the engaging portion of the plug member 4734d during mounting of the toner container, and FIG. 56B is a partial cross-sectional side view of the same.

In FIG. 53B which shows how the positioning member 31c faces the engaging portion 34g of the toner container 32Y when viewed from the side, it looks as if the claw member 76 touches the lower corner of the held portion 4734Y, but actually, as shown in the perspective view of FIG. 53A, the groove 34p prevents the claw member 76 from contacting the corner.

Thereafter, in FIG. 54A and FIG. 54B which show how the attachment is progressed, the claw member 76 is further moving into the grooves 34p while maintaining its default position to come in contact with the corner portions 34p1 at the respective rear ends of the grooves 34p. At this time, the positioning members 31c already are partially engaged with the engaging portions 34g. Therefore, even if the upward force is applied to the positioning members 31c in this state from the claw member 76, the held portion 4734Y is not rotated or turned obliquely upward because of the rigidity of the positioning members 31c. However, the held portion 4734Y may rise slightly due to a gap of a fit tolerance between the positioning member 31c and the engaging portion 34g, but this does not cause any trouble in the insertion operation of the nozzle 70 performed afterward.

Then, as shown in FIG. 55A and FIG. 55B, the claw member 76 butts against the corner portions 34p1 at the rear ends of the grooves 34p in the entry direction of the claw member 76, and then, the claw member 76 goes onto the wall surface 34c3 and slides thereon. This causes the claw member 76 to maintain its posture such that it is pressed downward where the attachment of the held portion 4734Y is not obstructed.

At this time, however, the nozzle 70 does not yet contact the plug member 4734d. Therefore, the plug member 4734d is still in the closed position, and the protrusion portion 4734d1 and the second protrusion portions 4734d2 are also stored in the storage portions 34q. Accordingly, the claw member 76 does not push the protrusion portion 4734d1 before the nozzle 70 contacts the plug member 4734d. Thus, the erroneous-operation preventing function of the storage portions 34q is fulfilled.

Lastly, as shown in FIG. 56A and FIG. 56B, the claw member 76 is engaged with the back of the protrusion portion 4734d1 when viewed from the nozzle 70, and then, the nozzle 70 contacts the plug member 4734d slightly afterward and starts pushing so as to open the toner outlet B. In FIG. 56B, because there is a slight gap G between the edge of the claw member 76 and the protrusion portion 4734d1 to be engaged with the claw member 76, the edge of the nozzle 70 does not contact the plug member 4734d by the gap G at the point in time (gap G is 0) when the edge starts to engage the protrusion portion 4734d1.

The plug member 4734d is held and fixed, at the state of FIG. 56B, by the nozzle 70 and the claw member 76 which are components of the toner-container holder 31, and the toner container is further pushed therein, so that the toner outlet B and the inner cylinder portion of the nozzle 70 communicate with each other.

Fourteenth Embodiment

Figure 57:
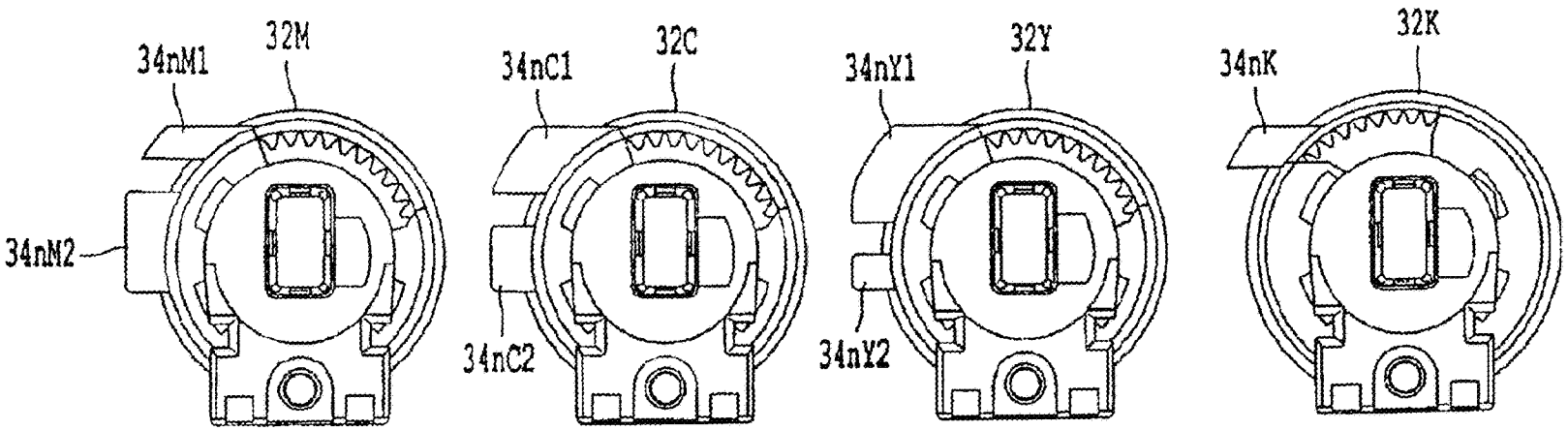
FIG. 57 is a schematic diagram of the front portion of four toner containers as arranged within an image forming apparatus.

Another feature of the invention which may be applied to any of the embodiments is explained below with reference to FIGS. 57-63. FIG. 57 is a schematic of toner containers filled with toners of colors such as yellow (Y), magenta (M), cyan (C), and black (K) respectively when viewed from the held portions 34 (Y, M, C, K) of the toner containers. As shown in FIG. 57, a convex portion (which corresponds to the convex portion 34n of the first embodiment) protruded from the side face of the held portion 34 is different from others in the position, the shape, and the number for each color container.

As shown in FIG. 57 which is to scale, the toner container 32K for black toner has one convex portion 34nk on the left side with respect to the held portion 34K. The convex portion 34nk is set so that the protrusion in the horizontal direction is slightly longer than that of the convex portions for the other colors at the same height. As a result, the toner container 32K is prevented from being inserted into the opening for insertion of another toner container.

The toner containers 32Y, 32M, and 32C for the other three colors have two convex portions each. Each upper-side end face of the convex portions of the toner containers is formed so as to be in a plane concentric with each container body of the toner containers, and each lower-side convex portion is formed into a cuboid. The caps or held portions are formed so that the widths of the upper-side convex portions in the vertical direction are different from one another, and that the widths of the lower-side convex portions in the vertical direction are also different from one another. In other words, the height of a space between the upper-side convex portion and the lower-side convex portion of one toner container is different from that of the others.

For the black toner container 32K, the single convex portion or projection is designated by 34nK, for the yellow toner container 32Y, the two convex portions or projections are designated by 34nY1 and 34nY2, for the cyan toner container 32C, the two convex portions or projections are designated by 34nC1 and 34nC2, and for the magenta toner container 32M, the two convex portions or projections are designated by 34nM1 and 34nM2.

*In FIG. 57, each of projections 34nM1, 34nC1, 34nY1, and 34nK have an upper and lower horizontal line. Outer ends of these upper and lower horizontal lines are connected with a convex line. As shown in FIG. 57, the outer edge of each of the projections 34nM1, 34C1, 34nY1, and 34nK extend further away from the center or longitudinal axis of the illustrated containers and extend further from an outer surface of the partially cylindrical section. A profile, perpendicular to the longitudinal axis, of each of the projections includes an upper horizontal line including an outer end, a lower horizontal line including an outer end, and a convex line which is an outer edge of the projection connecting the outer end of the upper horizontal line with the outer end of the lower horizontal line.*

Figure 58A:
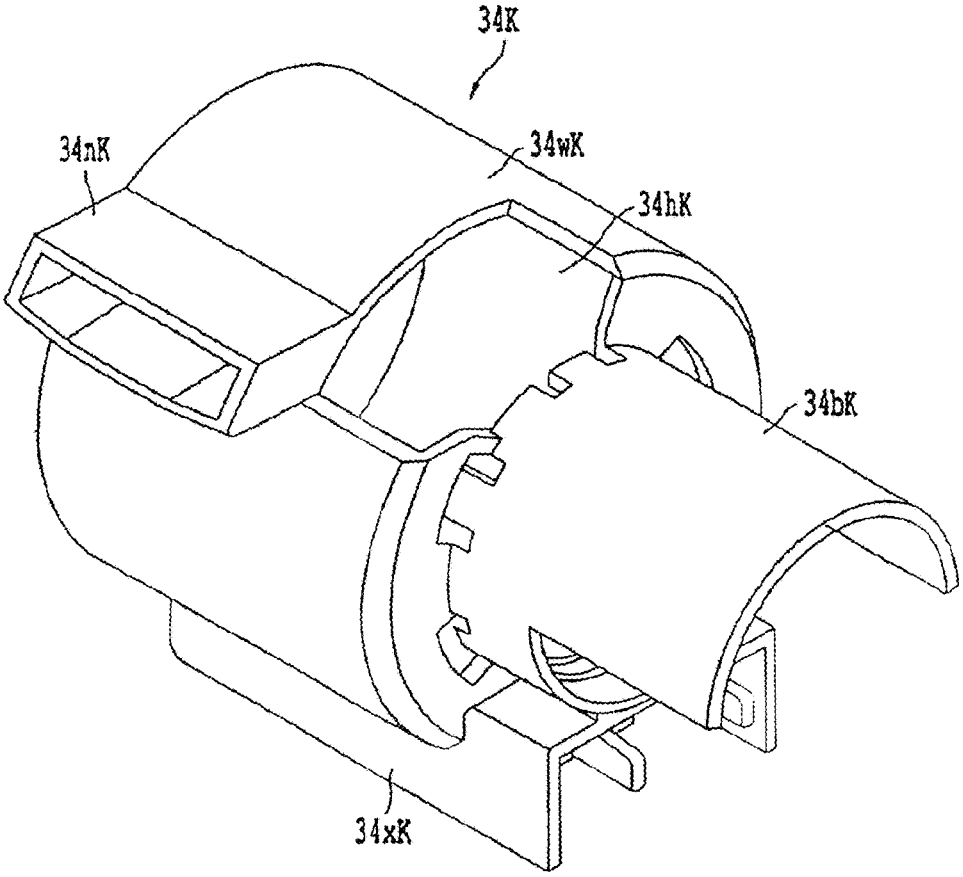
FIGS. 58A-58C are perspective views of a cap or held portion of a black toner container.

FIG. 58A is a perspective view of the held portion or cap 34K which is utilized with a container, also be referred to as a volume or bottle, which holds black toner. While a bottle has been illustrated in the figures, other types of volumes may be utilized. For each of the embodiments and colors, the invention includes both empty toner containers which do not contain toner, and toner containers which are filled with toner. While toner is the preferred substance to go in the containers, any desired material which is utilized to form an image on a page may be utilized including combinations including toner and developer, or ink, or any other substance which can be utilized to form an image. The cap or held portions 34 are illustrated in the shape that they are manufactured, but it is not necessary to manufacture such a held portion as shown. For example, the front portion of the held portion 34K or cap may be formed on the front thereof and need not be separately formed. Moreover, any style or manufacturing process may be used, as long as the features expressly recited in the claims are included.

In FIG. 58A, the held portion or cap 34K includes a notched portion 34hK through which a gear of a toner bottle protrudes or is accessible in order to drive or rotate the toner bottle within the held portion or cap. There is a cylindrical portion 34wK which has the convex portion or protrusion 34nK connected thereto. Regarding the convex portions or protrusions, "connected thereto" covers both integral forming of the convex portion with the held portion, or forming the convex portion or held portion separately and attaching these two elements together, for example through an adhesive, epoxy, bolts, lamination, attachment by heat, or screws, or any other manner.

Figure 58B:
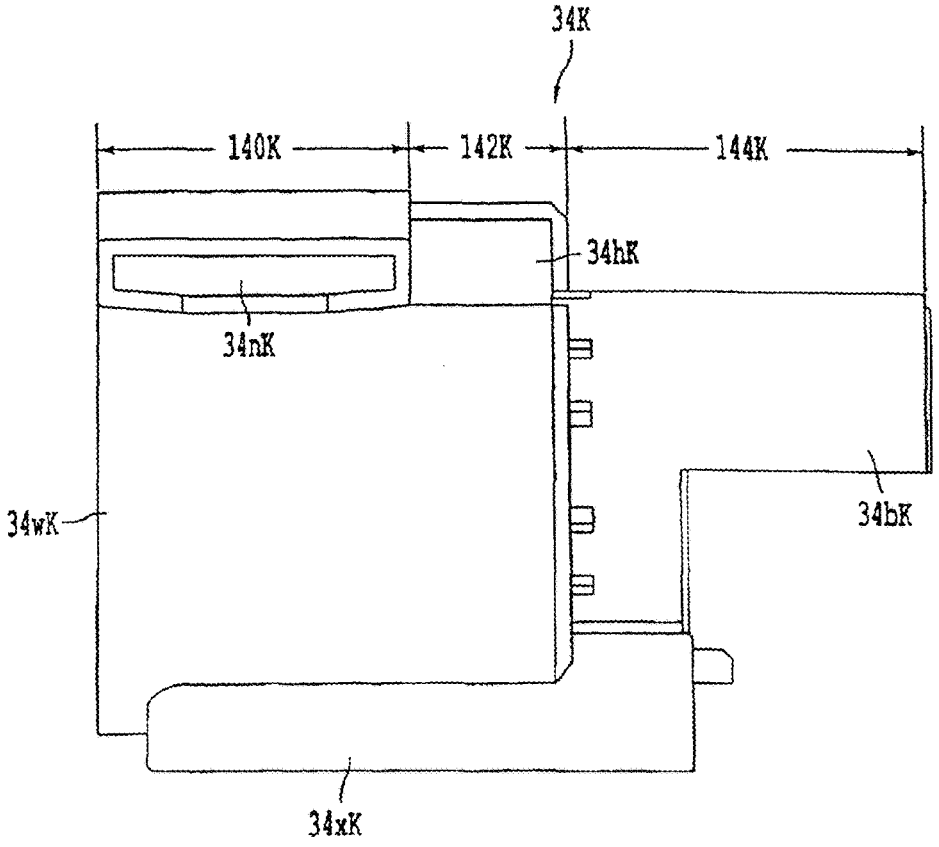

Preventing the wrong color toner from being inserted into the image forming device prevents the contamination of the image forming apparatus, prevents avoidable service calls, and results in properly formed images. In this embodiment, the dimensions of the toner container including the held portion 34K are set in order to prevent improper mounting by restricting the held portion 34K from passing through the improper opening of the enclosure plate. The length of the convex portion or protrusion 34nK along the axis of rotation of the storage volume is designated by 140K. The length between the leading edge of the convex portion 34nK and the front of the cylindrical portion 34wK is 142K. The length of the cap cover 34bK is designated by 144K. As illustrated in FIG. 58B, the edges of the convex portion 34nK are tapered in the vertical direction in order to assist in the insertion and removal of the toner container. Further, there may be a tapering of the convex portion 34nK so that as the distance from the center of the projection along the lengthwise direction increases, the distance from the center of the cylindrical portion decreases. For example, such tapering may reduce the distance from the center by 1 or 2 mm.

Figure 58C:
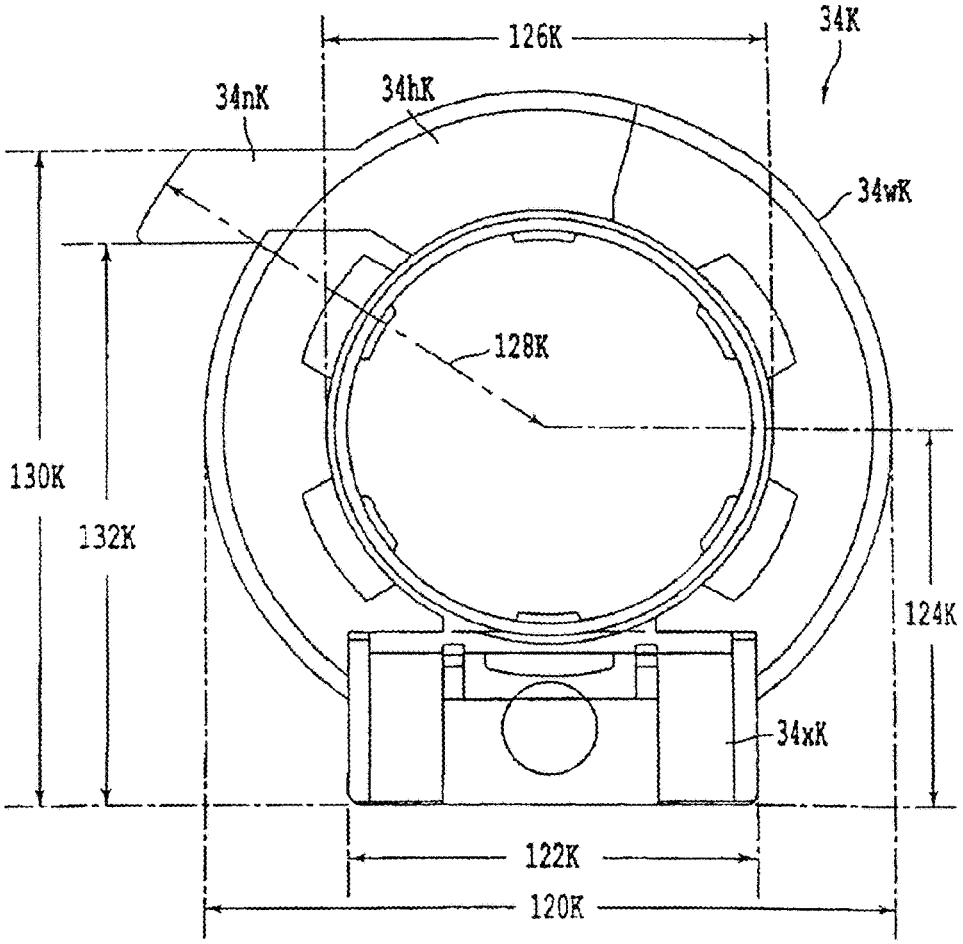

FIG. 58C illustrates various dimensions of the front of the black container. 120K designates the diameter of the cap or held portion at the cylindrical portion 34wK, 122K designates the width of the base, 124K designates the height from the bottom of the base 34xK to the center of the container, also referred to as the axis of rotation. 126K designates the diameter of the front of the cap, 128K is the radius from the axis of rotation to the center of the projection 34nK. If desired, this radius may decrease at the edges of the projection, for example, by 1 mm both at the top and bottom portion of the projection, for example. 130K designates the height from the base of the container to the top of the projection 34nK, and 132K designates the height from the bottom of the container base to the bottom of the projection. The thickness of the projection (in the vertical direction) is 130K minus 132K. The various dimensions set forth in FIGS. 58B and 58C are set forth in the below table.

Black Container

| Description | Ref. No. | Size (mm) |
|---|---|---|
| diameter of cap | 120K | 65 |
| width of base | 122K | 38 |
| height to center of container | 124K | 36.3 |
| diameter of front of cap | 126K | 42 |
| radius to projection | 128K | 43 |
| height to top of projection | 130K | 63.5 |
| height to bottom of project. | 132K | 54.5 |
| thickness of projection | | 9 |
| length of projection | 140K | 37 |
| | 142K | 19 |
| | 144K | 42.3 |

FIGS. 58A-58C, 59A-59C, 60A-60C, 61A-61C, 63A and 63B are drawn to scale. Therefore, any measurement not contained in any of the tables or otherwise described can be determined by appropriately measuring the drawings.

Figure 58D:
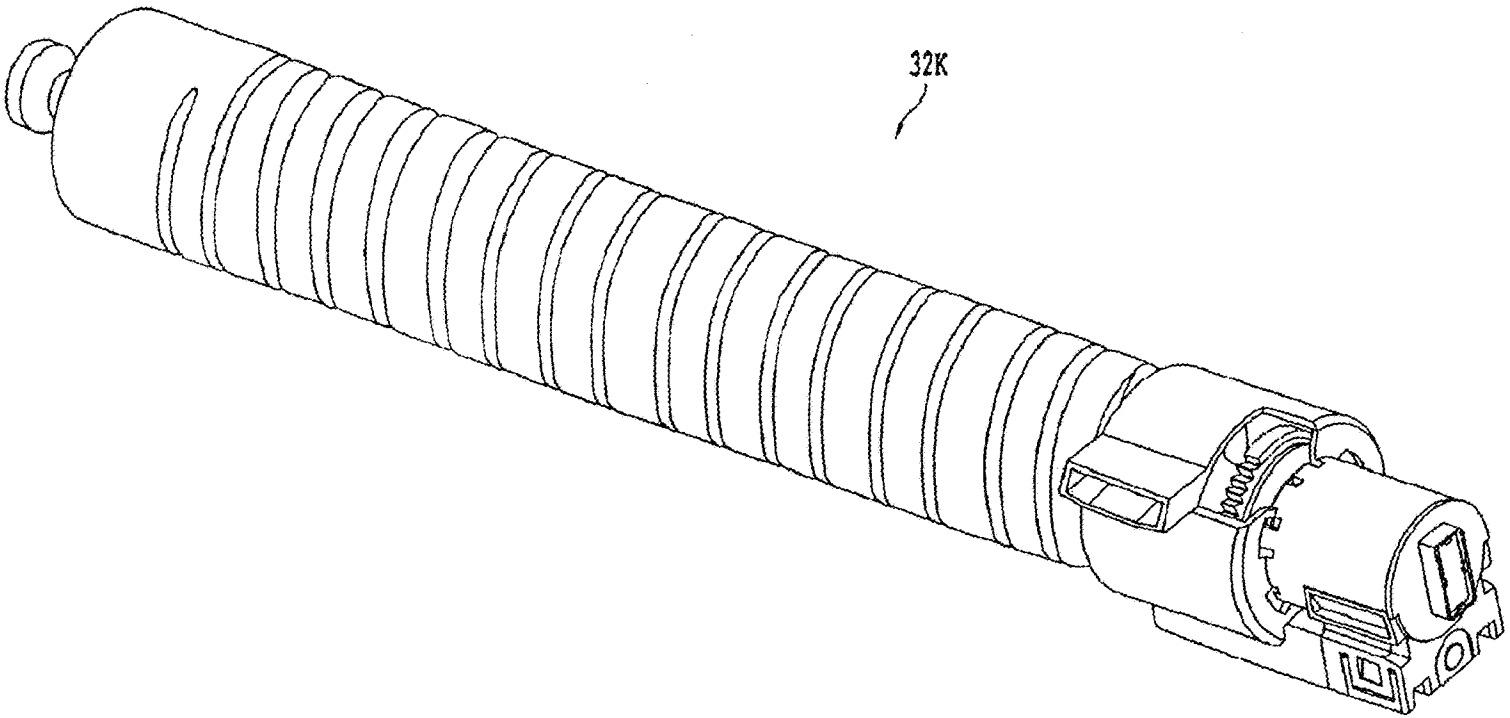
FIG. 58D is a perspective view of a black toner container.
Figure 59A:
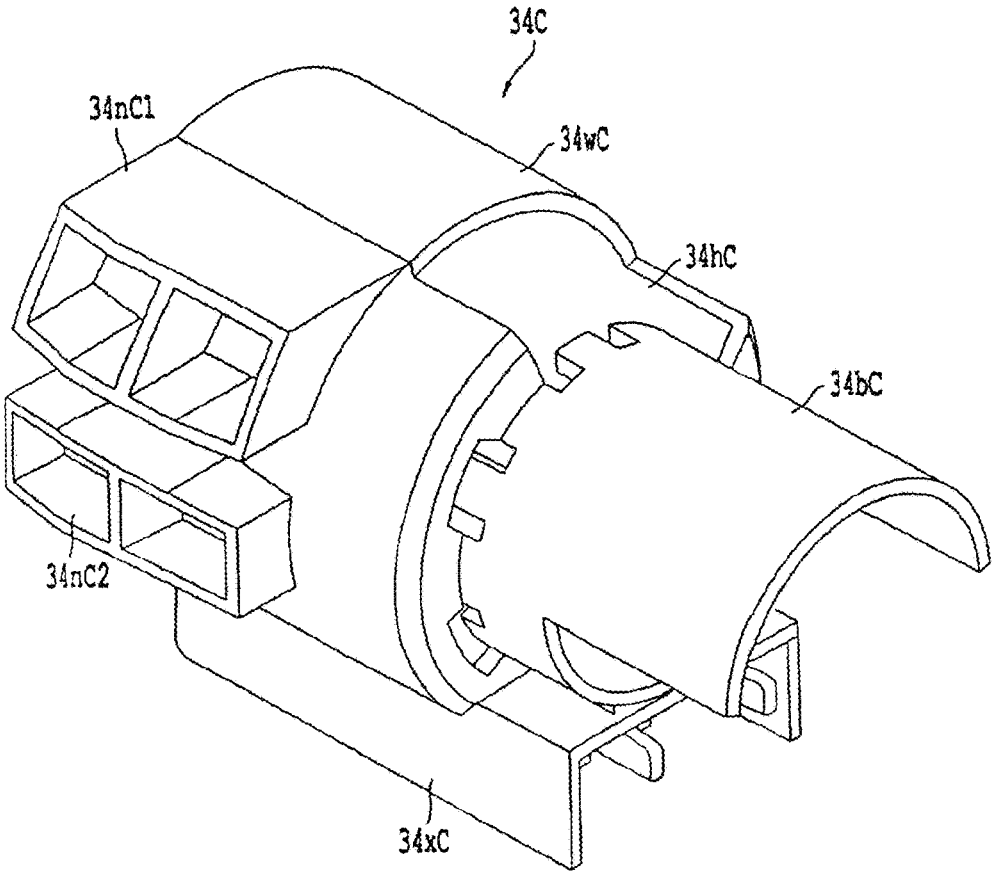
FIGS. 59A-59C are perspective views of a cap or held portion of a cyan toner container.
Figure 59B:
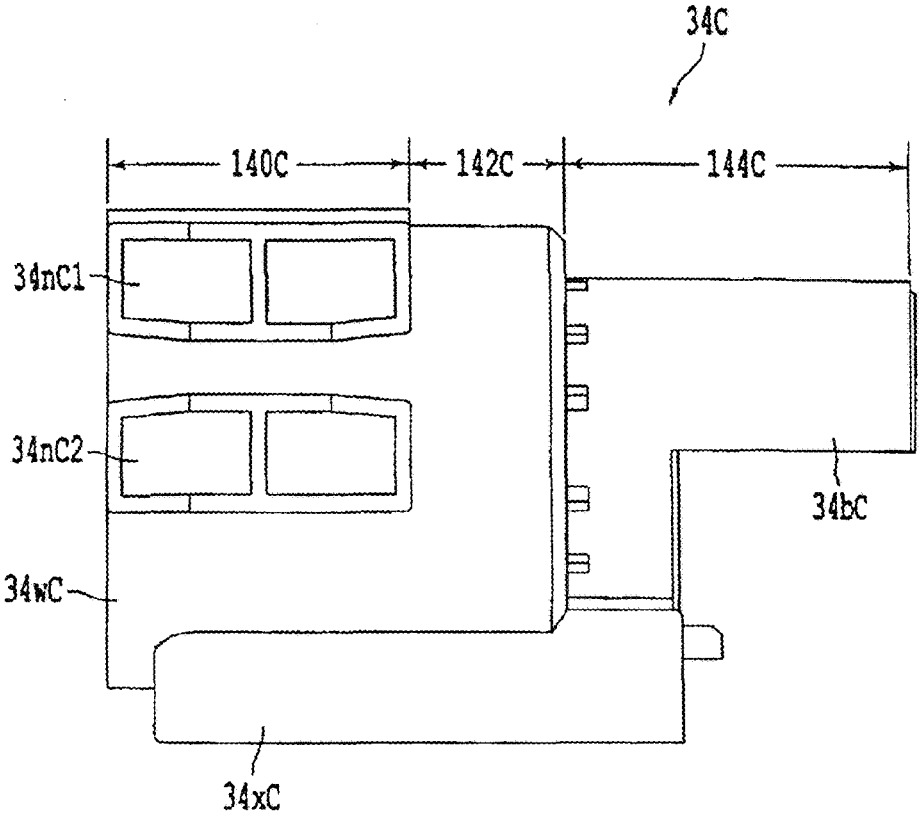
Figure 59C:
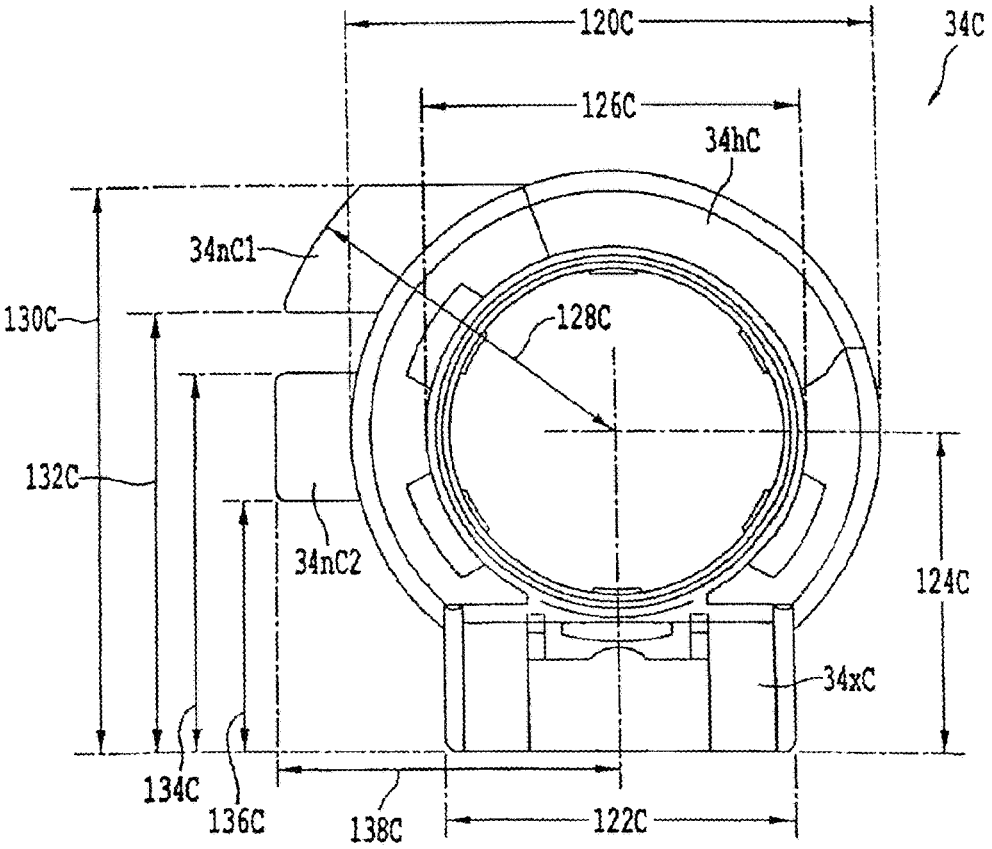
Figure 59D:
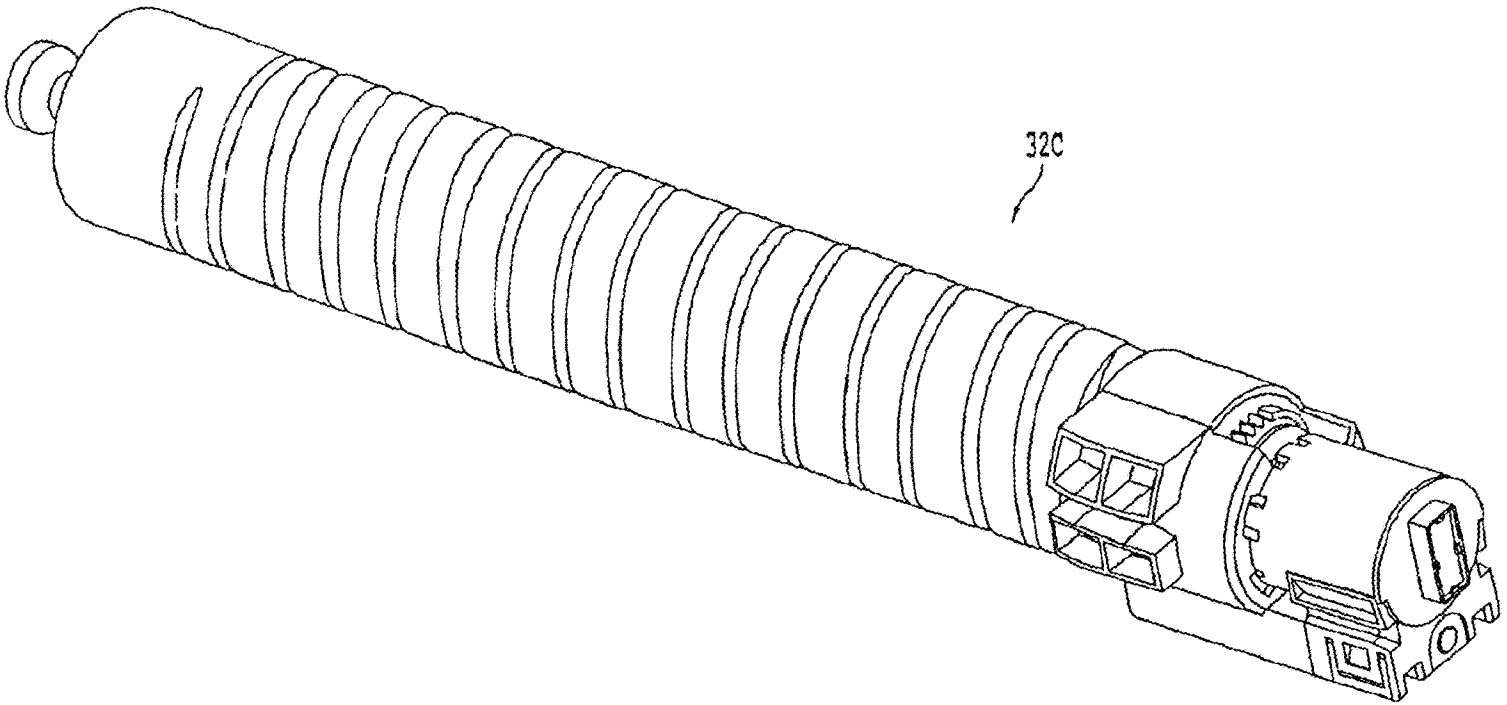
FIG. 59D is a perspective view of a cyan toner container.
Figure 60A:
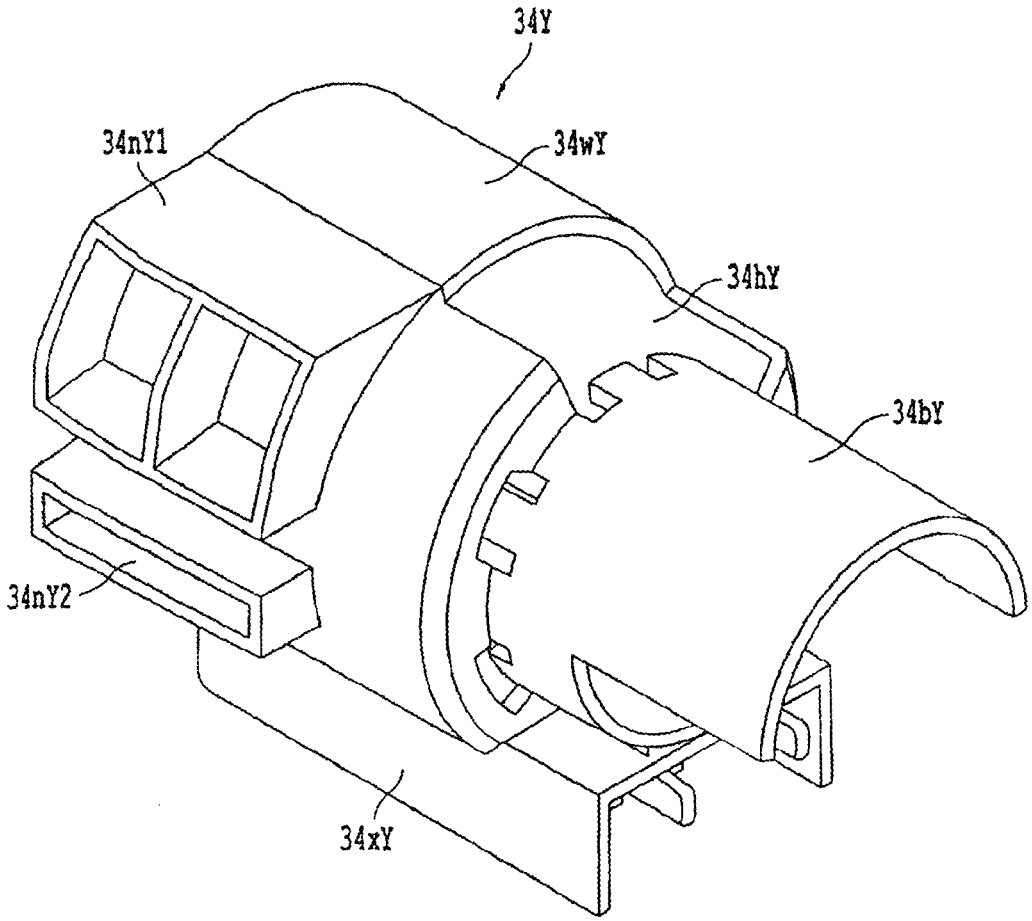
FIGS. 60A-60C are perspective views of a cap or held portion of a yellow toner container.
Figure 60B:
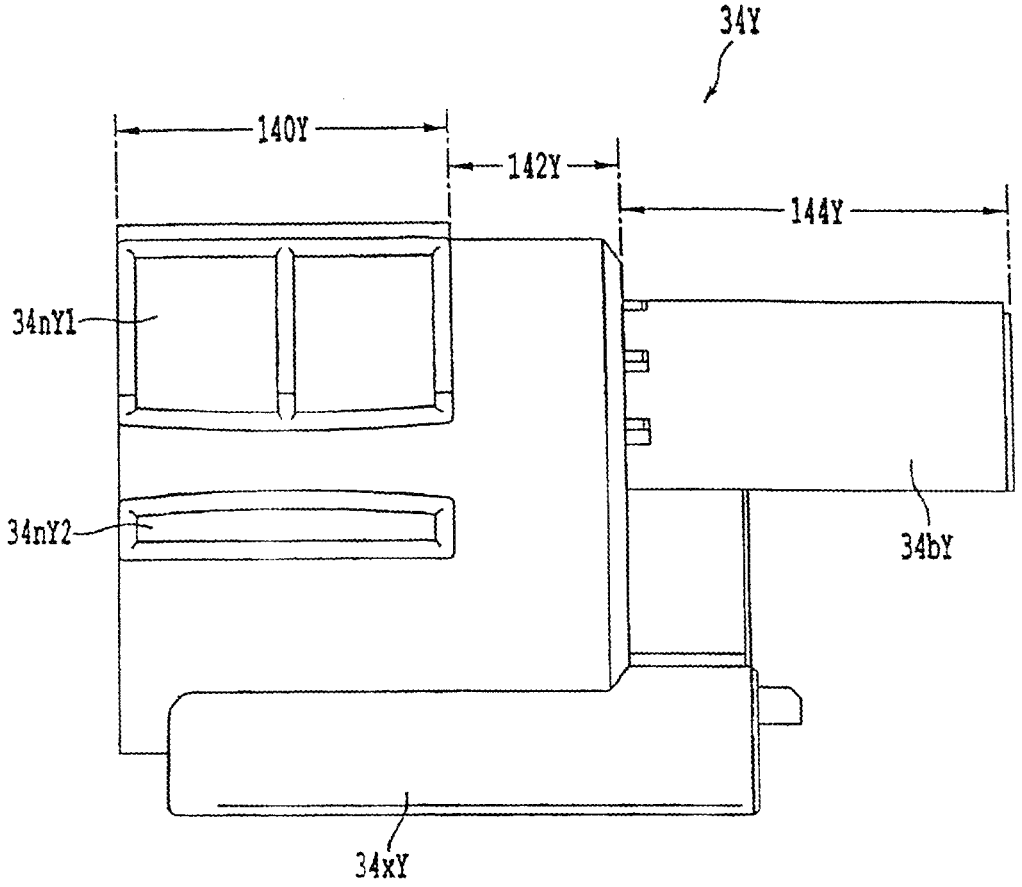
Figure 60C:
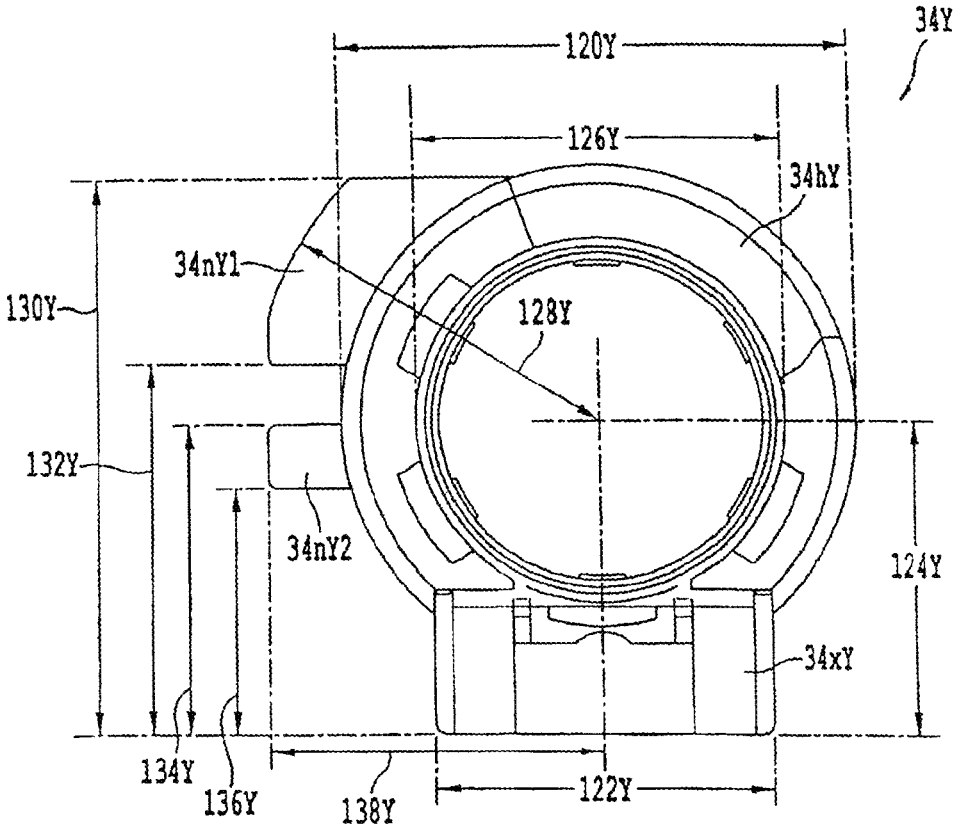
Figure 60D:
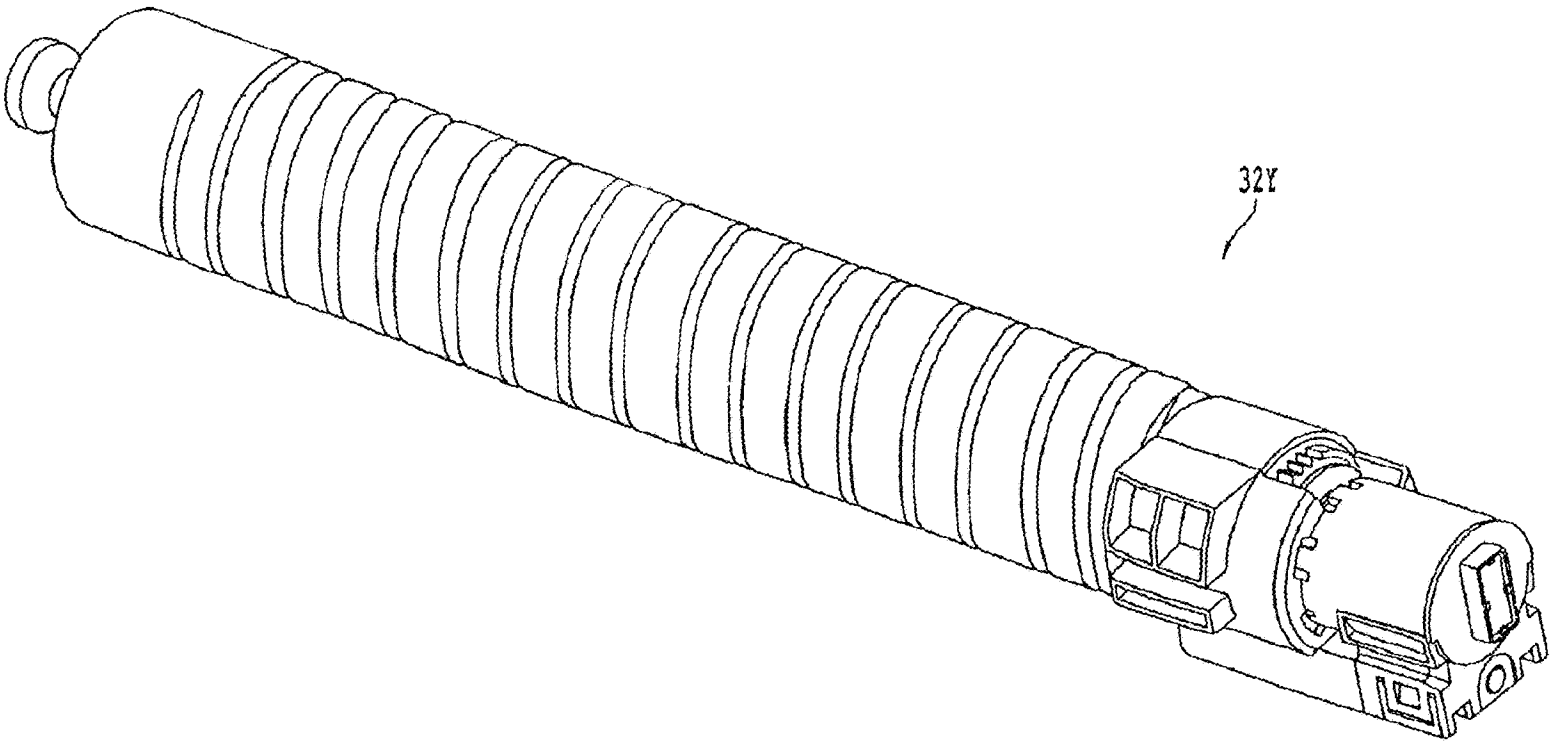
FIG. 60D is a perspective view of a yellow toner container.
Figure 61A:
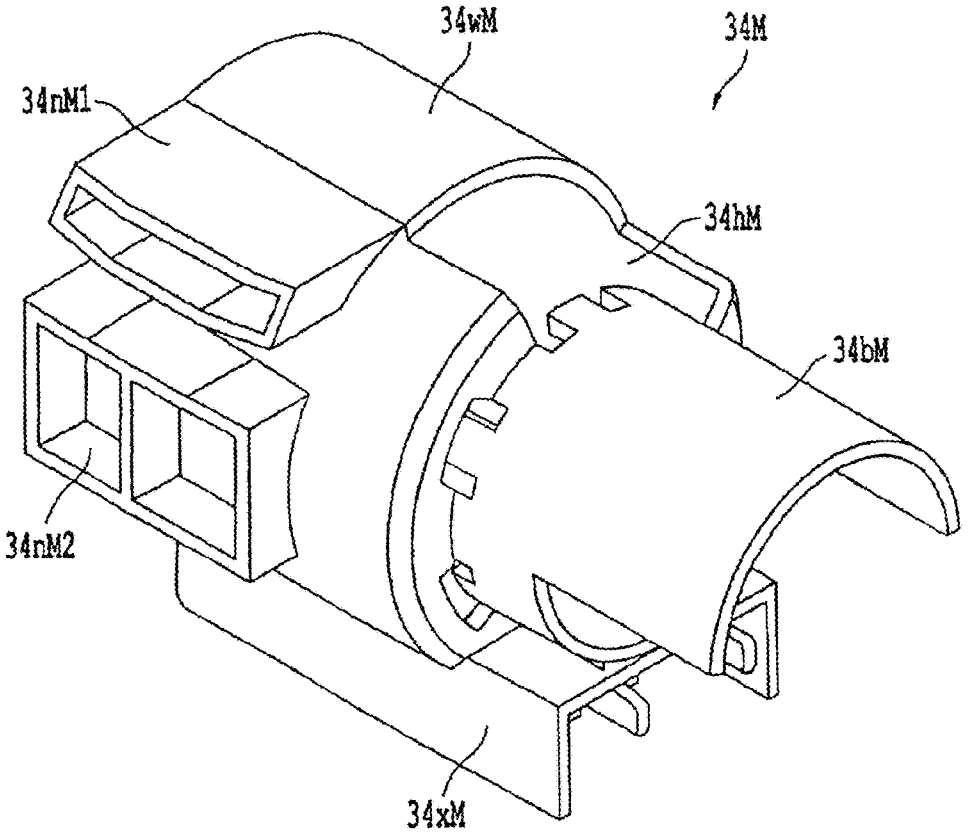
FIGS. 61A-61C are perspective views of a cap or held portion of a magenta toner container.
Figure 61B:
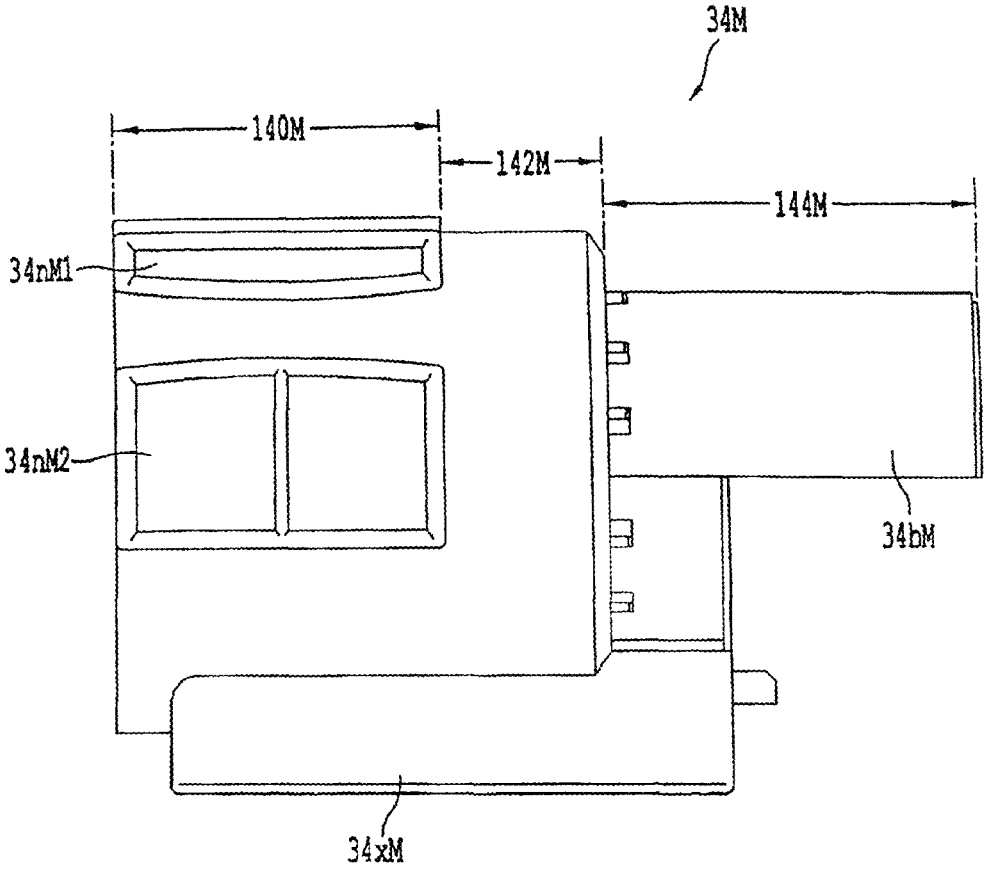
Figure 61C:
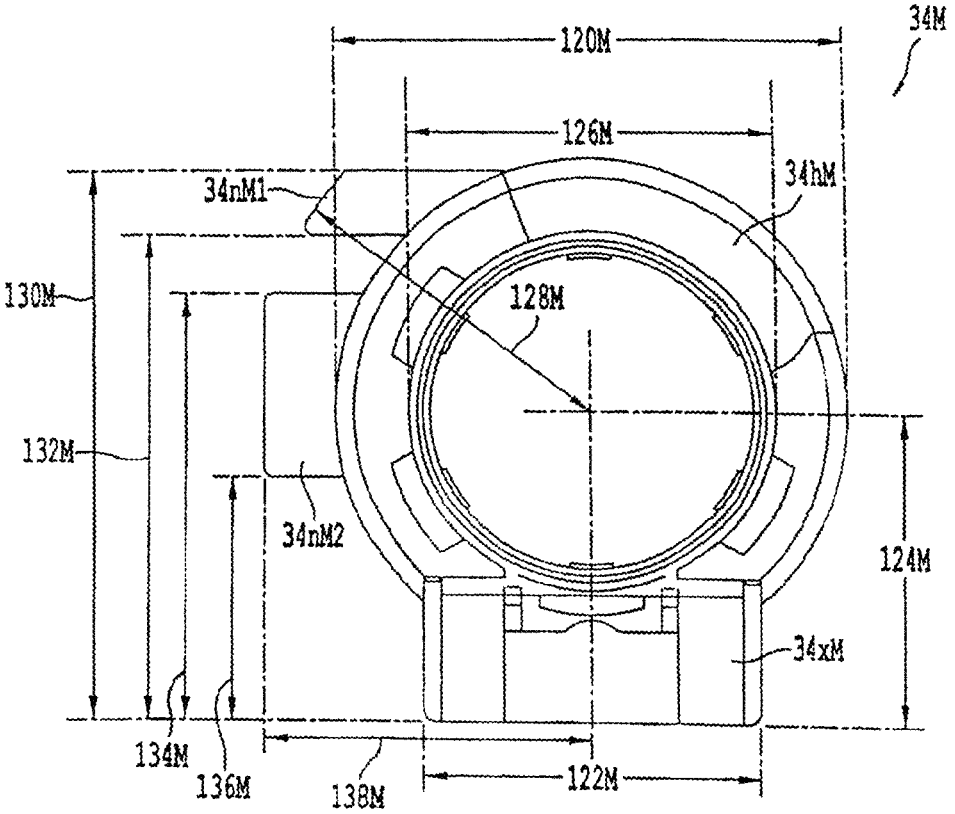
Figure 61D:
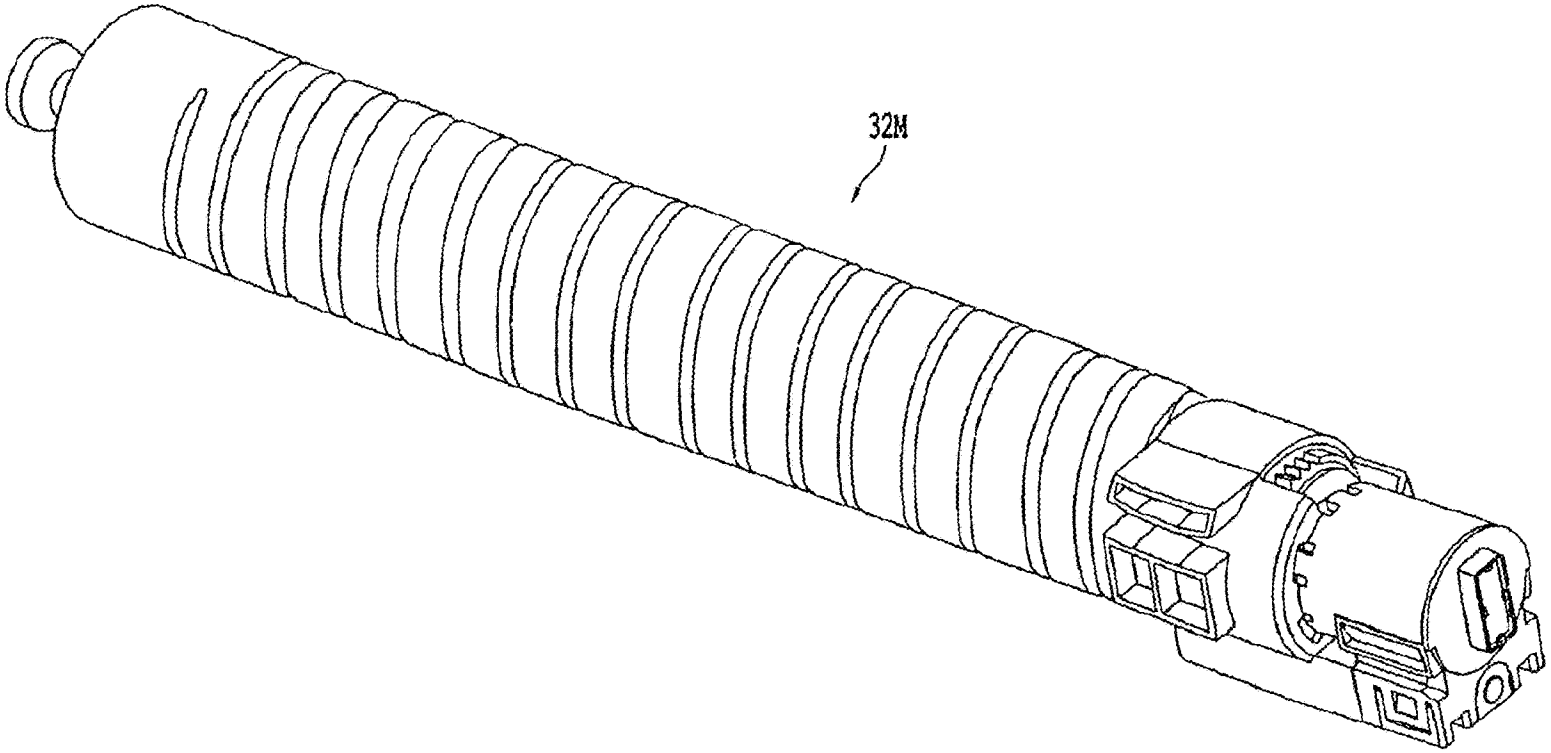
FIG. 61D is a perspective view of a magenta toner container.

FIG. 58D is a perspective view of the black toner container.

FIGS. 59A-59D are a cap for a cyan toner container and the cyan toner container, and generally correspond to FIGS. 58A-58D and explanations of the same components are omitted. A difference between the cyan toner container and the black toner container is that the cyan toner container includes two convex protrusions or projections 34nC1 and 34nC2 whereas the black toner container includes one projection 34nK. The dimensions for the cyan toner container are set forth below.

| Cyan Container | | |
|---|---|---|
| Description | Ref. No. | Size (mm) |
| diameter of cap | 120C | 59 |
| width of base | 122C | 38 |
| height to center of container | 124C | 36.3 |
| diameter of front of cap | 126C | 42 |
| radius to projection | 128C | 40 |
| height to top of projection 1 | 130C | 64.5 |
| height to bottom of project. 1 | 132C | 50 |
| thickness of projection 1 | | 14.5 |
| height to top of projection 2 | 134C | 43 |
| height to bottom of project. 2 | 136C | 28.5 |
| thickness of projection 2 | | 14.5 |
| Distance of outer edge of projection 2 from center | 138C | 38 |
| length of | 140C | 37 |
| projections | 142C | 19 |
| | 144C | 42.3 |

FIGS. 60A-60D illustrate features of the yellow toner container and have the dimensions as set forth below.

| Yellow Container | | |
|---|---|---|
| Description | Ref No. | Size (mm) |
| diameter of cap | 120Y | 59 |
| width of base | 122Y | 38 |
| height to center of container | 124Y | 36.3 |
| diameter of front of cap | 126Y | 42 |
| radius to projection | 128Y | 40 |
| height to top of projection 1 | 130Y | 64.5 |
| height to bottom of project. 1 | 132Y | 43 |
| thickness of projection 1 | | 21.5 |
| height to top of projection 2 | 134Y | 36 |
| height to bottom of project. 2 | 136Y | 28.5 |
| thickness of projection 2 | | 7.5 |
| Distance of outer edge of projection 2 from center | 138Y | 38 |
| length of | 140Y | 37 |
| projections | 142Y | 19 |
| | 144Y | 42.3 |

FIGS. 61A-61D illustrate features of the magenta toner container and descriptions of the same portions which have already been described above with respect to the other toner containers are omitted. The dimensions for the magenta toner container are as set forth below:

| Magenta Container | | |
|---|---|---|
| Description | Ref. No. | Size (men) |
| diameter of cap | 120M | 59 |
| width of base | 122M | 38 |
| height to center of container | 124M | 36.3 |
| diameter of front of cap | 126M | 42 |
| radius to projection | 128M | 40 |
| height to top of projection 1 | 130M | 64.5 |
| height to bottom of project. 1 | 132M | 57 |
| thickness of projection 1 | | 7.5 |
| height to top of projection 2 | 134M | 50 |
| height to bottom of project. 2 | 136M | 28.5 |
| thickness of projection 2 | | 21.5 |

-continued

| Magenta Container | | |
|---|---|---|
| Description | Ref. No. | Size (men) |
| Distance of outer edge of projection 2 from center | 138M | 38 |
| length of | 140M | 37 |
| projections | 142M | 19 |
| | 144M | 42.3 |

The perspective view of the toner container set forth in FIGS. 58D, 59D, 60D, and 61D may include bottles which have a substantially constant radius, or the radius may be different for different portions of the bottle.

Figure 62A:
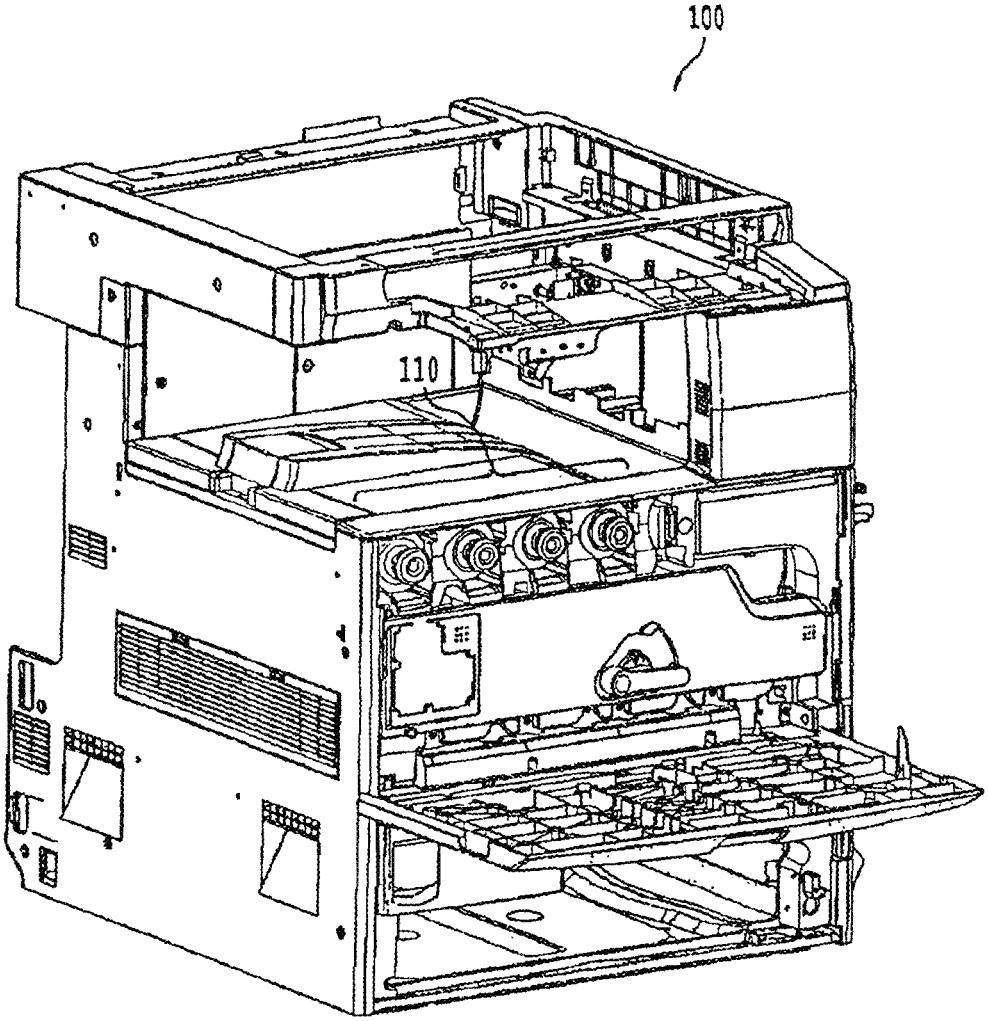
FIG. 62A is a perspective view of an exemplary image forming apparatus which receives the toner containers of the present invention.
Figure 62B:
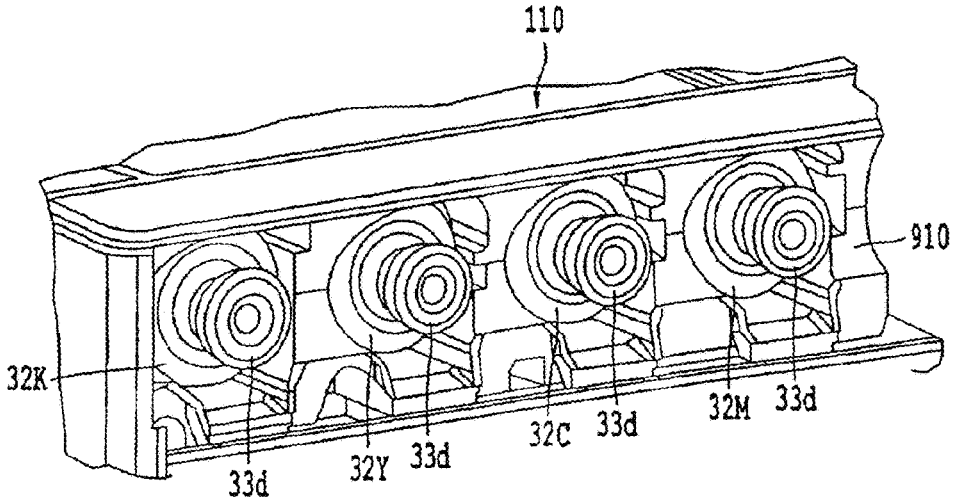
FIG. 62B is a close-up of a perspective view of the toner containers inserted into the image forming apparatus.

FIG. 62A illustrates an image forming apparatus which utilizes the toner containers of the invention. The opening 110 at the front portion is the region at which the toner containers are inserted into the image forming device 100. FIG. 62B is a close-up of the region 110 and shows the four toner containers 32K, 32Y, 32C, and 32M, each having a gripper 33d which allows a user to hold the rear of the toner container during the insertion and removal process. Also shown in FIG. 62B is a plate 910, discussed below with respect to FIGS. 63A and 63B which restricts which color toner container is inserted into which position.

Figure 63A:
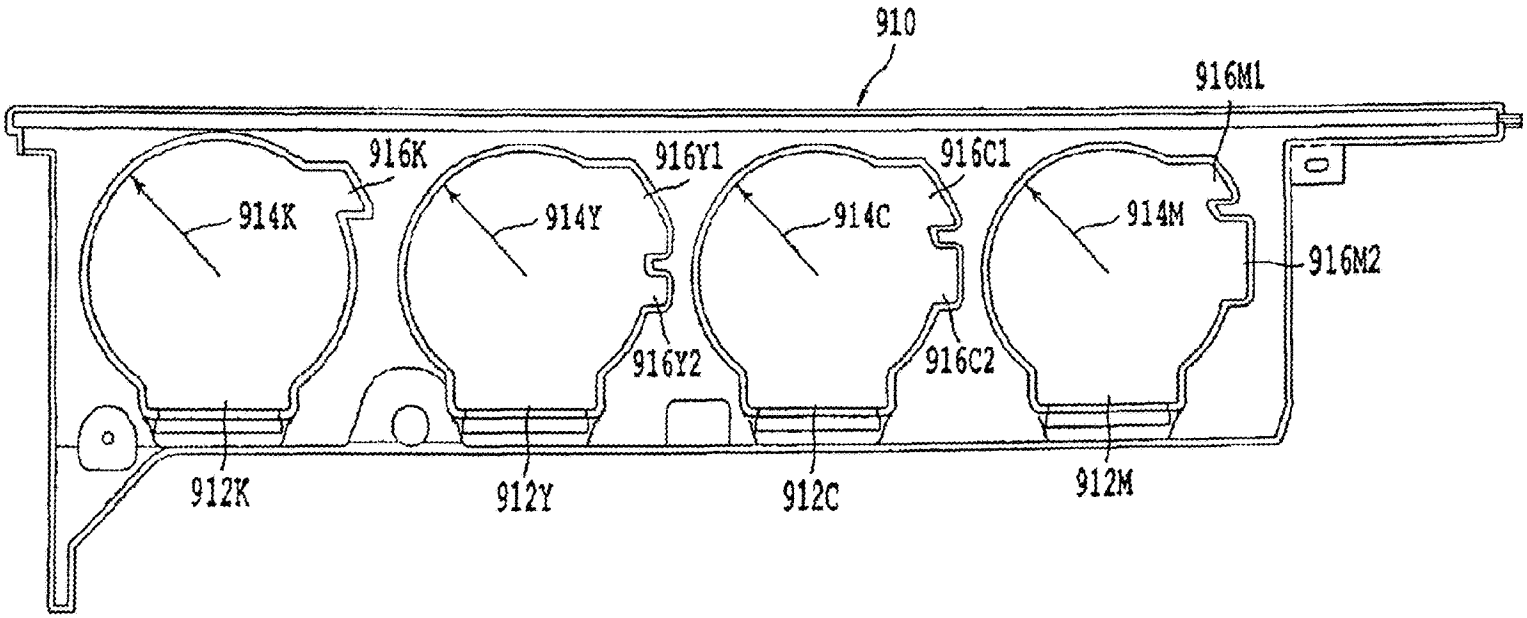
FIG. 63A is a schematic view of en enclosure plate.

FIG. 63A shows a front view of the plate 910. Because the image forming apparatus 100 uses four different color toner containers, the plate 910 has four openings for receiving the four different color toner containers, although the plate can be constructed to receive more or less toner containers, as desired.

The four openings in FIG. 63A are shown as 912K for the black container, 912Y for the yellow container, 912C for the cyan container, and 912M for the magenta. The opening 912K for the black container includes a protrusion portion 916K for accepting the one protrusion of the black toner container. The opening 912K contains a substantial portion which is circular in shape, and has a radius 914K which is designed to accommodate the black toner container, and also serves to restrict the other toner containers. The openings for the yellow, cyan, and magenta toner containers each include two projections for receiving a corresponding projections on the toner containers. The opening 912Y for the yellow container contains a radius of 914Y, and protrusion portions 916Y1 and 916Y2. The shapes and positions of the protrusion portions of the openings configured to receive the cyan and magenta containers also contain two protrusion portions, but the size and position of those protrusion portions are different for each toner container.

Figure 63B:
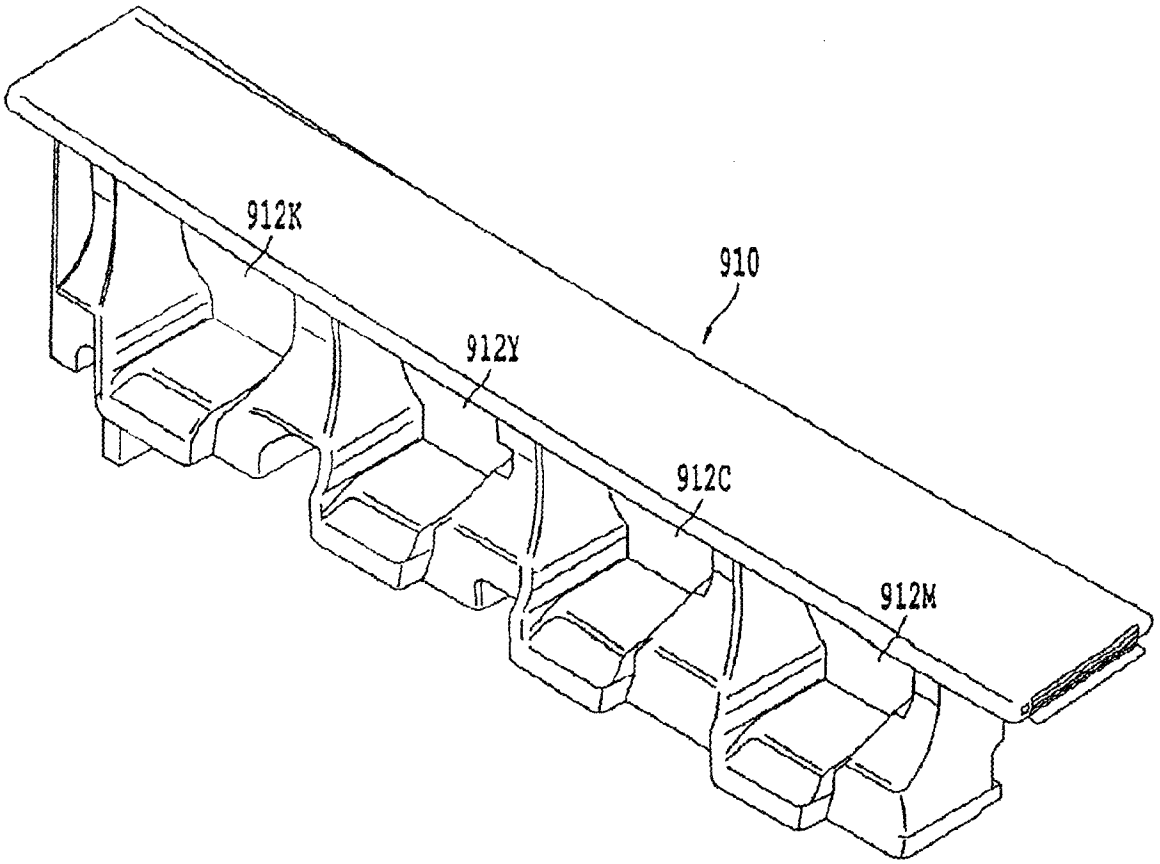
FIG. 63B is a perspective view of the enclosure plate.

A perspective view of the plate 910 is shown in FIG. 63B. Depending on the construction of the machine, the plate may have a substantially flat or two-dimensional structure, or may be constructed to have a three-dimensional structure, as shown in FIG. 63B. The plate 910 shown in FIG. 63B may be mounted at the front of the image forming apparatus, as shown in FIG. 62A, and the enlargement in FIG. 62B. Alternatively or additionally, the plate may be mounted at an interior portion of the image forming apparatus, for example, at or near a position which results in the protrusions of the toner containers remaining at an interior of the holes 912 of the plate 910 when the toner containers are in use.

According to an embodiment of the invention, the radius 914 of the holes 912 in the plate 910 are 32.5 mm for the cyan, magenta, and yellow holes, and 35.5 mm for the black hole in the plate 910. Also according to the preferred commercial embodiment, the radius of the cyan, magenta, and yellow container body or bottle is 31.5 mm and the radius of the black container body or bottle is 34.5 mm. Since black toner is generally consumed at a higher rate than the other colors, it is preferable for the black container to hold more toner. The present inventors have found that by setting the various dimensions of the frame to be 2 mm larger than the corresponding dimensions of the bottle and/or the cap, the toner container can be properly inserted into its corresponding opening in the image forming apparatus, while preventing the wrong color toner bottle from being inserted into a non-corresponding potion. However, as long as the relative sizes of the frame openings and the toner containers appropriately prevent a container from being inserted at an improper position, the differences between the toner container size and frame may be changed, as desired.

Various dimensions of the components of the invention have been provided herein, but those dimensions in relationships to each other are not required by the invention, unless specifically recited in the claims. Further, the invention includes a changing of any of the dimensions, for example, by increasing or decreasing any of the dimensions by 5%, 10%, 15%, 20%, 25%, 30%, or 35%, or any value in between, for example. Further, the dimensions and the relative relations can be changed even more, if desired, as long as the system functions in the desired manner.

Various dimensions and relations may be utilized in order to prevent the wrong color toner from being used in an improper position in the image forming apparatus. For example, for the cyan, yellow, and magenta color toner containers, there are two projections. When viewed in the vertical direction, the thickness of the projections (reference number 130 minus 132, and 134 minus 136) are configured such that a sum of a thickness of the two projections in the vertical direction is less than or equal to a radius of the cylindrical-shaped portion of the cap. Further, an outer edge of at least one of the projections has a minimum distance from a center of the cylindrical-shaped portion which is greater than a larger radius of a cylindrical-shaped portion of any other toner container used in the machine. Additionally, the container may be arranged such that a distance from the center of the cylindrical-shaped cap portion to an outer edge of each of the two projections is at least 15%, 25%, or 35% greater than the radius of the cylindrical-shaped portion. Further, for any embodiments of the invention, the invention includes both an empty toner container, and the toner container filled with toner and/or a mixture of toner and other components such as developer, agitating or mixing particles, charging particles, or any desired feature.

According to another embodiment of the invention, the projection on the exterior of the cap or held portion is configured such that a distance from a center of the cylindrical-shaped cap portion to an outer edge of the projection is at least 15% greater than a radius of a cylindrical-shaped portion. Moreover, a distance from a center of the cylindrical-shaped cap portion to an outer edge of projection on the cap is at least 15%, 25%, or 35% greater than a radius of the cylindrical-shaped portion. Moreover, the cap may include a second projection, and the distance from a center of the cylindrical-shaped cap portion to an outer edge of the second projection is at least 15% greater than the radius of the cylindrical-shaped portion. Moreover, a distance from a center of the cylindrical-shaped cap portion to an outer edge of each of the two projections may be arranged to be 25% or 35% greater than the radius of the cylindrical-shaped portion.

According to another embodiment of the invention, a thickness in the vertical direction of a first projection plus the thickness in the vertical direction of a second projection for each of the three containers is within 30%, 20%, 10%, or is even the same as a predetermined number. Thus, while the various projections of the cyan, yellow, and magenta toner containers are different, a sum of their thicknesses may be the same as each other, or within a predetermined tolerance.

According to yet another embodiment of the invention, there are least two toner containers used with the invention, each toner container having two projections. The thickness of the projection in the vertical direction of the first projection of the first toner container corresponds to the thickness in the vertical direction of the second or lower projection of the second container, and the same holds true for the upper projection of the second container and the lower projection of the first container. Moreover, these dimensions may vary by 30%, 20%, 10%, or be set to exactly the same. Such features correspond to the magenta and yellow bottles disclosed herein.

According to yet another embodiment of the invention, the projection on the exterior of the cap corresponds to a particular color toner and the length of the projection along a line parallel to the axis of rotation of the toner bottle is within 25%, 15%, or 5% of a distance from the axis of rotation to an outer edge of the projection.

According to another embodiment of the invention, the projection of the cap of the toner container is arranged such that the toner container can only be inserted through a plate having an opening which corresponds to the shape of the projection. Further, the opening of the plate corresponds to a circumferential shape of the container. Moreover, there may be two projections, and these two projections correspond to the holes in the plate.

Further, the invention includes an image forming apparatus containing the toner containers and the plate having various features as described above.

Figure 64A:
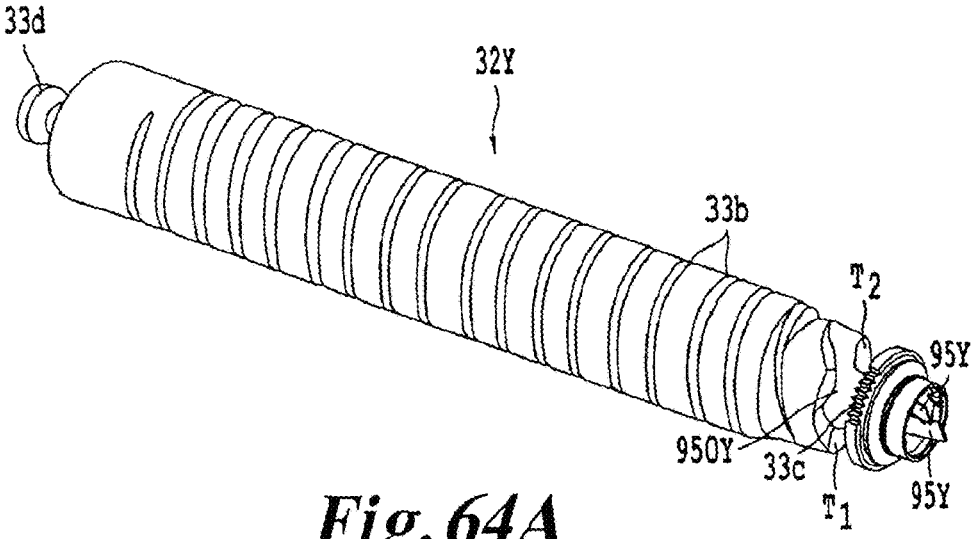
FIG. 64A is a perspective view of an embodiment of a toner bottle.
Figure 64B:
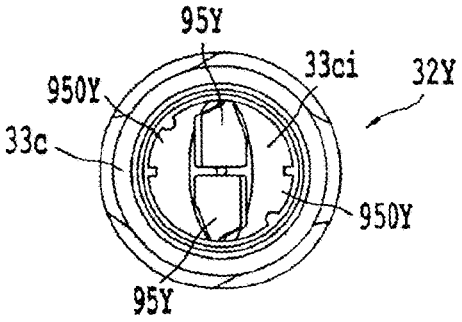
FIG. 64B is a front view of the toner bottle.

FIG. 64A and FIG. 64B are perspective and front views of an embodiment of the toner bottle 32Y. A bottle gear 33c, integrally molded with the bottle 32Y, is disposed near the opening of the toner bottle 32Y. Alternatively, the gear 33c may be formed separately from the bottle 32Y. As shown in FIG. 64B, when viewing the toner bottle 32Y from the bottle opening side, the portion of the bottle opening which has the smallest inner diameter is the opening (called the gear opening) 33ci at the bottle gear 33c. As an example, if the gear 33c is set back 1.5 centimeters (cm) from the opening end of the bottle 32Y, the gear opening 33ci will be set back inside of the bottle on the order of 1.5 cm from the opening end of the bottle.

The toner bottle of the present embodiment is provided with two toner guiding portions 95Y near the gear opening 33ci, and each toner guiding portion 95Y serves to move the toner from inside the toner bottle beyond the raised portion to the toner outlet when the bottle is rotated. The toner guiding portion 95Y is provided in the container to cause the toner inside the toner bottle to be moved to the toner outlet beyond the small-diameter portion of the bottle gear by rotation of the toner bottle. The toner guiding portions 95Y may be manufactured in any desired manner. For example, they may be integrally formed with the bottle or formed separately. The toner guiding portions 95Y may be formed together, and further formed to a ring which fits inside the mouth of the bottle 32Y in order to securely hold the toner guiding portions 95Y.

The construction of the bottle causes the toner to be scooped upwardly. Alternatively to or in addition to the scooping, the toner may be pushed forward and upward by grooves, such as the grooves 33b. A toner guiding inner wall 950Y is near the gear opening 33ci and the wall in toner bottle 32Y pushes out the toner, or allows the toner to slide thereon and to the toner guiding portions 95Y.

Features and descriptions of any one of the bottles shown in FIGS. 64A-66 are applicable to other bottles disclosed herein. A complete description of the reference numbers of the bottle shown in FIGS. 64A and 64B is provided below with respect to FIGS. 65A-66.

Figure 65A:
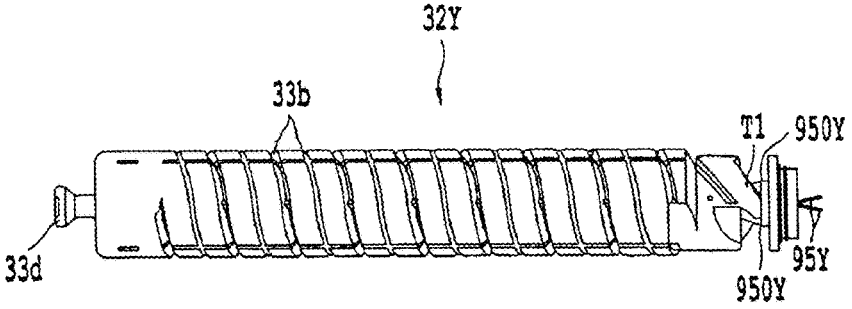
FIGS. 65A and 65B are side views of a toner bottle of the present invention.
Figure 65B:
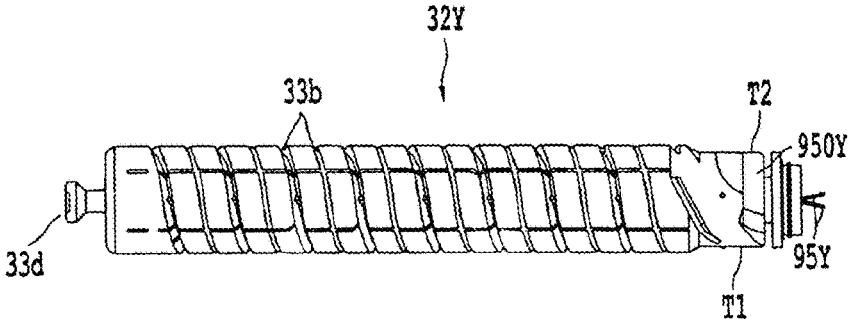

FIG. 65A and FIG. 65B are side views of different rotational orientations of the toner bottle 32Y. The toner guide 33b for toner delivery is formed by a double helix type of structure, and pushes toner towards the bottle opening parallel to the axis of rotation of the container.

It is desirable that the bottle gear 33c is formed so that its gear teeth do not project too much from the peripheral surface of the toner bottle 32Y. This is also desirable for device miniaturization. In addition, it is desirable for stabilization of the toner supply that the bottle gear 33c is provided near the toner outlet. For this reason, even if the diameter of the opening is smaller than the inner diameter of the toner bottle 32Y in the position of the bottle gear 33c, it is desirable for the toner to smoothly pass through the raised portion of the inner wall of the toner bottle.

From the grooves 33b, the toner is pushed to toner scoops T1 and T2, also referred to as toner conveyance devices or raised portions. The toner scoops T1 and T2 are raised outwardly, located at the shoulder portion of the bottle, and scoop or convey toner upwardly as the container is rotated.

Toner guiding inner walls 950Y are respectively formed along on each of inner wall surfaces of each of the raised portions T1 and T2. While FIGS. 64A, 65A, and 65B show reference characters 950Y, in these figures 950Y is designating the outside or backside of the inner walls. The inner walls 950Y appear, when looking into the mouth of the bottle 32Y as viewed in FIG. 64B, as inward-raised portions that are raised inwardly when viewed from the bottle opening. With the use of the toner guiding inner walls 950Y in the toner guide 33b, it is possible for the toner inside the toner bottle to be moved to the toner outlet beyond the small-diameter portion of the bottle gear by rotation of the toner bottle. Even when the bottle gear 33c is provided near the toner outlet, the structure disclosed above such as the toner guide, scoop, inner walls, and/or the toner guiding portions enable the internal toner to transfer to the toner outlet beyond the gear opening 33ci by the rotation of the bottle. Summarizing toner conveyance within the bottle, toner is pushed forward within the main body of the bottle by the toner guide(s) 33b. From the end of the toner guides 33b, toner is scooped upwardly by the scoops T1 and T2 due to the rotation of the bottle. From the scoops T1 and T2, toner slides along the inner walls 950Y. From the inner walls 950Y, the toner slides to the toner guiding portions 95Y which convey the toner outside of the container.

Figure 66:
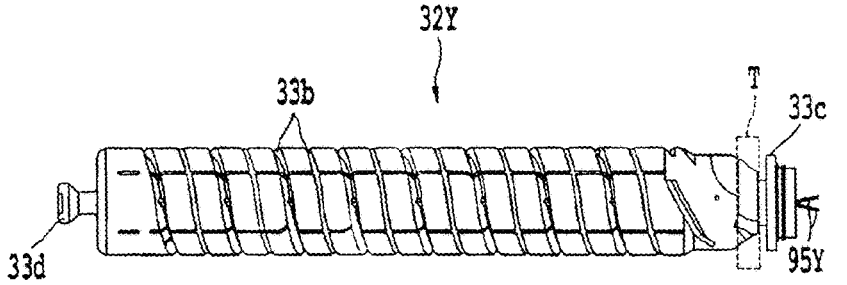
FIG. 66 is a side view of a variation of a toner bottle used with the invention.

FIG. 66 is a side view of a variation of the toner bottle 32Y, when viewed from the side surface of the 32Y. In this modification, the shoulder edge of the two raised portions T1 and T2 in the shoulder unit T of toner bottle 32Y shown in FIG. 65A and FIG. 65B is beveled, and has a sloping shoulder. Except for this sloping or beveling at the shoulder T, the bottle of FIG. 66 has the same construction as that illustrated in FIG. 64A and FIG. 64B, and a description thereof will be omitted. The toner bottle is not required to have the raised portion or scoops T1 and T2 as described in the above embodiments, but may alternatively or additionally have sloping-shoulders.

FIGS. 67A-67E are an alternative bottle, container, or volume that may be used with the invention. In FIGS. 67A-67E, 32 designates the bottle, 33i is a base portion, and 33ct are tabs on the bottle. A gear may be secured to the bottle so that it rests against the base portion 33i and is secured by the tabs 33ct. Alternatively and/or additionally, the gear may mount around the circumferential surface of the base portion 33i while being secured by the tabs 33ct.

Figure 67A:
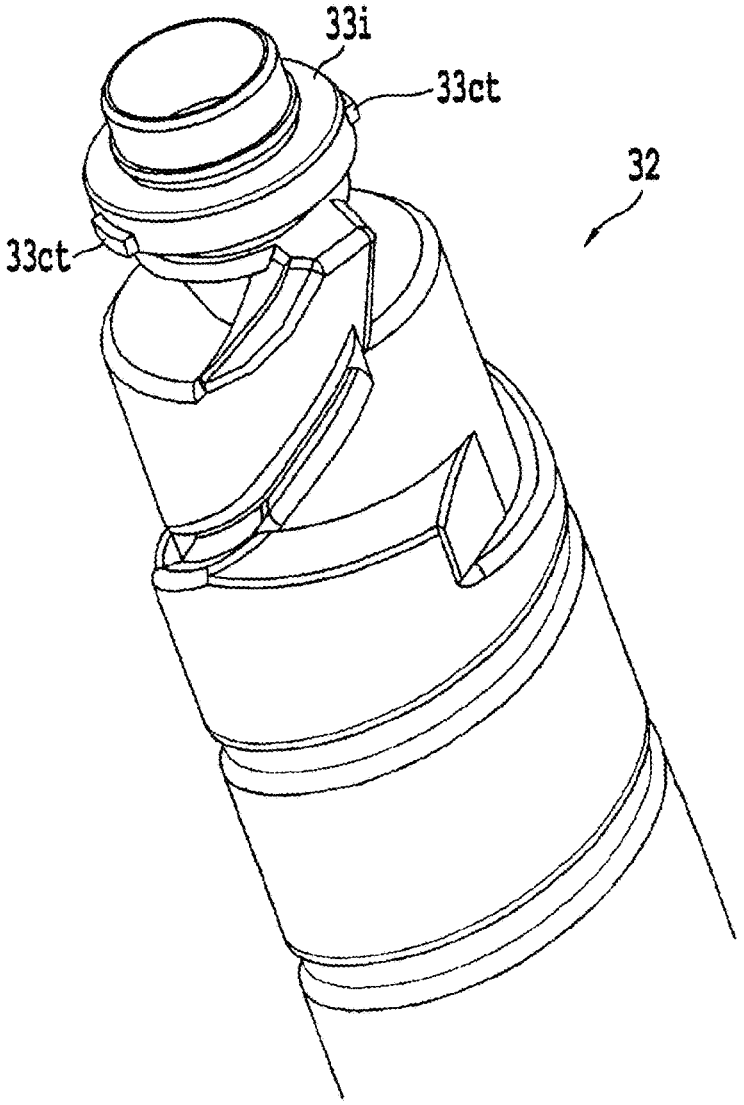
FIGS. 67A-67E are five views of another toner bottle which may be used with the invention.
Figure 67B:
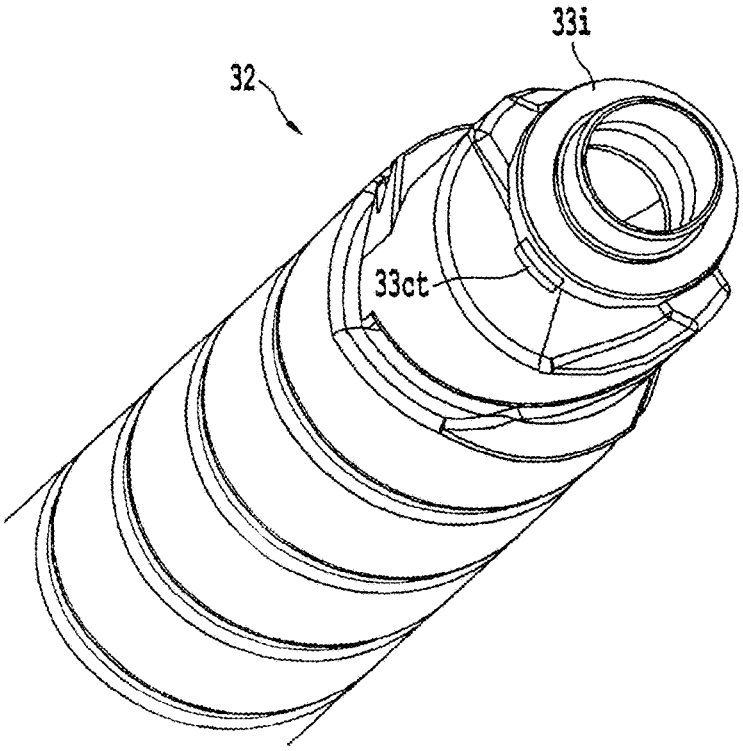
Figure 67C:
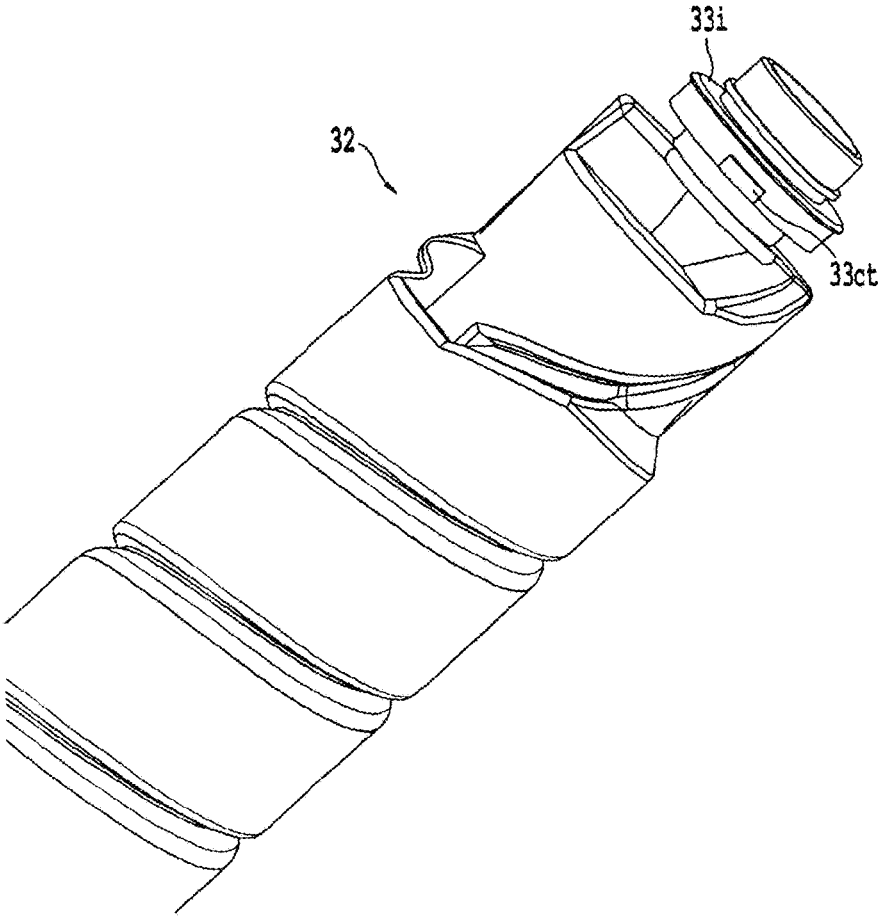
Figure 67D:
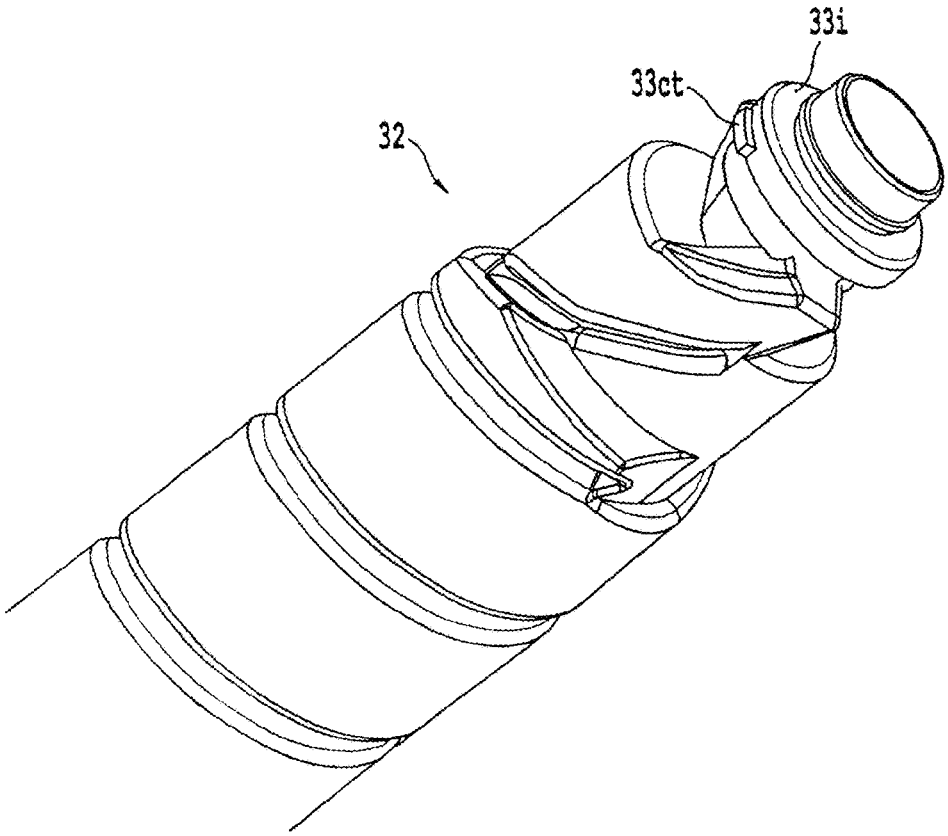
Figure 67E:
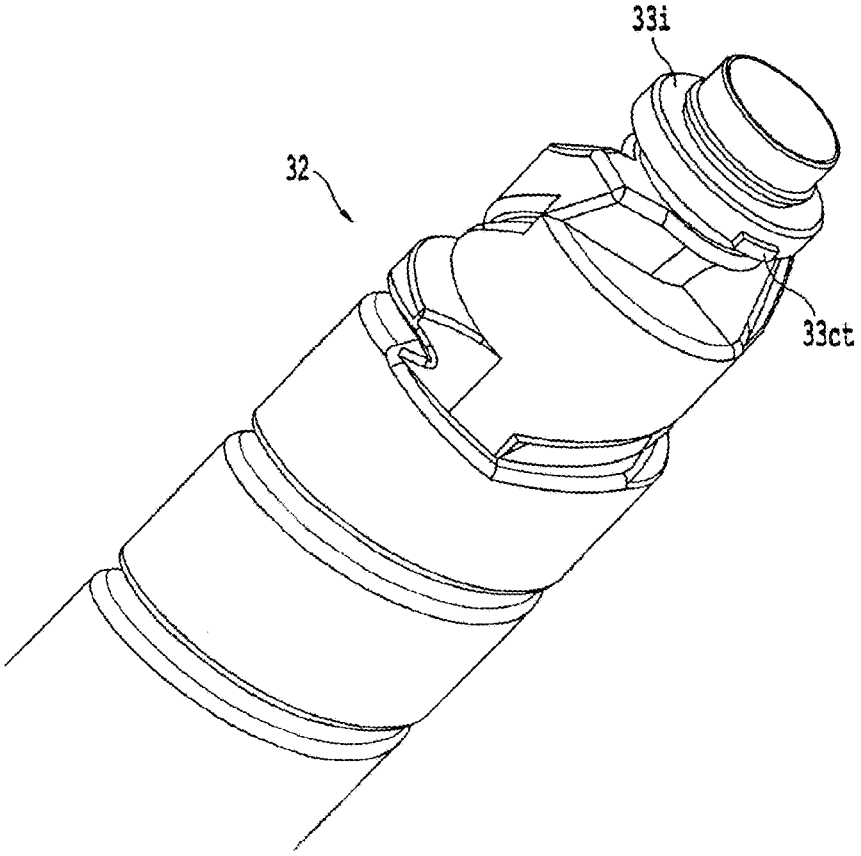
Figure 67G:
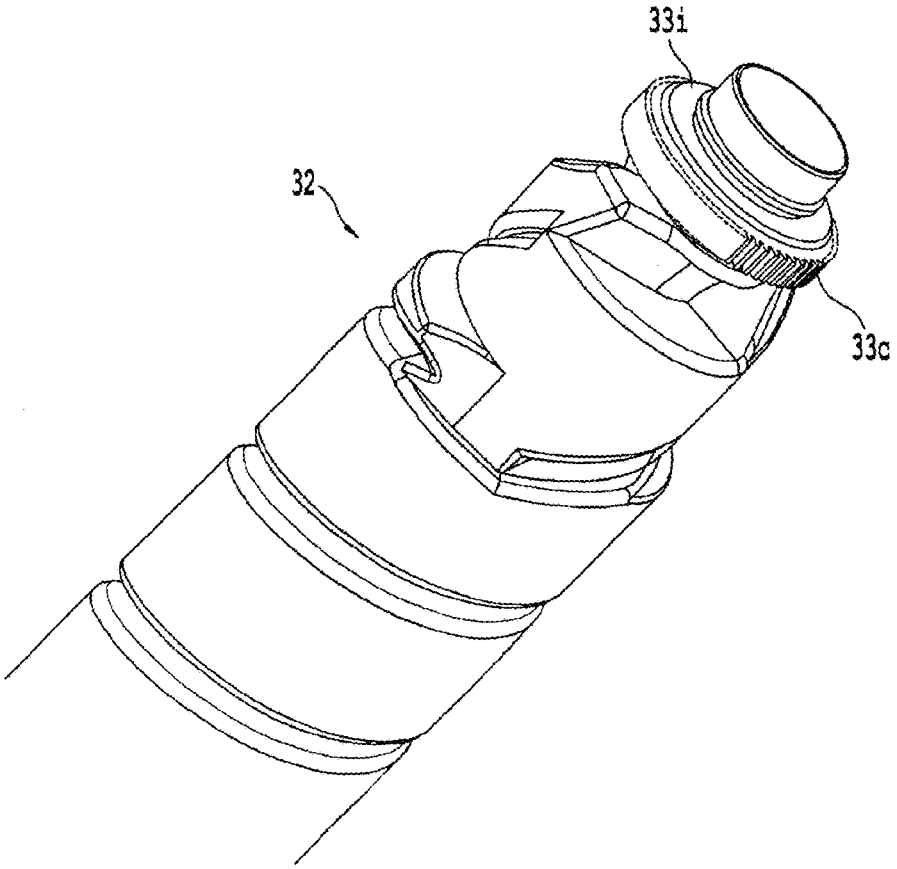
FIG. 67G shows the toner bottle of FIGS. 67A-67E having the gear of FIGS. 67F(1)-67F(3) mounted thereto.

FIGS. 67F(1)-67F(3) show the gear 33c which is secured to the base 33i of the bottle 32 shown in FIGS. 67A-67E. In FIGS. 67F(1)-67F(3), the gear 33c has two notches 33cn which respectively mate with the tabs 33ct of the bottle 32. The tabs 33ct snap into or interact with the notches 33cn in order to secure the gear 33c to the base 33i and the bottle 32.

FIG. 67F(1) shows a bottom view of the gear 33c. The bottom of the gear is the portion of the gear which first slips over the mouth of the bottle 32Y when the gear 33c is mounted to the bottle 32Y. FIG. 67F(2) shows a cross-section view of the gear 33c along the line 67F(2)-67F(2) of FIG. 67F(1). The left side of FIG. 67F(2) is the bottom of the gear 33c, and the right side is the top of the gear 33c. FIG. 67F(3) is a perspective view showing the top of the gear 33c. In FIG. 67F(3), one of the two notches 33cn is visible in the bottom portion of the gear.

The tabs 33ct and base portion 33i, while being part of this embodiment, are optional. Moreover, a gear such as the gear disclosed in other embodiments may be integrally formed with the bottle which would eliminate the need for the base 33i and separate gear 33c, and the tabs 33ct and notches 33cn which connect the gear 33c to the base 33i. While two notches 33cn and two tabs 33ct are used with this embodiment, any number of notches/tabs may be used. Moreover, notches and tabs are not required to mount the gear to the bottle/base, and any other suitable and/or conventional structure can be used to secure the gear. For example, a press fit, a key/notch structure, and/or screws can be used to secure the gear to the bottle. The bottle of 67A-67E may be used with the held portion or cap 34K, 34Y, 34M, or 34C of this invention, may be used with any type of cap, or may be used without any cap.

Figure 68A:
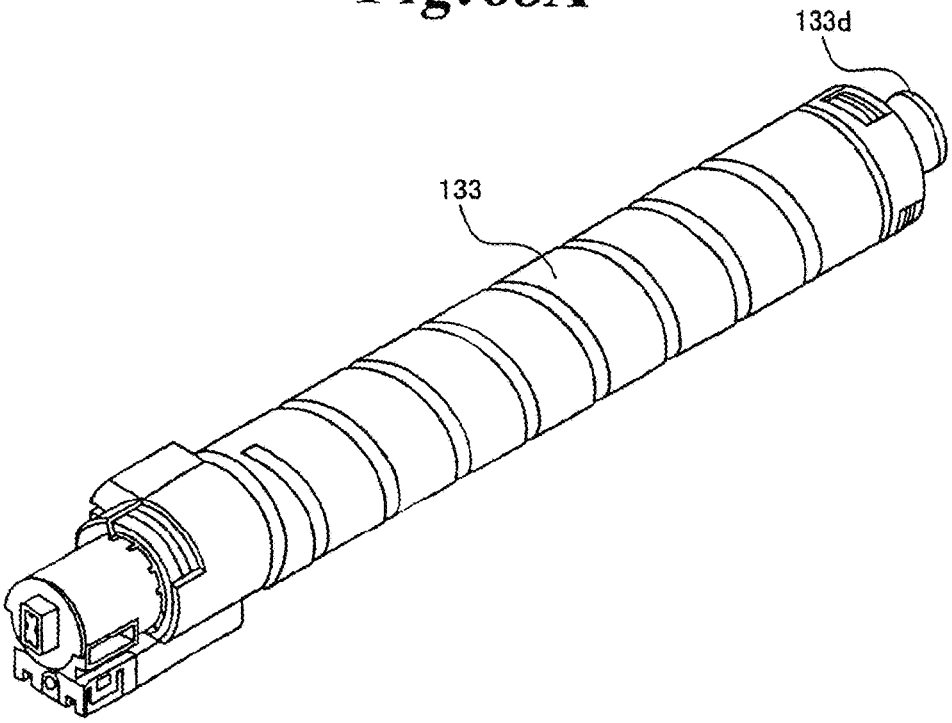
FIGS. 68A-68E are views of a toner bottle according to another embodiment of the present invention.
Figure 68B:
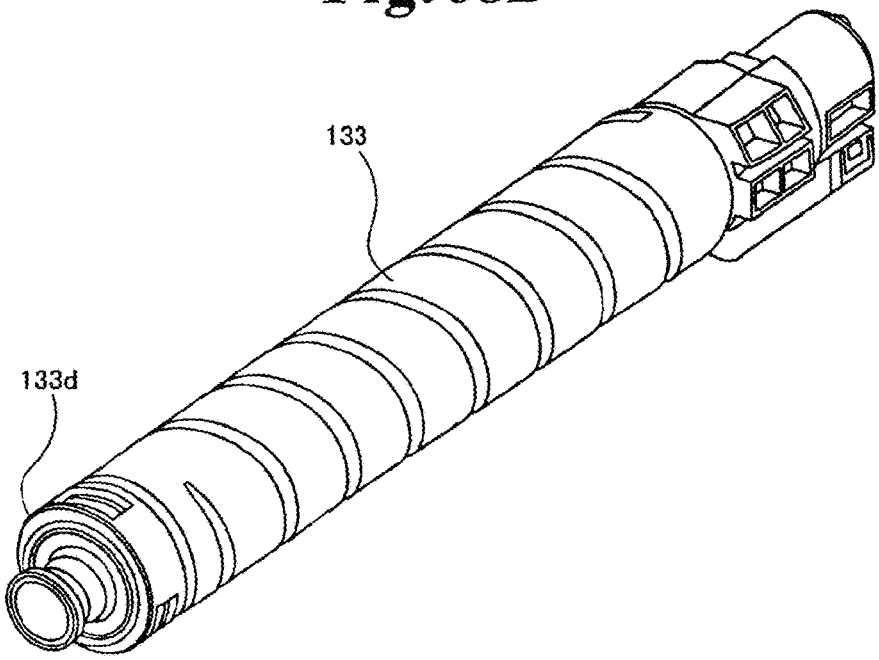
Figure 68C:
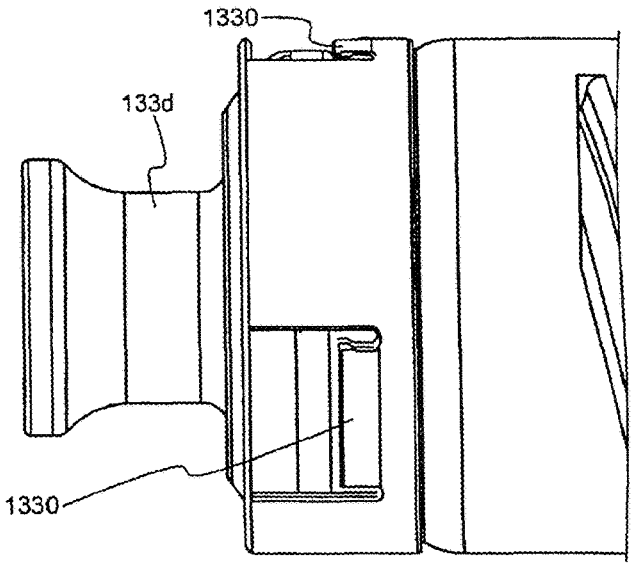
Figure 68D:
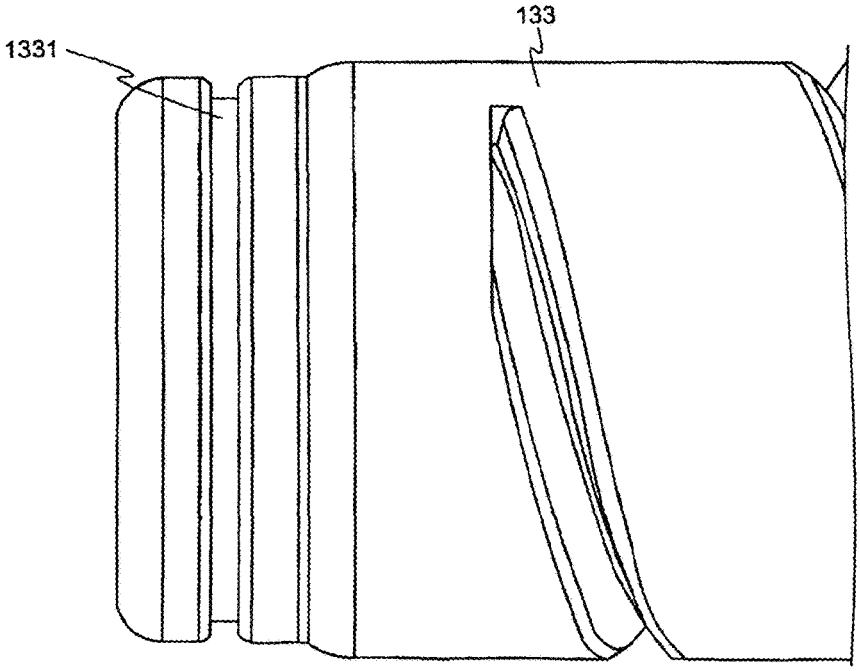
Figure 68E:
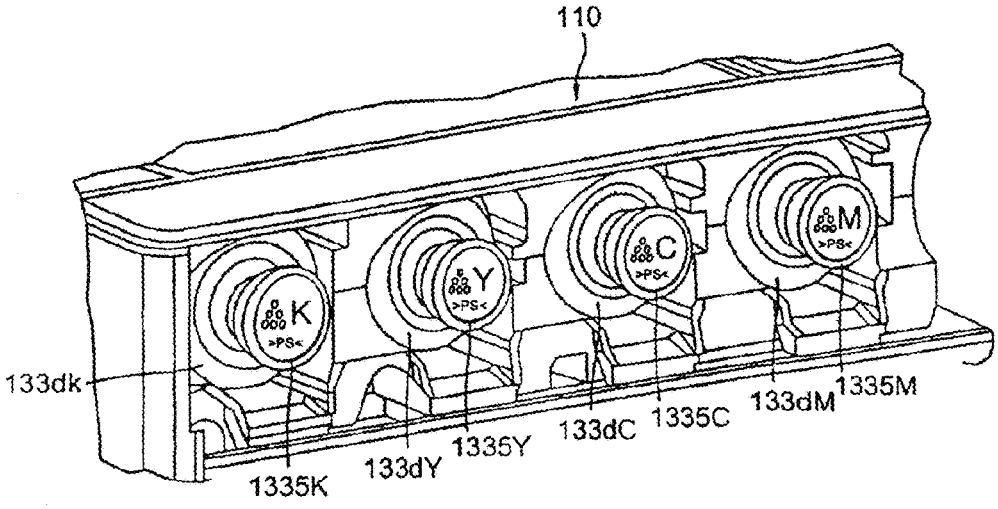

FIG. 68A to FIG. 68E represent another embodiment of the present invention. FIG. 68A is a perspective view of a toner bottle when viewed from its cap side. FIG. 68B is a perspective view of the toner bottle when viewed from a gripper 133d. FIG. 68C is a side view of the gripper 133d. FIG. 68D is a side view of an end portion of a container body before the gripper 133d is attached thereto. FIG. 68E is a perspective view of how toner containers are set in the main body of the image forming apparatus at an opening 110.

The toner container according to this embodiment has the gripper 133d separately formed from the toner bottle, as shown in FIG. 68C, and is fitted over the end portion of a container body 133 and into a groove 1331, as shown in FIG. 68D. According to other embodiments of the invention which have been explained above, the container body and the gripper are integrally formed as a single unit or component. According to this embodiment, an engagement claw 1330 of the gripper 133d is firmly engaged in the groove 1331 of the container body 133. The container body 133 and the gripper 133d may have the same color as each other, but alternatively, the container body 133 and the gripper 133d may have different colors in order to change the appearance of the toner container. It is thereby possible to improve the recognizability of the containers containing different colors of toner such that an operator can easily recognize the toner container when the toner container set in the main body of the image forming apparatus is replaced. In this case, by changing the color of the gripper 133d to one matching each of the toner colors, it is possible to prevent erroneous replacement which may occur between different toner containers having different toner colors.

Moreover, a decal, seal, label, or other indicia 1335 (representing 1335K, 1335Y, 1335C, and 1335M of FIG. 68E) indicating the color of toner contained within the bottle may be attached to or integrally formed on the end face of the gripper 133d (represented by 133dK, 133dY, 133dC, and 133dM for the different toner bottles), as shown in FIG. 68E. The indication seal 1335 is, according to one embodiment, a round seal, preferably having the same color as the toner color within the container, and, according to one embodiment, has a sign with six circles triangularly arranged which represents toner, a letter representing a toner color (e.g., K, Y, C, or M), and ">PS<" indicating the container body and/or the gripper is made of polystyrene. The container body and the gripper 133d may be made out of other types of material such as As ABS (acrylonitrile-butadiene-styrene copolymer), PP (polypropylene), cardboard, paper, or any plastic, resin or metal. The seal 1335 also helps enhance the effect of recognizing the toner container when the toner container is replaced.

Various features of the invention are described in different embodiments. However, the invention includes each feature being applied to each and every disclosed embodiment, figure, or container.

It is obvious that the present invention is not limited by the embodiments and that the embodiments can be changed as necessary within the scope of the technological idea of the present invention other than the suggestion in the embodiments. Furthermore, each number, position, and shape of the components are not limited by the embodiments, and therefore, these can be changed to those which are appropriate for implementation of the present invention.

A toner container according to another embodiment is characterized in that in the attachment operation of the above-mentioned toner container to the toner-container holder, after the positioning is started, the open/close member starts to open the toner outlet.

A toner container according to still another embodiment is characterized in that based on the above-mentioned toner container, the toner-container holder has a nozzle communicating with the toner outlet, and that the open/close member is set as the plug member which is pushed by the nozzle in synchronization with the attachment operation to the toner-container holder, to start opening the toner outlet, and which is biased by the biasing member in synchronization with the detachment operation from the toner-container holder, to start closing the toner outlet.

A toner container according to still another embodiment is characterized in that based on the above-mentioned toner container, the toner-container holder has a positioning member for being engaged with the held portion to position the held portion, and that after the held portion starts to be engaged with the positioning member during the attachment operation to the toner-container holder, the nozzle starts to push the plug member.

A toner container according to still another embodiment is characterized in that based on the above-mentioned toner container, the front end of the positioning member is formed so as to be located closer to the held portion side than the front end of the nozzle with respect to the held portion moving along the attachment direction.

A toner container according to still another embodiment is characterized in that when the above-mentioned toner container moves along the attachment direction to the toner-container holder, the front end of the held portion engaged with the positioning member is formed so as to be located closer to the toner-container holder side than the front end of the plug member pushed by the nozzle.

A toner container according to still another embodiment is characterized in that based on the above-mentioned toner container, the front end of the positioning member on the side where the held portion is attached is tapered or chamfered.

A toner container according to still another embodiment is characterized in that based on the above-mentioned toner container, the front end of the held portion on the side where the positioning member is engaged is tapered or chamfered.

A toner container according to still another embodiment is characterized in that the above-mentioned toner container detachably attached to the toner-container holder of the main body of the image forming apparatus includes a container body which discharges toner contained inside the toner container from the opening; and the held portion which discharges the toner, discharged from the opening of the container body, from the toner outlet and is held by the toner-container holder in a non-rotating manner, and in that the held portion includes the sliding portion being in contact with the toner-container holder and sliding.

A toner container according to still another embodiment is characterized in that the sliding portion of the above-mentioned toner container slides along the toner-container holder in synchronization with the attachment/detachment operation to/from the toner-container holder.

A toner container according to still another embodiment is characterized in that the sliding portion of the above-mentioned toner container is a flat portion.

A toner container according to still another embodiment is characterized in that the flat portion of the above-mentioned toner container is formed so as to be parallel with the sliding face of the toner-container holder.

A toner container according to still another embodiment is characterized in that the sliding portion of the above-mentioned toner container is a plurality of convex portions formed so that the convex portions have a height contactable with a predetermined plane.

A toner container according to still another embodiment is characterized in that the predetermined plane of the above-mentioned toner container is set as the sliding face of the toner-container holder.

A toner container according to still another embodiment is characterized in that the sliding portion of the above-mentioned toner container is provided in the bottom of the held portion.

A toner container according to still another embodiment is characterized in that when the attachment/detachment operation to/from the toner-container holder is performed, the bottom of the held portion of the above-mentioned toner container is placed on the sliding face of the toner-container holder and slides along the sliding face.

A toner container according to still another embodiment is characterized in that the sliding portion of the above-mentioned toner container is provided in the side of the held portion.

A toner container according to still another embodiment is characterized in that the side of the held portion of the above-mentioned toner container slides along the sliding face of the toner-container holder used as the side face, when the attachment/detachment operation to/from the toner-container holder is performed.

A toner container according to still another embodiment is characterized in that the held portion of the above-mentioned toner container includes a biased portion which is biased by the biasing unit of the toner-container holder in the attachment direction while the held portion is set in the toner-container holder, and in that the sliding portion comes in contact with the biasing unit in synchronization with the attachment/detachment operation to/from the toner-container holder and slides.

A toner container according to still another embodiment is characterized in that based on the above-mentioned toner container, the biasing unit is an arm pair which is integrally provided through a spindle and affects force in the two directions of the rotational direction around the spindle by a torsion spring.

A toner container according to still another embodiment is characterized in that in the above-mentioned toner container, the sliding portion is provided in two side portions of the held portion, and biased portions are corner portions each being at an end of the two side portions.

A toner container according to still another embodiment is characterized in that in the above-mentioned toner container, the corner portion is formed so that the round of the corner portion is smaller than the round of a contact portion of the biasing unit coming in contact with the corner portions.

A toner container according to still another embodiment is characterized in that in the above-mentioned toner container, the sliding portion is provided in two side portions of the held portion, and a biased portion is a plane intersecting the side portions at ends of the two side portions.

A toner container according to still another embodiment is characterized in that in the above-mentioned toner container, the sliding portion is formed so that its height is equivalent to the height of the toner outlet.

A toner container according to still another embodiment is characterized in that based on the above-mentioned toner container, the toner-container holder includes a nozzle communicating with the toner outlet, and the held portion includes a plug member which is pushed by the nozzle in synchronization with the attachment operation to the toner-container holder to open the toner outlet and is biased by the biasing member in synchronization with the detachment operation from the toner-container holder to close the toner outlet, and during the attachment operation to the toner-container holder, after the sliding portion starts to be slid toward the biasing unit, the toner conveying pipe starts pushing the plug member, and the biasing unit biases the biased portion as soon as the sliding portion finishes its sliding to the biasing unit.

A toner container according to still another embodiment is characterized in that in the above-mentioned toner container, a movement distance of the plug member in the attachment/detachment direction associated with the attachment/detachment operation to/from the toner-container holder is set to be shorter than a distance from the toner outlet to the biased portion in the attachment/detachment direction.

A toner container according to still another embodiment is characterized in that in the above-mentioned toner container, the held portion includes an engaging portion being engaged with the positioning member of the toner-container holder in synchronization with the attachment operation to the toner-container holder, and the engaging portion is provided in the upper side in the vertical direction of the sliding portion and the toner outlet.

A toner container according to still another embodiment is characterized in that the above-mentioned toner container is attached/detached along the longitudinal direction of the container body.

A toner container according to still another embodiment is characterized in that the above-mentioned toner container is attached to the toner-container holder based on the longitudinal direction of the container body set as the horizontal direction.

A toner container according to still another embodiment is characterized in that the above-mentioned toner container is attached to the toner-container holder so that the held portion is set as a head of the container body.

A toner container according to still another embodiment is characterized in that based on the above-mentioned toner container, the container body is rotatably structured and conveys the toner contained therein toward the opening following a rotation.

A toner container according to still another embodiment is characterized in that based on the above-mentioned toner container, the container body includes a gear which is provided on its circumferential surface and on the side of the opening, and transmits a rotational driving force to the container body.

A toner container according to still another embodiment is characterized in that based on the above-mentioned toner container, the container body includes a spiral-shaped projection along its inner circumferential surface.

A toner container according to still another embodiment is characterized in that based on the above-mentioned toner container, the container body includes a conveyor member that conveys the toner contained therein toward the opening.

A toner container according to still another embodiment is characterized in that based on the above-mentioned toner container, the conveyor member is a coil or a screw that is rotatably provided.

A toner container according to still another embodiment is characterized in that based on the above-mentioned toner container, the held portion communicates with the container body through the opening.

A toner container according to still another embodiment is characterized in that based on the above-mentioned toner container, the container body contains toner in inside thereof.

A toner container according to still another embodiment is characterized in that based on the above-mentioned toner container, the container body contains carrier in inside thereof.

An image forming apparatus according to still another embodiment is characterized in that the above-mentioned image forming apparatus includes a toner container detachably provided therein including a container body which discharges toner contained in the toner container from the opening, and a held portion which discharges the toner discharged from the opening of the container body from the toner outlet; and also includes a holding portion which holds the held portion in a non-rotating manner; and a guide rail for guiding the held portion toward the holding portion while rotation of the held portion is restricted upon attachment of the toner container.

An image forming apparatus according to still another embodiment is characterized in that in the above-mentioned image forming apparatus, the guide rail includes guide edges for supporting the container body.

An image forming apparatus according to still another embodiment is characterized in that in the above-mentioned image forming apparatus, the guide rail includes a guide groove for guiding part of the held portion.

An image forming apparatus according to still another embodiment is characterized in that in the above-mentioned image forming apparatus, the held portion includes a projected portion projected along the attachment/detachment direction so as not to overlap the projection plane in the attachment/detachment direction of the container body, and the projected portion is guided along the guide groove.

An image forming apparatus according to still another embodiment is characterized in that in the above-mentioned image forming apparatus, the projected portion has a toner outlet.

An image forming apparatus according to still another embodiment is characterized in that in the above-mentioned image forming apparatus, the guide groove is provided in the lower side in the vertical direction with respect to the held portion.

An image forming apparatus according to still another embodiment is characterized in that the above-mentioned image forming apparatus includes a toner supply device in which a toner container is detachably provided, the toner container including a container body which discharges toner contained in the toner container from the opening, and a held portion which discharges the toner discharged from the opening of the container body from the toner outlet; and also includes a holding portion which holds the held portion in a non-rotating manner; and a biasing element for biasing the toner container toward the holding portion in synchronization with the attachment operation of the toner container.

An image forming apparatus according to still another embodiment is characterized in that in the above-mentioned image forming apparatus, the biasing element biases the held portion toward the holding portion in synchronization with the attachment operation of the toner container.

An image forming apparatus according to still another embodiment is characterized in that in the above-mentioned image forming apparatus, the toner container includes an open/close member for opening/closing the toner outlet in synchronization with the attachment/detachment operation, and during the attachment operation of the toner container, after the biasing element starts biasing, the open/close member starts to open the toner outlet.

An image forming apparatus according to still another embodiment is characterized in that the above-mentioned image forming apparatus is configured so as to affect the force in the direction of separating the toner container from the holding portion, on the toner container before being biased by the biasing unit toward the holding portion.

An image forming apparatus according to still another embodiment is characterized in that the above-mentioned image forming apparatus includes the second biasing element for biasing the toner container in the direction of separating the toner container from the holding portion in synchronization with the detachment operation of the toner container.

An image forming apparatus according to still another embodiment is characterized in that in the above-mentioned image forming apparatus, the second biasing element biases the held portion in the direction of separating it from the holding portion in synchronization with detachment operation of the toner container.

An image forming apparatus according to still another embodiment is characterized in that in the above-mentioned image forming apparatus, the toner container includes an open/close member for opening/closing the toner outlet in synchronization with the attachment/detachment operation, and during the detachment operation of the toner container, after the second biasing element starts biasing, the open/close member starts closing the toner outlet.

An image forming apparatus according to still another embodiment is characterized in that the above-mentioned image forming apparatus is configured so as to affect the force toward the holding portion, on the toner container before being biased by the second biasing unit in the direction of separating the toner container from the holding portion.

An image forming apparatus according to still another embodiment is characterized in that in the above-mentioned image forming apparatus, the biasing element and the second biasing element are integrally provided through a spindle and are made to be an arm pair which affects the force in the two directions of the rotational direction around the spindle by the torsion spring.

An image forming apparatus according to still another embodiment is characterized in that in the above-mentioned image forming apparatus, the guide rail includes a sliding face along which the sliding portion of the held portion slides in synchronization with attachment/detachment operation of the toner container, and during the attachment operation of the toner container, after sliding of the sliding portion is started, the biasing element biases the held portion, and at the same time positioning of the held portion to the holding portion is started, and the positioning of the held portion to the holding portion is finished as soon as the sliding of the sliding portion is finished.

An image forming apparatus according to still another embodiment is characterized in that in the above-mentioned image forming apparatus, the guide rail includes a sliding face along which the sliding portion of the held portion slides in synchronization with attachment/detachment operation of the toner container.

An image forming apparatus according to still another embodiment is characterized in that the above-mentioned image forming apparatus includes a sliding face along which the sliding portion of the held portion slides in synchronization with attachment/detachment operation of the toner container.

An image forming apparatus according to still another embodiment is characterized in that in the above-mentioned image forming apparatus, during the attachment operation of the toner container, after sliding of the sliding portion is started, the biasing element biases the held portion, and at the same time positioning of the held portion to the holding portion is started, and the positioning of the held portion to the holding portion is finished as soon as the sliding of the sliding portion is finished.

An image forming apparatus according to still another embodiment is characterized in that the above-mentioned image forming apparatus includes a toner container including an open/close member for opening/closing the toner outlet of the held portion; and also includes a toner conveying pipe which pushes the open/close member in synchronization with the attachment operation of the toner container to start opening the toner outlet and which communicates with the toner outlet.

An image forming apparatus according to still another embodiment is characterized in that in the above-mentioned image forming apparatus, the toner container includes a member of exerting the force of biasing the open/close member in the direction of resisting the direction pushed by the toner conveying pipe.

An image forming apparatus according to still another embodiment is characterized in that in the above-mentioned image forming apparatus, the toner container is attached/detached along the longitudinal direction of the container body.

An image forming apparatus according to still another embodiment is characterized in that in the above-mentioned image forming apparatus, the toner container is attached based on the longitudinal direction of the container body set as the horizontal direction.

An image forming apparatus according to still another embodiment is characterized in that in the above-mentioned image forming apparatus, the held portion is attached so that it becomes the head of the container body.

An image forming apparatus according to still another embodiment is characterized in that the above-mentioned image forming apparatus includes a toner container including a gear provided on the periphery of the container body and near the opening; and also includes a drive gear engaged with the gear to transmit a rotational driving force to the gear.

An image forming apparatus according to still another embodiment is characterized in that in the above-mentioned image forming apparatus, the toner container conveys the toner contained in the container body toward the opening in synchronization with the rotation of the container body by the rotational driving force transmitted to the gear.

An image forming apparatus according to still another embodiment is characterized in that in the above-mentioned image forming apparatus, the toner container has a spiral-shaped projection along the inner circumferential surface of the container body.

An image forming apparatus according to still another embodiment is characterized in that in the above-mentioned image forming apparatus, the toner container contains toner in the container body.

An image forming apparatus according to still another embodiment is characterized in that in the above-mentioned image forming apparatus, the toner container further contains carrier in the container body.

An image forming apparatus according to still another embodiment is characterized in that the above-mentioned image forming apparatus includes a toner container detachably attached to an attachment portion, the toner container including a container body having a conveyor portion for conveying the toner contained to the opening side through rotation; and a held portion fixed to the opening of the container body and relatively rotatable with respect to the container body, in which the held portion has a toner outlet that forms a part of a path used for supplying the toner contained in the container body to the main body of the image forming apparatus, and the attachment portion includes an engaging member engaging the toner outlet when the toner container moves along the axial direction, and a guide rail for restricting rotation of the held portion during the movement.

An image forming apparatus according to still another embodiment is characterized in that in the above-mentioned image forming apparatus, the guide rail includes guide edges for supporting the container body and a guide groove for guiding the end face of the held portion.

An image forming apparatus according to still another embodiment is characterized in that in the above-mentioned image forming apparatus, the held portion has a projected portion projected outwardly than the outer diameter of the container body at a cross section vertical to the axial line of the toner container, and the projected portion is guided by the guide groove of the guide rail.

An image forming apparatus according to still another embodiment is characterized in that in the above-mentioned image forming apparatus, the guide groove is formed in the lower side in the direction of gravity.

An image forming apparatus according to still another embodiment is characterized in that in the above-mentioned image forming apparatus, the toner outlet is formed in the projected portion.

An image forming apparatus according to still another embodiment is characterized in that in the above-mentioned image forming apparatus, the attachment portion is located in the rear side of the main body when viewed from the operator.

An image forming apparatus according to still another embodiment is characterized in that the toner container is detachably attached to the toner-container holder of the main body of the above-mentioned image forming apparatus.

The present invention optimizes the configuration of the toner container set in the toner-container holder. Therefore, the present invention can provide the toner container with high operability/workability during its replacement and capable of reliably reducing occurrence of toner stain, and the image forming apparatus including the same.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage and dispensing device for toner, comprising:

a cap portion through which toner is dispensed[, the cap portion having at least a portion which is cylindrical-shaped]; [and a storage volume connected to the cap portion, a portion of the storage volume being disposed within an interior of the cylindrical-shaped portion,] *and*

*a longitudinal axis,* the cap portion including:

*a front portion which includes a section which is at least partially cylindrical and has a radius;*

*a first pair of flat vertical exterior surfaces which are parallel to the longitudinal axis of the storage and dispensing device, disposed below the section which is at least partially cylindrical, the first pair of flat vertical exterior surfaces disposed on opposite sides of the longitudinal axis of the storage and dispensing device;*

*a second pair of flat vertical exterior surfaces which are parallel to the longitudinal axis of the storage and dispensing device, disposed below the first pair of vertical surfaces, the second pair of flat vertical exterior surfaces disposed on opposite sides of the longitudinal axis of the storage and dispensing device; and* a projection on an exterior of the cap *portion*, the projection corresponding to a particular color of toner, a thickness of the projection in a vertical direction being less than or equal to [a] *the* radius of the [cylindrical-shaped portion] *section which is at least partially cylindrical,*

*the storage and dispensing device further comprising a storage volume connected to the cap portion, a portion of the storage volume being disposed within an interior of the section which is at least partially cylindrical,* wherein a distance from a center of the [cylindrical-shaped] *front portion of the* cap portion to an outer edge of the projection is at least 15% greater than [a] *the* radius of the [cylindrical-shaped portion] *section which is at least partially cylindrical,*

*wherein the each flat vertical surface of the first pair of flat vertical surfaces is closer to a vertical line at a front portion of the cap portion than each flat vertical surface of the second pair of flat vertical surfaces, the vertical line being centered relative to the front portion of the cap,*

*wherein a profile, perpendicular to the longitudinal axis, of the projection includes an upper horizontal line including an outer end, a lower horizontal line including an outer end, and a convex line which is an outer edge of the projection connecting the outer end of the upper horizontal line with the outer end of the lower horizontal line.*

2. The storage and dispensing device according to claim 1, wherein:

the storage and dispensing device is for use in a machine which uses at least two different color toners, and

[an] *the* outer edge of the projection has a minimum distance from a center of the [cylindrical-shaped] *front portion of the cap* portion which is greater than a largest radius of a [cylindrical-shaped] *front portion of the cap* portion of any other toner storage and dispensing device of the machine.

3. The storage and dispensing device according to claim 1, wherein:

a distance from a center of the [cylindrical-shaped] *front portion of the* cap portion to [an] *the* outer edge of the projection is at least 25% greater than [a] *the* radius of the [cylindrical-shaped portion] *section which is at least partially cylindrical.*

4. The storage and dispensing device according to claim 1, wherein:

a distance from a center of the [cylindrical-shaped] *front portion of the* cap portion to [an] *the* outer edge of the projection is at least 35% greater than [a] *the* radius of the [cylindrical-shaped portion] *section which is at least partially cylindrical,* a distance from a center of the cylindrical-shaped cap portion to an outer edge of the projection is at least 35% greater than a radius of the cylindrical-shaped portion.

5. The storage and dispensing device according to claim 1, further comprising:

toner stored with the storage and dispensing device.

6. The storage and dispensing device according to claim 1, further comprising:

a second projection on an exterior of the cap, the second projection in combination with said projection corresponding to a particular color of toner, a distance from a center of the [cylindrical-shaped] *front portion of the* cap portion to an outer edge of the second projection is at least 15% greater than [a] *the* radius of the [cylindrical-shaped portion] *section which is at least partially cylindrical.*

7. The storage and dispensing device according to claim 6, wherein:

a distance from a center of the [cylindrical-shaped] *front portion of the* cap portion to [an] *the* outer edge of each of the two projections is at least 25% greater than a radius of the [cylindrical-shaped portion] *section which is at least partially cylindrical.*

8. The storage and dispensing device according to claim 6, wherein:

a distance from a center of the [cylindrical-shaped] *front portion of the* cap portion to [an] *the* outer edge of each of the two projections is at least 35% greater than a radius of the [cylindrical-shaped portion] *section which is at least partially cylindrical.*

9. The storage and dispensing device according to claim 6, wherein:

a sum of thicknesses of the two projections in a vertical direction being less than or equal to a radius of the [cylindrical-shaped portion] *section which is at least partially cylindrical.*

*10. A storage device for toner, comprising:*

*a storage volume to store toner;*

*an end, connected to the storage volume, through which toner is dispensed and including a front portion which includes a section which is at least partially cylindrical, the end including an exterior;*

*a longitudinal axis;*

*a first pair of flat vertical exterior surfaces which are parallel to the longitudinal axis of the storage device, disposed below the section which is at least partially cylindrical, the first pair of flat vertical exterior surfaces disposed on opposite sides of the longitudinal axis;*

*a second pair of flat vertical exterior surfaces which are parallel to the longitudinal axis of the storage device, disposed below the first pair of flat vertical surfaces, the second pair of flat vertical exterior surfaces disposed on opposite sides of the longitudinal axis of the storage device; and*

*a projection at an exterior of the storage device, the projection corresponding to a particular color of toner, a thickness of the projection in a vertical direction being less than or equal to a distance from a center of the end to the exterior of the end, the projection including an outer edge at an outer circumferential portion thereof, the outer edge of the projection being further from the longitudinal axis than an outer surface of the partially cylindrical section is from the longitudinal axis,*

*wherein a distance from the center of the end to the outer edge of the projection at the outer circumferential portion is at least 15% greater than a distance from the center of the end to the outer circumferential portion where the projection does not exist, and*

*wherein each flat vertical surface of the first pair of flat vertical surfaces is closer to a vertical line at the front portion of the end than each flat vertical surface of the second pair of flat vertical surfaces, the vertical line being centered relative to the front portion of the end,*

*wherein a profile, perpendicular to the longitudinal axis, of the projection includes an upper horizontal line including an outer end, a lower horizontal line including an outer end, and a convex line which is the outer edge of the projection connecting the outer end of the upper horizontal line with the outer end of the lower horizontal line.*

*11. The storage device according to claim 10, wherein:*

*the storage device is for use in a machine which uses at least two different color toners, and*

*the outer edge of the projection has a minimum distance from the center of the end which is greater than a largest distance from the center of the end to the outer circumferential portion where the projection does not exist of any other toner storage device of the machine.*

*12. The storage device according to claim 10, wherein:*

*a distance from the center of the end to the outer edge of the projection is at least 25% greater than a distance from the center of the end to the outer circumferential portion where the projection does not exist.*

*13. The storage device according to claim 10, wherein:*

*a distance from the center of the end to the outer edge of the projection is at least 35% greater than a distance from the center of the end to the outer circumferential portion where the projection does not exist.*

*14. The storage device according to claim 10, further comprising:*

*toner stored within the storage device.*

*15. The storage device according to claim 10, further comprising:*

*a second projection at an exterior of the storage device, the second projection in combination with said projection corresponding to a particular color of toner, a distance from the center of the end to an outer edge of the second projection at an outer circumferential portion of the second projection is at least 15% greater than a distance from the center of the end to the outer circumferential portion where the projections do not exist,*

*a second projection on an exterior of the end, the second projection in combination with said projection corresponding to a particular color of toner, a distance from the center of the end to an outer edge of the second projection at an outer circumferential portion of the second projection is at least 15% greater than a distance from the center of the end to the outer circumferential portion where the projections do not exist.*

*16. The storage device according to claim 15, wherein:*

*a distance from the center of the end to the outer edges of each of the two projections is at least 25% greater than a distance from the center of the end to the outer circumferential portion where the projections do not exist.*

*17. The storage device according to claim 15, wherein:*

*a distance from the center of the end to the outer edges of each of the two projections is at least 35% greater than a distance from the center of the end to the outer circumferential portion where the projections do not exist.*

*18. The storage device according to claim 15, wherein:*

*a sum of thicknesses of the two projections in a vertical direction is less than or equal to a distance from the center of the end the outer circumferential portion where the projections do not exist.*

*19. The storage device according to claim 10, wherein:*

*the end comprises a cap.*

*20. The storage device according to claim 10, wherein:*

*a portion of the storage volume is disposed within an interior of the end.*

*21. The storage and dispensing device according to claim 1, further comprising*

*a chip on an electronic substrate, the electronic substrate facing forward along the longitudinal axis of the storage and dispensing device.*

*22. The storage and dispensing device according to claim 21, wherein:*

*the chip on the electronic substrate is disposed at a front of the storage and dispensing device.*

*23. The storage device according to claim 10, wherein:*

*the front portion further includes a chip on an electronic substrate, the electronic substrate facing forward along the longitudinal axis of the storage device.*

*24. The storage device according to claim 23, wherein:*

*the chip on the electronic substrate is disposed at a front of the storage device.*

*25. The storage device according to claim 10, further comprising:*

*a pair of flat horizontal surfaces which connect the first pair of flat vertical surfaces and the second pair of flat vertical surfaces.*

*26. The storage and dispensing device according to claim 1, further comprising:*

*a pair of flat horizontal surfaces which connect the first pair of flat vertical surfaces and the second pair of flat vertical surfaces.*

* * * * *